United States Patent
Kaji

(10) Patent No.: US 8,150,569 B2
(45) Date of Patent: Apr. 3, 2012

(54) MARINE VESSEL RUNNING CONTROLLING APPARATUS, AND MARINE VESSEL INCLUDING THE SAME

(75) Inventor: Hirotaka Kaji, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 979 days.

(21) Appl. No.: 12/128,733

(22) Filed: May 29, 2008

(65) Prior Publication Data

US 2009/0171520 A1 Jul. 2, 2009

(30) Foreign Application Priority Data

May 30, 2007 (JP) .................................. 2007-143843

(51) Int. Cl.
*B60L 3/00* (2006.01)
*B60L 15/00* (2006.01)

(52) U.S. Cl. ..... 701/21; 701/99; 114/144 E; 114/144 R; 440/1; 440/2

(58) Field of Classification Search ............ 701/21, 701/99; 440/53, 144 E, 144 R, 1–2; 114/144 E, 114/144 R
See application file for complete search history.

(56) References Cited

U.S. PATENT DOCUMENTS

| | | | |
|---|---|---|---|
| 4,705,130 A | 11/1987 | Fukunaga et al. | |
| 6,308,122 B1 | 10/2001 | Nishizaki et al. | |
| 6,843,195 B2 * | 1/2005 | Watabe et al. | 114/144 E |
| 6,884,128 B2 * | 4/2005 | Okuyama et al. | 440/1 |
| 6,994,046 B2 * | 2/2006 | Kaji et al. | 114/144 R |
| 7,052,341 B2 * | 5/2006 | Kaji et al. | 440/75 |
| 7,769,504 B2 * | 8/2010 | Kaji | 701/21 |
| 2005/0092225 A1 * | 5/2005 | Kaji et al. | 114/144 R |
| 2005/0164569 A1 * | 7/2005 | Kaji et al. | 440/1 |
| 2005/0170713 A1 | 8/2005 | Okuyama | |
| 2005/0282447 A1 | 12/2005 | Okuyama | |
| 2007/0017426 A1 * | 1/2007 | Kaji et al. | 114/144 RE |
| 2007/0049139 A1 | 3/2007 | Mizutani | |
| 2007/0066154 A1 | 3/2007 | Mizutani | |

(Continued)

FOREIGN PATENT DOCUMENTS

JP 62-166193 A 7/1987

(Continued)

OTHER PUBLICATIONS

Neuro-Fuzzy System for Intelligent Course Control of Underactuated Conventional Ships; Nicolau, V.; Soft Computing Applications, 2007. SOFA 2007. 2nd International Workshop on; Digital Object Identifier: 10.1109/SOFA.2007.4318312 Publication Year: 2007, pp. 95-101.*

(Continued)

*Primary Examiner* — Cuong H Nguyen
(74) *Attorney, Agent, or Firm* — Keating & Bennett, LLP

(57) ABSTRACT

A marine vessel running controlling apparatus is applicable to a marine vessel which includes a propulsive force generating unit arranged to generate a propulsive force to be applied to a hull of the marine vessel, and a steering unit arranged to turn the hull. The marine vessel running controlling apparatus includes an operational unit to be operated by an operator of the marine vessel to control a steering angle of the steering unit, and a control unit arranged to update control information related to the steering angle of the steering unit with respect to an operation amount of the operational unit based on data acquired during travel of the marine vessel.

16 Claims, 39 Drawing Sheets

U.S. PATENT DOCUMENTS

| | | | |
|---|---|---|---|
| 2007/0066156 A1 | 3/2007 | Mizutani | |
| 2009/0117788 A1* | 5/2009 | Kaji | 440/1 |
| 2009/0171520 A1* | 7/2009 | Kaji | 701/21 |

FOREIGN PATENT DOCUMENTS

| | | | |
|---|---|---|---|
| JP | 06-199155 A | | 7/1994 |
| JP | 06-199156 A | | 7/1994 |
| JP | 2000-043746 A | | 2/2000 |
| JP | 2001-106103 A | | 4/2001 |
| JP | 2003-361459 | * | 10/2003 |
| JP | 2003-361460 | * | 10/2003 |
| JP | 2003-361461 | * | 10/2003 |
| JP | 2005-280579 A | | 10/2005 |
| JP | 2007-143844 | * | 5/2007 |

OTHER PUBLICATIONS

Adaptive robust nonlinear design of course keeping ship steering autopilot; Jialu Du; Chen Guo; Yongsheng Zhao; Yingjun Bi; Control, Automation, Robotics and Vision Conference, 2004. ICARCV 2004 8$^{th}$; vol. 1; Digital Object Identifier: 10.1109/ICARCV.2004. 1468790; Publication Year: 2004 , pp. 13-18 vol. 1.*

Online estimation of ship steering dynamics and its applications in designing an optimal autopilot; Minh-Duc Le; Si-Hiep Nguyen; Communications and Information Technology, 2004. ISCIT 2004. IEEE International Symposium on; vol. 1; Digital Object Identifier: 10.1109/ISCIT.2004.1412891; Publication Year: 2004 , pp. 475-479 vol. 1.*

A new and effective fuzzy PID autopilot for ships; Lan Anh Nguyen; Minh Duc Le; Si Hiep Nguyen; Van Thang Nguyen; Thi Hoang Hoa Nghiem; SICE 2003 Annual Conference; vol. 3; Publication Year: 2003 , pp. 2647-2650 vol. 3.*

Two-degree-of-freedom H∞ control of ship steering; Wang XingCheng; Wang Ran; Intelligent Control and Automation, 2002. Proceedings of the 4th World Congress on; vol. 1; Digital Object Identifier: 10.1109/WCICA.2002.1022218; Publication Year: 2002 , pp. 763-767 vol. 1.*

Marine course-changing manoeuvre: a comparative study of control algorithms; Velasco, F.J.; Rueda, T.M.; Lopez, E.; Moyano, E.; Control Applications, 2002. Proceedings of the 2002 International Conference on; vol. 2; Digital Object Identifier: 10.1109/CCA.2002. 1038752; Publication Year: 2002 , pp. 1064-1069 vol. 2.*

A new and effective fuzzy PID autopilot for ships; Minh-Duc Le; Thanh-Ha Nguyen; Thi-Thai Nguyen; Song-Phi Nguyen; Thi-Vi Le; Trung-Dong Ngyuen; Thi-Huong Hoang; Tien-Dung Hoang; Computational Intelligence in Robotics and Automation, 2003. Proceedings. 2003 IEEE International Symposium on; vol. 3; Digital Object Identifier: 10.1109/CIRA.2003.*

Design of generalized minimum variance control for improving ship's steering performance on low speed; Idenawa, K.; Doi, M.; Nagamoto, K.; Mori, Y.; SICE Annual Conference (SICE), 2011 Proceedings of ; Publication Year: 2011 , pp. 329-335.*

Real-time simulation platform for inland ship maneuvering; Ming Chen; Mingdong Chen; Sichen Tong; Shan Lin; Mechanic Automation and Control Engineering (MACE), 2011 Second International Conference on; Digital Object Identifier: 10.1109/MACE.2011. 5987470; Publication Year: 2011 , pp. 2418-2421.*

Characteristics of internal waves in the South China Sea Observed by a shipboard coherent radar; Plant, W.J.; Keller, W.C.; Hayes, K.; Chatham, G.; OCEANS 2010; Digital Object Identifier: 10.1109/ OCEANS.2010.5664440; Publication Year: 2010 , pp. 1-7.*

* cited by examiner (1) : INSENSITIVE REGION
(2) : FIRST INFLECTION POINT OPERATING REGION
(3) : INSENSITIVE REGION
(4) : SECOND INFLECTION POINT OPERATING REGION
(5) : INSENSITIVE REGION

MARINE VESSEL RUNNING CONTROLLING APPARATUS, AND MARINE VESSEL INCLUDING THE SAME

BACKGROUND OF THE INVENTION

1. Field of the Invention

The present invention relates to a marine vessel which includes a steering mechanism for turning a hull thereof, and a marine vessel running controlling apparatus for such a marine vessel.

2. Description of the Related Art

An exemplary propulsion system provided in a marine vessel such as a cruiser or a boat for a leisure purpose is an outboard motor attached to a stern (transom) of the marine vessel. The outboard motor includes a propulsion unit provided outboard of the vessel. A steering mechanism is attached to the propulsion unit. The propulsion unit includes an engine as a drive source and a propeller as a propulsive force generating member. The steering mechanism horizontally turns the entire propulsion unit with respect to a hull of the marine vessel. When the steering mechanism is driven to turn the propulsion unit, the steering angle of the steering mechanism (a direction in which the propulsion unit generates a propulsive force) is changed, whereby the hull is turned.

A control console for controlling the marine vessel is provided on the hull. The control console includes, for example, a steering operational section for performing a steering operation, and a throttle operational section for controlling the propulsive force generated by the propulsion unit. The steering operational section includes, for example, a steering wheel as an operational member to be operated by an operator of the marine vessel. The steering wheel is mechanically connected to the steering mechanism via a wire or a hydraulic mechanism. Therefore, the steering mechanism is driven by operating the steering wheel to change the steering angle. Since the steering wheel and the steering mechanism are mechanically connected to each other, a relationship between the operation amount of the steering wheel and the steering angle is constant irrespective of the traveling speed of the hull.

An exemplary relationship between a stepwise change in the steering angle and the turning speed (yaw rate) of the marine vessel at a given traveling speed is shown in FIG. 1. Where the stepwise change in the steering angle is defined as an input signal and the yaw rate is defined as an output signal, a transfer function G(s) defining a relationship between the input signal and the output signal is approximately given by the following expression (1). This transfer function G(s) is a primary delay model called "Nomoto Model".

$$G(s)=K/(T \cdot s+1) \quad (1)$$

wherein s is a Laplacian, T is a time constant, and K is a gain.

If the traveling speed (or an engine speed N (rpm) as an alternative index) varies as shown in FIG. 2, the response of the yaw rate to the stepwise change in the steering angle also varies. That is, the time constant T and the gain K vary depending on the traveling speed. Here, the time constant T has a smaller variability than the gain K with respect to the traveling speed. Therefore, only the gain K will herein be discussed.

Although depending on the shape of the hull, the gain K increases with an increase in the traveling speed (with an increase in the engine speed N). Therefore, a higher yaw rate is provided in response to a change in the steering angle when the marine vessel is in a higher speed traveling state (e.g., when the marine vessel travels in the ocean) than when the marine vessel is in a lower speed traveling state (e.g., when the marine vessel travels at a lower speed in the vicinity of a docking site).

When the steering angle is changed by a certain degree, a lower yaw rate is provided to turn the hull more slowly in the lower speed traveling state than in the higher speed traveling state. If the operator desires to sharply turn the hull in the lower speed traveling state, the operator has to operate the steering wheel intentionally by a greater operation amount to increase the steering angle. In the higher speed traveling state, on the other hand, a higher yaw rate is provided to turn the hull more sharply than in the lower speed traveling state. Therefore, if the steering wheel is operated in the higher speed traveling state by the same operation amount as in the lower speed traveling state, there is a possibility that the hull is turned more quickly than intended by the operator. If the operator desires to slightly turn the hull in the higher speed traveling state, the operator has to operate the steering wheel intentionally by a smaller operation amount to reduce the steering angle.

Since the relationship between the steering angle and the yaw rate varies depending on the traveling speed, a relationship between the operation amount and the yaw rate also varies depending on the traveling speed. Therefore, a higher level of marine vessel maneuvering skill is required for the operator to perform a steering operation intentionally in different ways depending on the traveling speed. Hence, an unskilled operator of a leisure boat or the like cannot easily perform the steering operation.

Therefore, if it is possible to change the steering angle by a relatively great degree to increase the yaw rate in the lower speed traveling state and to change the steering angle by a relatively small degree to reduce the yaw rate in the higher speed traveling state, the operator can perform the steering operation without consideration of the traveling speed. Thus, even the unskilled operator can easily and properly perform the steering operation. With the steering wheel mechanically connected to the steering mechanism as described above, however, the relationship between the operation amount of the steering wheel and the steering angle cannot be changed according to the traveling speed of the hull.

Electric steering apparatuses for marine vessels are proposed in US 2005/0282447A1, US 2007/0066156A1 and US 2007/0066154A1. In these electric steering apparatuses, the operation amount of the steering wheel is detected by a potentiometer or the like, and the steering mechanism is driven according to a target steering angle calculated based on the detected operation amount. With this arrangement, the relationship between the operation amount of the steering wheel and the steering angle can be changed according to the traveling speed. Therefore, the relationship between the operation amount and the yaw rate (marine vessel maneuvering characteristic) with respect to the traveling speed is supposedly improved by properly setting a relationship between the operation amount and the target steering angle according to the traveling speed. Further, US 2007/0066154A1 proposes that a characteristic defining the relationship between the operation amount and the target steering angle is preliminarily provided and the target steering angle is calculated based on the characteristic in consideration of a marine vessel traveling state.

Boat builders and users are permitted to select different types of propulsion units, steering mechanisms and hulls in any desired combinations. Therefore, a relationship between the steering angle and a marine vessel turning behavior varies among different marine vessels. For implementation of the invention disclosed in US 2007/0066154A1, it is necessary to preliminarily define a characteristic suitable for each of the marine vessels.

However, there are an infinite number of combinations of the propulsion units, the steering mechanisms and the hulls, making it impractical to preliminarily provide optimum characteristics for the respective combinations.

In addition, the relationship between the steering angle and the turning behavior varies depending on the number of crew members and/or passengers and the amount (weight) of cargo. It is practically impossible to preliminarily provide the optimum characteristics in consideration of such conditions.

SUMMARY OF THE INVENTION

In order to overcome the problems described above, a preferred embodiment of the present invention provides a marine vessel running controlling apparatus for a marine vessel which includes a propulsive force generating unit arranged to generate a propulsive force to be applied to a hull of the marine vessel, and a steering unit arranged to turn the hull. The marine vessel running controlling apparatus includes an operational unit to be operated by an operator of the marine vessel to control a steering angle of the steering unit, and a control unit arranged to update control information related to the steering angle of the steering unit with respect to an operation amount of the operational unit based on data acquired during travel of the marine vessel.

With this unique arrangement, the data is collected during the actual travel of the marine vessel having the propulsive force generating unit and the steering unit incorporated in the hull. The control information related to the steering angle with respect to the operation amount is updated based on the collected data. That is, an intrinsic characteristic of the marine vessel is acquired by learning during the actual travel of the marine vessel, and the steering angle is controlled according to the operation amount based on the result of the learning. Thus, a marine vessel maneuvering characteristic is absolutely improved to accommodate variations in characteristics among different marine vessels without the need for preliminarily providing a relationship between a target steering angle characteristic and the operation amount.

According to another preferred embodiment of the present invention, the control unit preferably includes a speed measuring unit arranged to measure a traveling speed of the marine vessel; an intrinsic characteristic acquiring unit arranged to acquire an intrinsic characteristic defining a relationship among the traveling speed of the marine vessel, the steering angle of the steering unit and a turning behavior of the marine vessel; a steering angle characteristic setting unit arranged to determine a traveling speed-operation amount-target steering angle characteristic to define a relationship between a target steering angle of the steering unit and the operation amount of the operational unit according to the traveling speed of the marine vessel based on the intrinsic characteristic acquired by the intrinsic characteristic acquiring unit such that a marine vessel maneuvering characteristic defining a relationship among the traveling speed of the marine vessel, the operation amount of the operational unit and the turning behavior of the marine vessel satisfies a predetermined target marine vessel maneuvering characteristic; and a target steering angle setting unit arranged to determine the target steering angle of the steering unit for the operation amount according to the traveling speed measured by the speed measuring unit based on the traveling speed-operation amount-target steering angle characteristic determined by the steering angle characteristic setting unit.

The relationship among the traveling speed, the steering angle and the turning behavior (intrinsic characteristic) acquired by the intrinsic characteristic acquiring unit is a characteristic intrinsic to each marine vessel. The actual intrinsic characteristic of the marine vessel is acquired (or learned) by the intrinsic characteristic acquiring unit. With the use of the intrinsic characteristic, the traveling speed-operation amount-target steering angle characteristic is determined so as to achieve the target marine vessel maneuvering characteristic. The target steering angle setting unit determines the target steering angle for the operation amount according to the traveling speed based on the traveling speed-operation amount-target steering angle characteristic. The target marine vessel maneuvering characteristic is provided by driving the steering unit to the target steering angle.

Since a combination of the propulsive force generating unit, the steering unit and the hull is selected as desired by a boat builder or a user, it is difficult to preliminarily provide a traveling speed-operation amount-target steering angle characteristic optimum for that combination. In a preferred embodiment of the present invention, therefore, the characteristic of the marine vessel is measured during the actual travel of the marine vessel, and the traveling speed-operation amount-target steering angle characteristic is properly tuned based on the result of the measurement to reliably achieve the target marine vessel maneuvering characteristic.

In order to change the relationship between the target steering angle and the operation amount according to the traveling speed, the steering unit is preferably electrically connected to the operational unit. That is, the operation of the operational unit is not mechanically transmitted to the steering unit, but the steering unit preferably includes an actuator to be electrically driven according to the operation amount of the operational unit.

Where the propulsive force generating unit includes an engine, the speed measuring unit preferably includes an engine speed measuring unit arranged to measure an engine speed. Since the marine vessel traveling speed depends upon the engine speed, the marine vessel traveling speed can be indirectly measured by measuring the engine speed.

The intrinsic characteristic acquiring unit preferably includes a yaw rate measuring unit arranged to measure a yaw rate of the marine vessel, a gain computing unit arranged to calculate a yaw rate gain for the steering angle of the steering unit based on the yaw rate measured by the yaw rate measuring unit, and a gain characteristic computing unit arranged to calculate a gain characteristic defining a relationship between the gain and the traveling speed of the marine vessel. In this case, the steering angle characteristic setting unit is preferably arranged to determine the traveling speed-operation amount-target steering angle characteristic based on the gain characteristic calculated by the gain characteristic computing unit.

With this unique arrangement, the intrinsic characteristic acquiring unit acquires the gain characteristic as the intrinsic characteristic related to the turning behavior of the marine vessel by calculating the yaw rate gain for the steering angle. Since the gain characteristic defines the relationship between the yaw rate gain and the traveling speed, the traveling speed-operation amount-target steering angle characteristic can be properly determined based on the intrinsic characteristic of the marine vessel by using the gain characteristic.

In this case, the target marine vessel maneuvering characteristic is preferably a characteristic defining a target yaw rate gain with respect to the traveling speed of the marine vessel and the operation amount of the operational unit.

The intrinsic characteristic acquiring unit preferably includes a steering angle history characteristic computing unit arranged to calculate a steering angle history characteristic defining a relationship between a steering angle history of the steering unit and the traveling speed of the marine vessel. In this case, the steering angle characteristic setting unit is preferably arranged to determine the traveling speed-operation amount-target steering angle characteristic based on the steering angle history characteristic calculated by the steering angle history characteristic computing unit.

During the travel of the marine vessel, the operator operates the operational unit so that the marine vessel exhibits a desired turning behavior (e.g., a desired yaw rate). Where the operator desires to turn the marine vessel at a constant yaw rate irrespective of the marine vessel traveling speed, for example, the relationship between the steering angle history and the traveling speed indirectly represents a turning characteristic (a relationship between the steering angle and the yaw rate) intrinsic to the marine vessel with respect to the marine vessel traveling speed. That is, the intrinsic characteristic of the marine vessel can be indirectly acquired by calculating the steering angle history characteristic. Therefore, the traveling speed-operation amount-target steering angle characteristic can be determined for the target marine vessel maneuvering characteristic based on the steering angle history characteristic.

The steering angle history characteristic computing unit preferably includes a maximum steering angle characteristic computing unit arranged to calculate a maximum steering angle characteristic defining a relationship between a maximum steering angle of the steering unit and the traveling speed of the marine vessel.

During the travel of the marine vessel, the operator operates the operational unit so that the marine vessel exhibits a desired turning behavior (e.g., a desired yaw rate) at different traveling speeds. Therefore, maximum steering angles observed at the different traveling speeds are a result of the operator operating the operational unit to obtain the desired turning behavior at the traveling speeds. Accordingly, the maximum steering angle characteristic supposedly conforms to a turning behavior characteristic desired by the operator. With the use of the maximum steering angle characteristic, the traveling speed-operation amount-target steering angle characteristic can be properly determined for the target marine vessel maneuvering characteristic.

The steering angle characteristic setting unit preferably includes a unit arranged to correlate a maximum operation amount of the operational unit with the maximum steering angle of the maximum steering angle characteristic according to the traveling speed of the marine vessel.

With this unique arrangement, the maximum operation amount of the operational unit is correlated with the maximum steering angle at each of the different traveling speeds. As a result, the desired turning behavior can be provided at any traveling speed by operating the operational unit to the maximum operation amount. Thus, the desired marine vessel maneuvering characteristic (target marine vessel maneuvering characteristic) can be achieved.

In this case, the target marine vessel maneuvering characteristic is a characteristic which provides the desired turning behavior at any traveling speed when the operational unit is operated to the maximum operation amount.

The marine vessel running controlling apparatus preferably further includes a target marine vessel maneuvering characteristic setting unit arranged to determine the target marine vessel maneuvering characteristic. In this case, the steering angle characteristic setting unit is preferably arranged to determine the traveling speed-operation amount-target steering angle characteristic so as to achieve the target marine vessel maneuvering characteristic determined by the target marine vessel maneuvering characteristic setting unit.

With this unique arrangement, the target marine vessel maneuvering characteristic, which defines the turning behavior with respect to the traveling speed of the marine vessel and the operation amount of the operational unit, is determined by the target marine vessel maneuvering characteristic setting unit, and the traveling speed-operation amount-target steering angle characteristic is determined based on the intrinsic characteristic of the marine vessel so as to achieve the target marine vessel maneuvering characteristic.

By properly determining the target marine vessel maneuvering characteristic, the relationship among the traveling speed of the marine vessel, the operation amount of the operational unit and the turning behavior can be adapted for the operator's preference. As a result, the marine vessel maneuverability is significantly improved, thereby facilitating the operation of the operational unit in the higher speed traveling state and in the lower speed traveling state. Therefore, even an unskilled operator having a poor marine vessel maneuvering skill can properly control the behavior of the marine vessel irrespective of the traveling speed.

More specifically, where a relationship between the steering angle and the turning behavior varies depending on the traveling speed, for example, the target marine vessel maneuvering characteristic is preferably determined such that a relationship between the turning behavior and the operation amount of the operational unit is kept constant irrespective of the marine vessel traveling speed. Thus, the operator can easily and intuitively understand the relationship between the turning behavior and the operation amount of the operational unit over the entire speed range. Therefore, even the unskilled operator can easily maneuver the marine vessel.

Further, the target steering angle for the operation amount can be set such that a turning amount of the marine vessel with respect to the operation amount of the operational unit is increased in the lower speed range and is reduced in the higher speed range. Thus, the operator can sharply turn the hull with a smaller operation amount of the operational unit in the lower speed range. Even if the operator has a poor operational unit operating skill, the operator can smoothly turn the hull in the higher speed range.

The target marine vessel maneuvering characteristic setting unit preferably includes a target gain setting unit arranged to determine a target gain of the yaw rate of the marine vessel with respect to the operation amount of the operational unit. The target gain setting unit is preferably arranged to variably set the target gain according to the traveling speed of the marine vessel.

The target marine vessel maneuvering characteristic setting unit preferably includes a maximum operation amount setting unit arranged to determine the maximum operation amount of the operational unit. The maximum operation amount setting unit is preferably arranged to variably set the maximum operation amount of the operational unit according to the traveling speed of the marine vessel. In this case, the maximum operation amount is defined as an operation amount that corresponds to the maximum steering angle. By operating the operational unit to the maximum operation amount, the steering unit is driven to the maximum steering angle which depends on the traveling speed. The maximum operation amount may be smaller than an upper limit operation amount of the operational unit. In this case, the desired turning behavior can be provided without operating the operational unit to the upper limit operation amount.

The marine vessel running controlling apparatus preferably further includes a target marine vessel maneuvering characteristic inputting unit which receives an input for setting the target marine vessel maneuvering characteristic. In this case, the target marine vessel maneuvering characteristic setting unit is preferably arranged to set the target marine vessel maneuvering characteristic according to the input from the target marine vessel maneuvering characteristic inputting unit.

With this unique arrangement, the desired target marine vessel maneuvering characteristic is input from the target characteristic inputting unit. Therefore, the target marine vessel maneuvering characteristic is set according to the preference of each marine vessel operator. Thus, the marine vessel maneuvering characteristic can be more closely adapted to the operator's preference, permitting even the unskilled operator to easily maneuver the marine vessel.

The marine vessel running controlling apparatus preferably further includes a target marine vessel maneuvering characteristic storage unit arranged to store a plurality of target marine vessel maneuvering characteristics. In this case, the target marine vessel maneuvering characteristic inputting unit preferably includes a selecting unit arranged to select one of the target marine vessel maneuvering characteristics stored in the target marine vessel maneuvering characteristic storage unit. This unique arrangement permits the selection of one of the stored target marine vessel maneuvering characteristics, thereby facilitating the setting of the target marine vessel maneuvering characteristic.

The steering angle characteristic setting unit preferably includes a steering angle characteristic storage unit arranged to store a plurality of traveling speed-operation amount-target steering angle characteristics corresponding to the respective target marine vessel maneuvering characteristics stored in the target marine vessel maneuvering characteristic storage unit. In this case, the steering angle characteristic setting unit is preferably arranged to read out one of the traveling speed-operation amount-target steering angle characteristics corresponding to the target marine vessel maneuvering characteristic selected by the selecting unit from the steering angle characteristic storage unit. This unique arrangement obviates the calculation of the traveling speed-operation amount-target steering angle characteristic, thereby alleviating a computation load on a computing device.

The control unit is preferably arranged to update the control information when the propulsive force generating unit generates a minimum propulsive force. With this unique arrangement, the control information is updated when the propulsive force generating unit generates the minimum propulsive force. Therefore, the operator does not suffer from an unnatural or uncomfortable feeling, because the operator can smoothly acclimate himself to the updated control information.

The marine vessel running controlling apparatus preferably further includes a difference judging unit arranged to judge whether a difference between pre-update control information and post-update control information is less than a predetermined threshold, and an update suspending unit arranged to suspend update of the control information if the difference judging unit judges that the difference is not less than the threshold. With this unique arrangement, the update of the control information is suspended if the difference between the pre-update control information and the post-update control information is significant. This prevents and minimizes an unnatural or uncomfortable feeling which may otherwise be experienced by the operator due to a significant change in the marine vessel maneuvering characteristic. The marine vessel running controlling apparatus may be arranged, for example, to adopt the updated control information on approval by the operator if the difference in control information is significant.

The difference judging unit is preferably arranged to judge whether a variable difference in the intrinsic characteristic acquired by the intrinsic characteristic acquiring unit is less than a predetermined threshold.

The marine vessel running controlling apparatus preferably further includes an inquiry unit arranged to ask the operator whether to permit the control unit to update the control information. With this unique arrangement, the operator is asked whether to permit the update of the control information. Therefore, the operator becomes aware of the change in the marine vessel maneuvering characteristic, and is permitted to decide whether to update the control information.

The marine vessel running controlling apparatus preferably further includes a data number judging unit arranged to judge whether the number of data samples acquired during the travel of the marine vessel satisfies a predetermined number requirement. In this case, the control unit is preferably arranged to update the control information if the data number judging unit judges that the number requirement is satisfied. With this unique arrangement, the control information is not updated until a sufficient number of data samples are collected. Therefore, the updated control information is highly reliable.

The marine vessel running controlling apparatus preferably further includes an update notifying unit arranged to notify the operator that the control information has been updated. If there is a possibility that the marine vessel maneuvering characteristic is changed due to the update of the control information, the operator is notified of the possibility. This alleviates the unnatural or uncomfortable feeling occurring in the operator due to the change in the characteristic.

Another preferred embodiment of the present invention provides a marine vessel which includes a hull, a propulsive force generating unit arranged to generate a propulsive force to be applied to the hull, a steering unit arranged to turn the hull, and the marine vessel running controlling apparatus described above. With this unique arrangement, the marine vessel has an improved maneuvering characteristic.

The marine vessel may be a relatively small-scale marine vessel such as a cruiser, a fishing boat, a water jet or a watercraft, or other suitable vessel or vehicle.

The propulsive force generating unit may be in the form of an outboard motor, an inboard/outboard motor (a stern drive or an inboard motor/outboard drive), an inboard motor, a water jet drive, or other suitable motor or drive. The outboard motor preferably includes a propulsion unit provided outboard of the vessel and having a motor (engine) and a propulsive force generating member (propeller), and a steering mechanism which horizontally turns the entire propulsion unit with respect to the hull. The inboard/outboard motor preferably includes a motor provided inboard of the vessel, and a drive unit provided outboard and having a propulsive force generating member and a steering mechanism. The inboard motor preferably includes a motor and a drive unit provided inboard, and a propeller shaft extending outboard from the drive unit. In this case, a steering mechanism is preferably separately provided. The water jet drive is preferably arranged such that water sucked from the bottom of the marine vessel is accelerated by a pump and ejected from an ejection nozzle provided at the stern of the marine vessel to provide a propulsive force. In this case, the steering mechanism preferably includes the ejection nozzle and a mechanism arranged to turn the ejection nozzle in a horizontal plane.

Other elements, features, steps, characteristics and advantages of the present invention will become more apparent from the following detailed description of the preferred embodiments with reference to the attached drawings.

DETAILED DESCRIPTION OF PREFERRED EMBODIMENTS

First Preferred Embodiment

Figure 1:
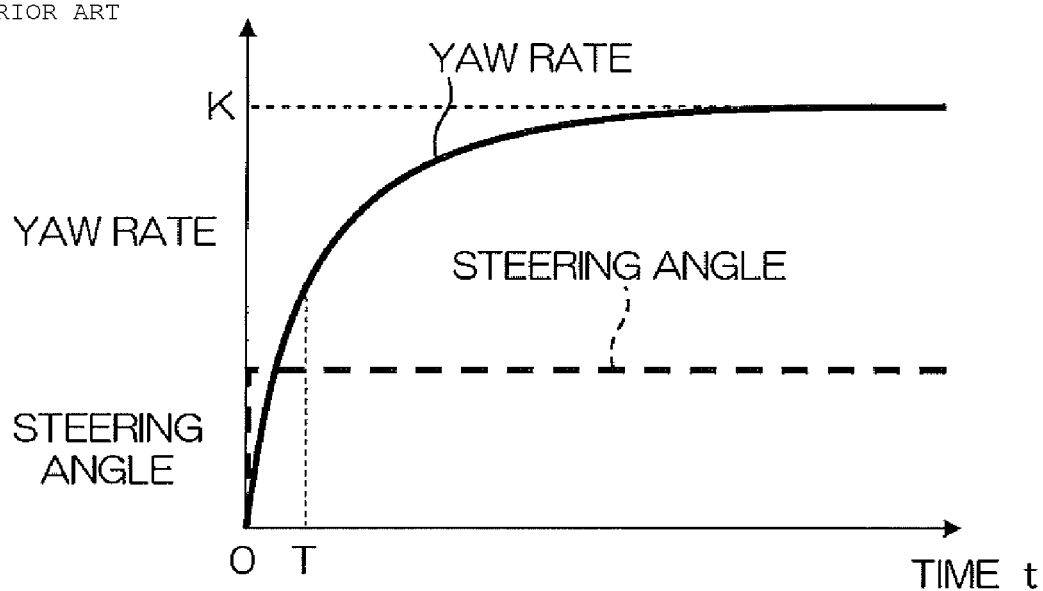
FIG. 1 is a characteristic diagram for explaining a time-related change in yaw rate when a steering angle is changed stepwise at a predetermined traveling speed.
Figure 2:
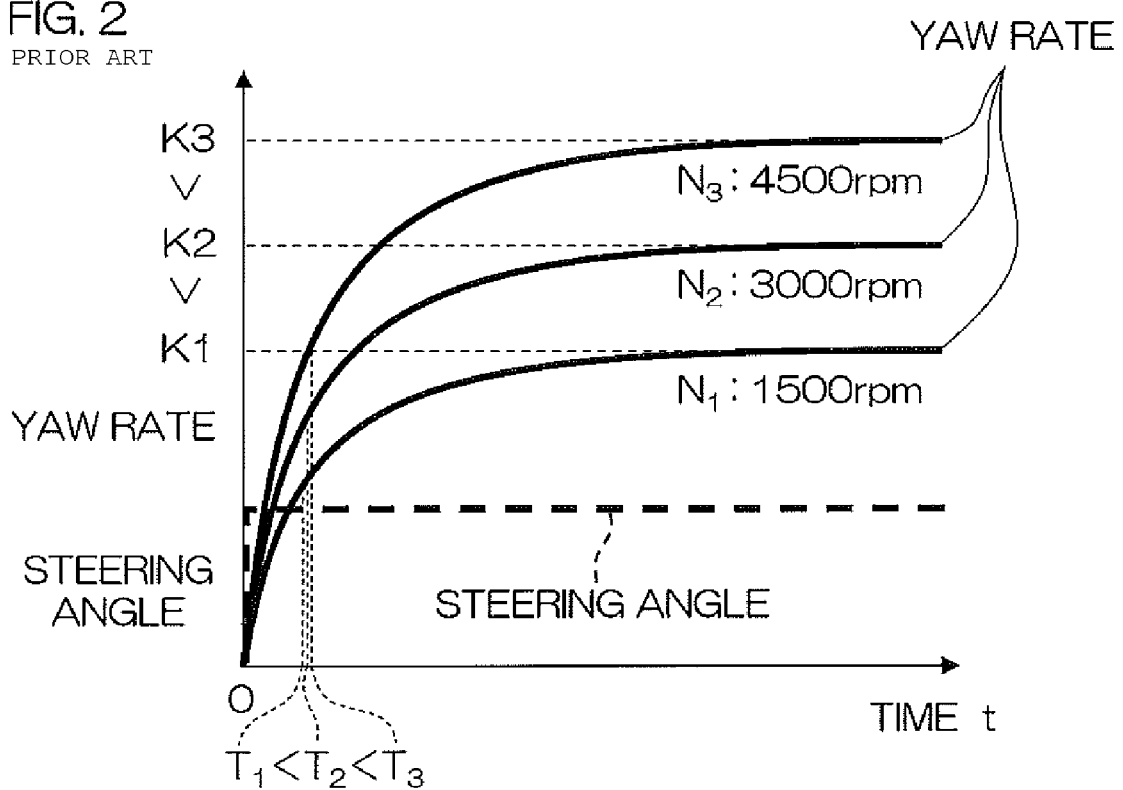
FIG. 2 is a diagram showing a comparison between time-related changes in yaw rate at different traveling speeds.
Figure 3:
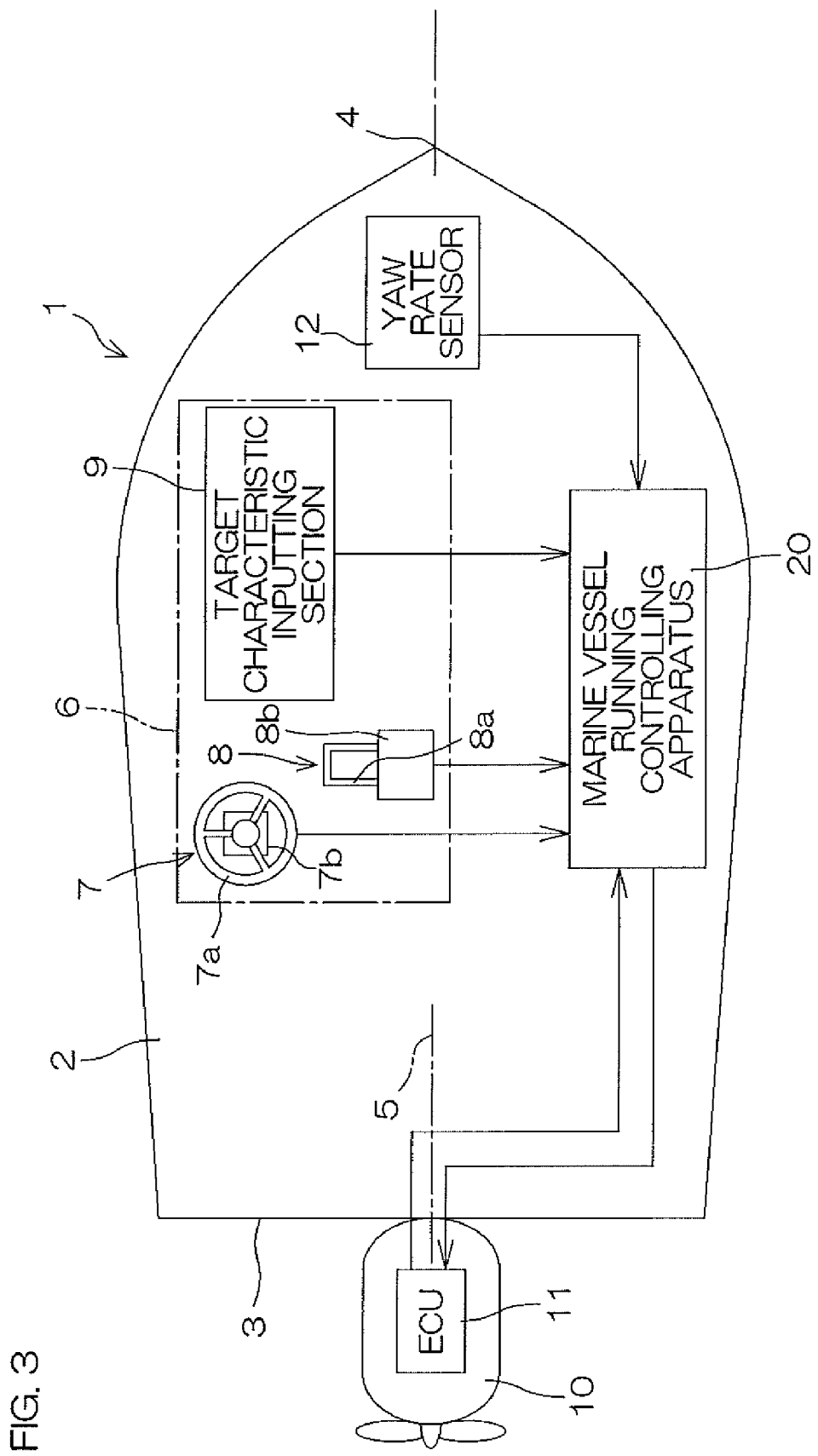
FIG. 3 is a schematic diagram for explaining the construction of a marine vessel according to one preferred embodiment of the present invention.

FIG. 3 is a schematic diagram for explaining the construction of a marine vessel 1 according to a first preferred embodiment of the present invention. The marine vessel 1 is preferably a relatively small-scale marine vessel, such as a cruiser or a boat. The marine vessel 1 includes a hull 2, and an outboard motor 10 (propulsive force generating unit) attached to a stern (transom) 3 of the hull 2. The outboard motor 10 is positioned on a center line 5 of the hull 2 extending through the stern 3 and a bow 4 of the hull 2. An electronic control unit 11 (hereinafter referred to as "outboard motor ECU 11") is incorporated in the outboard motor 10.

A control console 6 for controlling the marine vessel 1 is provided on the hull 2. The control console 6 includes, for example, a steering operational section 7 for performing a steering control operation, a throttle operational section 8 for controlling the output of the outboard motor 10, and a target characteristic inputting section 9 (a target marine vessel maneuvering characteristic inputting unit and a target characteristic change inputting unit). The steering operational section 7 includes a rotatable steering wheel 7a as a steering operational member (operational unit) to be operated by an operator of the marine vessel, and an operation angle detecting section 7b such as a potentiometer for detecting the operation amount (operation angle) of the steering wheel 7a. The throttle operational section 8 includes a remote control lever (throttle lever) 8a as a throttle operational member, and a lever position detecting section 8b such as a potentiometer for detecting the operation position of the remote control lever 8a. The target characteristic inputting section 9 is used to input a target characteristic for a marine vessel maneuvering characteristic (target marine vessel maneuvering characteristic) which defines a relationship among the traveling speed of the marine vessel 1, the operation angle of the steering wheel 7a and the turning behavior (yaw rate) of the marine vessel 1.

Input signals indicating the operation amounts of the operational sections 7, 8 provided on the control console 6 and an input signal from the target characteristic inputting section 9 are input as electric signals to a marine vessel running controlling apparatus 20. These electric signals are transmitted to the marine vessel running controlling apparatus 20 from the control console 6, for example, via a LAN (local area network, hereinafter referred to as "inboard LAN") provided in the hull 2. The marine vessel running controlling apparatus 20 is an electronic control unit (ECU) including a microcomputer, and functions as a propulsive force controlling apparatus for propulsive force control and as a steering controlling apparatus for steering control.

The marine vessel running controlling apparatus 20 communicates with the outboard motor ECU 11 via the inboard LAN. More specifically, the marine vessel running controlling apparatus 20 acquires the engine speed (rpm) of the outboard motor 10, a steering angle indicating the orientation of the outboard motor 10, an engine throttle opening degree, and the shift position of the outboard motor 10 (forward drive, neutral, or reverse drive position) from the outboard motor ECU 11. Since the engine speed corresponds to the traveling speed of the marine vessel 1, the engine speed will hereinafter be regarded as synonymous with the traveling speed of the marine vessel.

A yaw rate sensor 12 (yaw rate measuring unit) for detecting the turning speed (yaw rate) of the marine vessel 1 is provided on the hull 2. A yaw rate signal output from the yaw rate sensor 12 is input as an electric signal to the marine vessel running controlling apparatus 20 via the inboard LAN. Instead of the yaw rate sensor, a GPS sensor or an azimuth angle sensor may be used as the yaw rate measuring unit.

The marine vessel running controlling apparatus 20 applies data including a target steering angle, a target throttle opening degree, a target shift position (forward drive, neutral, or reverse drive position) and a target trim angle to the outboard motor ECU 11.

The marine vessel running controlling apparatus 20 determines the target steering angle of the outboard motor 10 according to the operation angle of the steering wheel 7a. Further, the marine vessel running controlling apparatus 20 determines the target throttle opening degree and the target shift position for the outboard motor 10 according to the operation amount and direction of the remote control lever 8a (i.e., a lever position). The remote control lever 8a can be inclined forward and reverse. When the operator inclines the remote control lever 8a forward from a neutral position by a certain amount, the marine vessel running controlling apparatus 20 sets the target shift position of the outboard motor 10 at the forward drive position. When the operator inclines the remote control lever 8a further forward, the marine vessel running controlling apparatus 20 sets the target throttle opening degree of the outboard motor 10 according to the operation amount of the remote control lever 8a. On the other hand, when the operator inclines the remote control lever 8a reverse by a certain amount, the marine vessel running controlling apparatus 20 sets the target shift position of the outboard motor 10 at the reverse drive position. When the operator inclines the remote control lever 8a further reverse, the marine vessel running controlling apparatus 20 sets the target throttle opening degree of the outboard motor 10 according to the operation amount of the remote control lever 8a.

Figure 4:
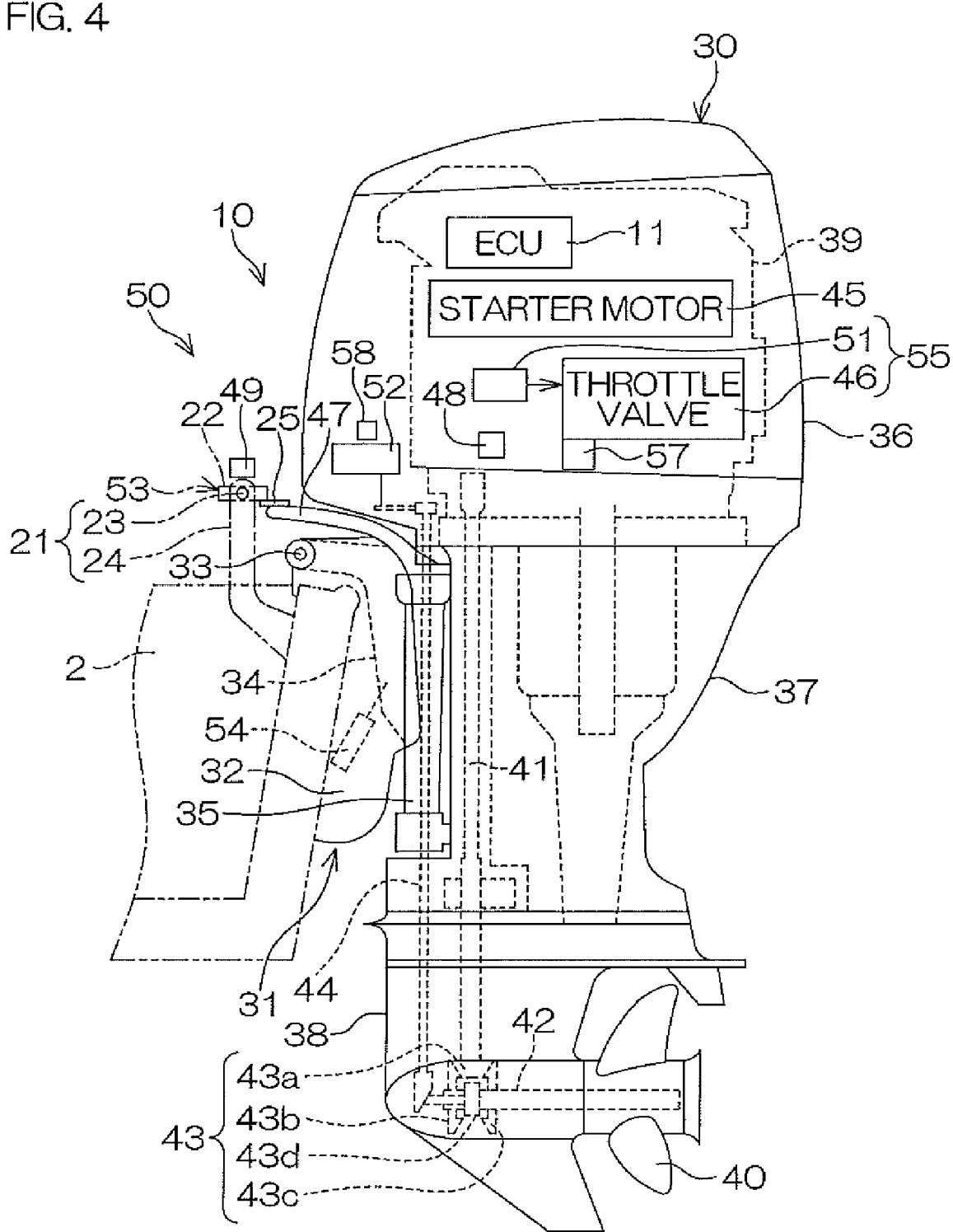
FIG. 4 is a schematic sectional view for explaining the construction of an outboard motor.

FIG. 4 is a schematic sectional view for explaining the construction of the outboard motor 10. The outboard motor 10 includes a propulsion unit 30 (propulsion system), and an attachment mechanism 31 for attaching the propulsion unit 30 to the hull 2. The attachment mechanism 31 includes a clamp bracket 32 detachably fixed to the transom of the hull 2, and a swivel bracket 34 connected to the clamp bracket 32 pivotally about a tilt shaft 33 (horizontal pivot axis). The propulsion unit 30 is attached to the swivel bracket 34 pivotally about a steering shaft 35. Thus, the steering angle (which is equivalent to an angle defined by the direction of the propulsive force with respect to the center line 5 of the hull 2) is changed by pivoting the propulsion unit 30 about the steering shaft 35. Further, the trim angle of the propulsion unit 30 (which is equivalent to an angle defined by the direction of the propulsive force with respect to a horizontal plane) is changed by pivoting the swivel bracket 34 about the tilt shaft 33.

The propulsion unit 30 has a housing which includes a top cowling 36, an upper case 37, and a lower case 38. An engine 39 is provided as a drive source in the top cowling 36 with an axis of a crank shaft thereof extending vertically. A drive shaft 41 for power transmission is coupled to a lower end of the crank shaft of the engine 39, and vertically extends through the upper case 37 into the lower case 38.

A propeller 40 (propulsive force generating member) is rotatably attached to a lower rear portion of the lower case 38. A propeller shaft 42 (rotation shaft) of the propeller 40 extends horizontally in the lower case 38. The rotation of the drive shaft 41 is transmitted to the propeller shaft 42 via a shift mechanism 43 (clutch mechanism).

The shift mechanism 43 includes a beveled drive gear 43a fixed to a lower end of the drive shaft 41, a beveled forward drive gear 43b rotatably provided on the propeller shaft 42, a beveled reverse drive gear 43c rotatably provided on the propeller shaft 42, and a dog clutch 43d provided between the forward drive gear 43b and the reverse drive gear 43c.

The forward drive gear 43b is meshed with the drive gear 43a from a forward side, and the reverse drive gear 43c is meshed with the drive gear 43a from a reverse side. Therefore, the forward drive gear 43b and the reverse drive gear 43c rotate in opposite directions when being engaged with the drive gear 43a.

On the other hand, the dog clutch 43d is in spline engagement with the propeller shaft 42. That is, the dog clutch 43d is axially slidable with respect to the propeller shaft 42, but is not rotatable relative to the propeller shaft 42. Therefore, the dog clutch 43d is rotatable together with the propeller shaft 42.

The dog clutch 43d is slidable on the propeller shaft 42 by pivotal movement of a shift rod 44 that extends vertically parallel to the drive shaft 41 and is rotatable about its axis. Thus, the shift position of the dog clutch 43d is controlled to be set at a forward drive position at which it is engaged with the forward drive gear 43b, at a reverse drive position at which it is engaged with the reverse drive gear 43c, or at a neutral position at which it is not engaged with either the forward drive gear 43b or the reverse drive gear 43c.

When the dog clutch 43d is in the forward drive position, the rotation of the forward drive gear 43b is transmitted to the propeller shaft 42 via the dog clutch 43d with virtually no slippage between the dog clutch 43d and the propeller shaft 42. Thus, the propeller 40 is rotated in one direction (in a forward drive direction) to generate a propulsive force in a direction for moving the hull 2 forward. On the other hand, when the dog clutch 43d is in the reverse drive position, the rotation of the reverse drive gear 43c is transmitted to the propeller shaft 42 via the dog clutch 43d with virtually no slippage between the dog clutch 43d and the propeller shaft 42. The reverse drive gear 43c is rotated in a direction opposite to that of the forward drive gear 43b. Therefore, the propeller 40 is rotated in an opposite direction (in a reverse drive direction) to generate a propulsive force in a direction for moving the hull 2 in reverse. When the dog clutch 43d is in the neutral position, the rotation of the drive shaft 41 is not transmitted to the propeller shaft 42. That is, transmission of a driving force between the engine 39 and the propeller 40 is prevented, so that no propulsive force is generated in either of the forward and reverse directions.

Without provision of a speed change gear in the outboard motor 10, the propeller 40 is rotated according to the rotational speed of the engine 39 when the dog clutch 43d is in the forward drive position or the reverse drive position.

A starter motor 45 for starting the engine 39 is connected to the engine 39. The starter motor 45 is controlled by the outboard motor ECU 11. The propulsion unit 30 further includes a throttle actuator 51 for actuating a throttle valve 46 of the engine 39 in order to change the throttle opening degree to change the intake air amount of the engine 39. The throttle actuator 51 may be an electric motor. The throttle actuator 51 and the throttle valve 46 define an electric throttle 55.

The operation of the throttle actuator 51 is controlled by the outboard motor ECU 11. The opening degree of the throttle valve 46 (throttle opening degree) is detected by a throttle opening degree sensor 57, and an output of the throttle opening degree sensor 57 is applied to the outboard motor ECU 11. The engine 39 further includes an engine speed detecting section 48 (a speed measuring unit and an engine speed measuring unit) for detecting the rotation of the crank shaft to detect the rotational speed N of the engine 39. The engine speed detecting section 48 may be provided in the marine vessel running controlling apparatus 20.

A shift actuator 52 (clutch actuator) for changing the shift position of the dog clutch 43d is provided in relation to the shift rod 44. The shift actuator 52 is, for example, an electric motor, and its operation is controlled by the outboard motor ECU 11. A shift position sensor 58 for detecting the shift position of the dog clutch 43d is provided in the engine 39. The shift position detected by the shift position sensor 58 is applied to the outboard motor ECU 11.

Further, a trim actuator 54 (tilt trim actuator) which includes, for example, a hydraulic cylinder and is controlled by the outboard motor ECU 11, is provided between the clamp bracket 32 and the swivel bracket 34. The trim actuator 54 pivots the propulsion unit 30 about the tilt shaft 33 by pivoting the swivel bracket 34 about the tilt shaft 33. Thus, the trim angle of the propulsion unit 30 is changed.

A steering actuator 53 which is controlled by the outboard motor ECU 11 is connected to a steering rod 47 fixed to the propulsion unit 30.

Figure 5:
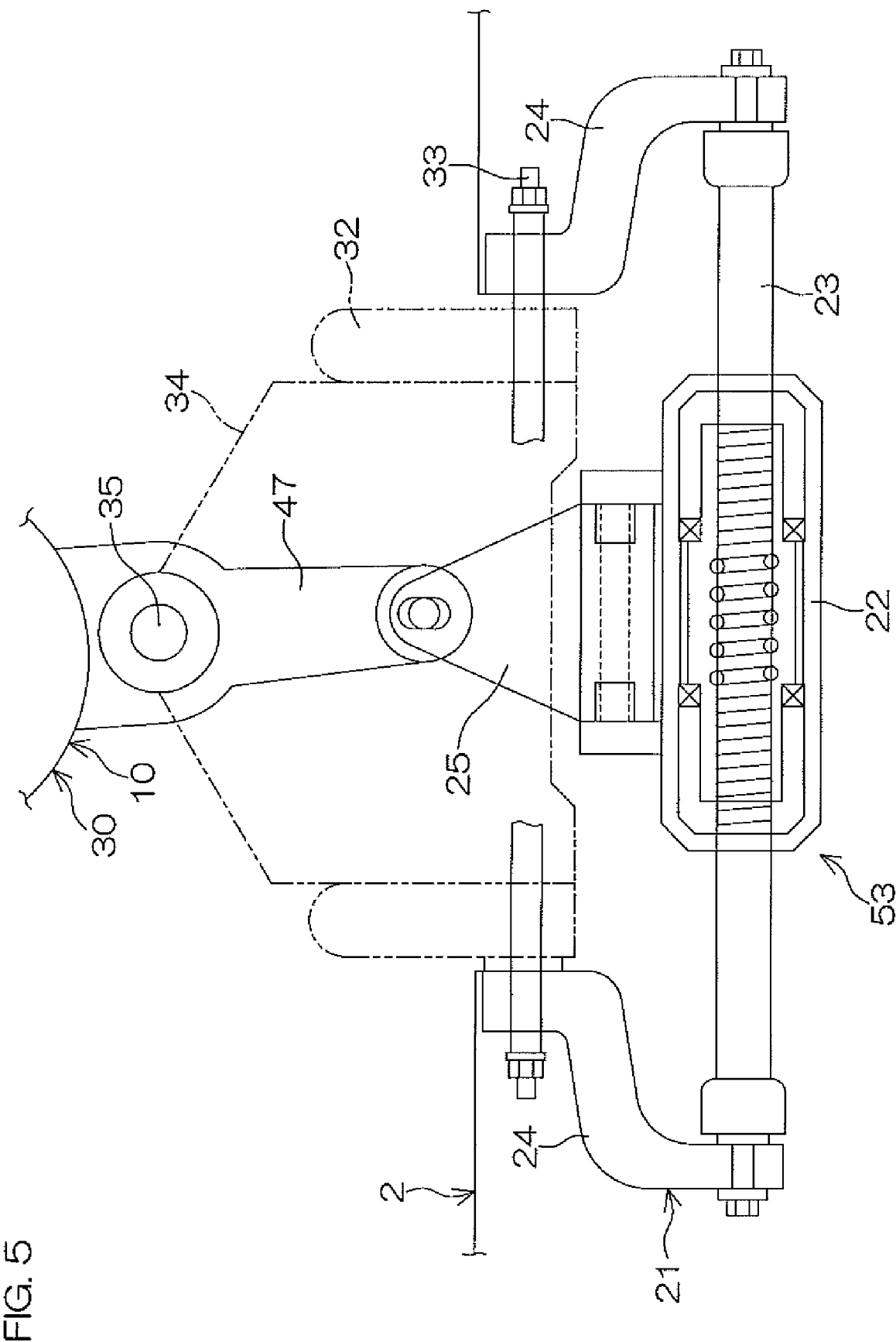
FIG. 5 is a schematic diagram illustrating a steering actuator.

FIG. 5 is a schematic diagram illustrating the steering actuator 53.

The steering actuator 53 includes a frame 21, and a DD (direct drive) electric motor 22 supported by the frame 21. The frame 21 includes a threaded rod 23 extending parallel or substantially parallel to the transom of the hull 2, and a pair of support members 24 arranged to fix opposite ends of the threaded rod 23 to the transom of the hull 2. The electric motor 22 is attached to the threaded rod 23, and is slidable along the threaded rod 23. More specifically, a ball nut is in threading engagement with the threaded rod 23, and a rotor of the electric motor 22 is connected to the ball nut. By driving the electric motor 22 to rotate the rotor of the electric motor 22, the ball nut is rotated about the threaded rod 23. Thus, the ball nut is slid longitudinally of the threaded rod 23, whereby the electric motor 22 is slid along the threaded rod 23.

Further, the electric motor 22 is connected to the steering rod 47 via a connection bracket 25. Therefore, when the outboard motor ECU 11 slides the electric motor 22 along the threaded rod 23 by a distance corresponding to the target steering angle, the outboard motor 10 (propulsion unit 30) is pivoted about the steering shaft 35 by the target steering angle for the steering operation. The steering actuator 53, the steering rod 47 and the steering shaft 35 define an electric steering mechanism 50 (steering unit). The steering mechanism 50 includes a steering angle sensor 49 for detecting the steering angle (see FIG. 4).

Alternatively, the steering actuator 53 may be arranged to pivot the outboard motor 10 by using a hydraulic cylinder connected to an electric pump as a hydraulic pressure source.

Figure 6:
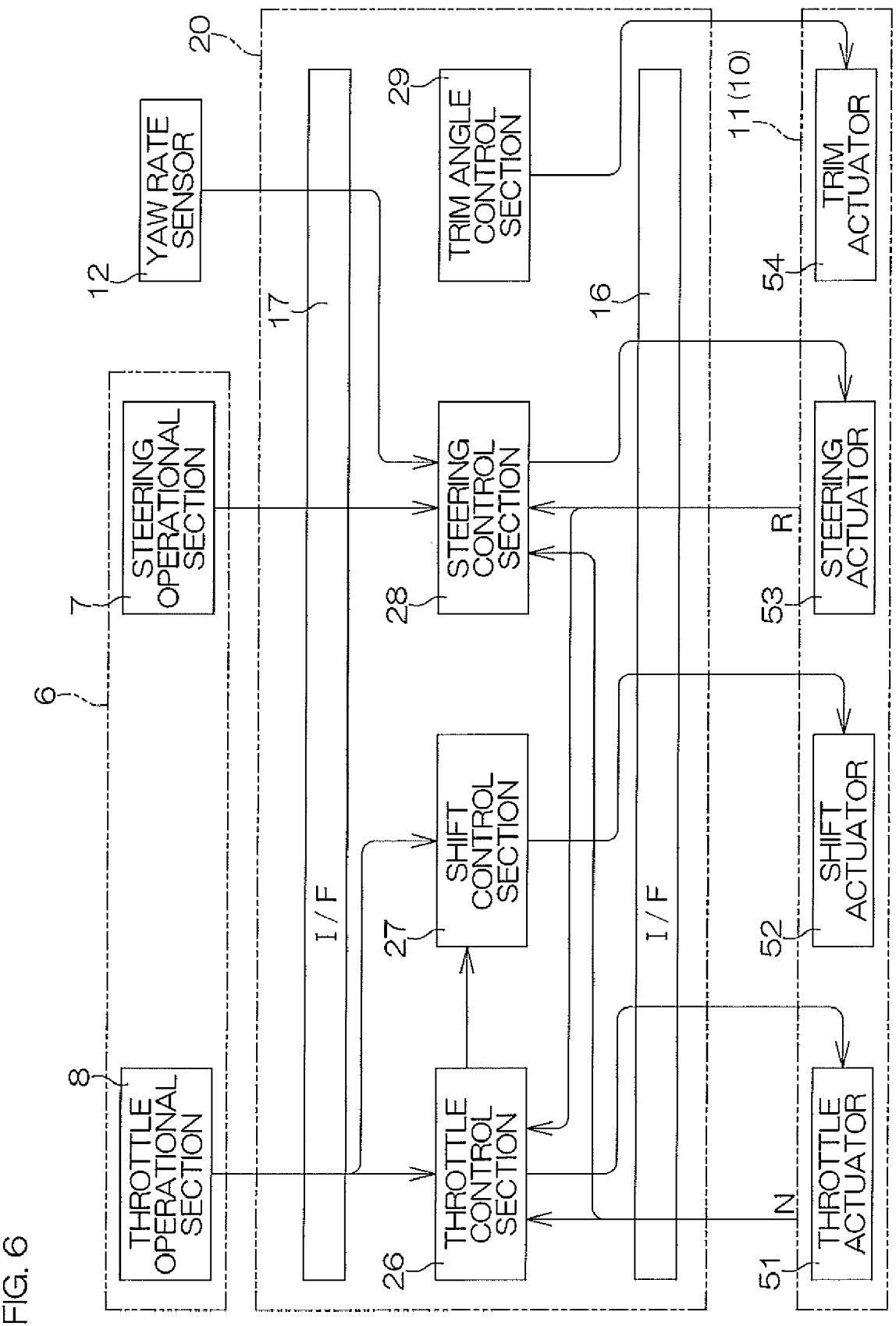
FIG. 6 is a block diagram for explaining an arrangement for marine vessel running control.

FIG. 6 is a block diagram for explaining an arrangement for marine vessel running control. The marine vessel running controlling apparatus 20 includes a throttle control section 26, a shift control section 27, a steering control section 28 (control unit) and a trim angle control section 29. The throttle control section 26 generates a target throttle opening degree command value for controlling the throttle actuator 51. The shift control section 27 generates a target shift position command value for controlling the shift actuator 52. The steering control section 28 generates a target steering angle command value for controlling the steering actuator 53. The trim angle control section 29 generates a target trim angle command value for controlling the trim actuator 54. Functions of these control sections 26 to 29 may be implemented on a software basis by the microcomputer provided in the marine vessel running controlling apparatus 20.

The command values generated by the control sections 26 to 29 are applied to the outboard motor ECU 11 via an interface (I/F) 16. The outboard motor ECU 11 controls the actuators 51 to 54 based on the applied command signals.

The outboard motor ECU 11 applies the engine speed N detected by the engine speed detecting section 48 and the steering angle R detected by the steering angle sensor 49 to the marine vessel running controlling apparatus 20 via the interface 16. The engine speed N and the steering angle R are applied to the throttle control section 26 and the steering control section 28. Though not shown, the throttle opening degree detected by the throttle opening degree sensor 57 and the shift position detected by the shift position sensor 58 are applied to the throttle control section 26 and the steering control section 28.

On the other hand, the signals from the steering operational section 7, the throttle operational section 8 and the yaw rate sensor 12 are input to the marine vessel running controlling apparatus 20 via an interface (I/F) 17. Though not shown, the signal of the target characteristic inputting section 9 is also input to the marine vessel running controlling apparatus 20. The input signal from the steering operational section 7 is input to the steering control section 28 for calculating the target steering angle. The input signals from the throttle operational section 8, i.e., a signal indicating the magnitude of the target propulsive force and a signal indicating the direction of the target propulsive force, are input to the throttle control section 26 and the shift control section 27, respectively. The yaw rate detected by the yaw rate sensor 12 is input to the steering control section 28.

Further, an intermittent shift command signal is applied to the shift control section 27 from the throttle control section 26. The intermittent shift command signal causes the shift control section 27 to perform an intermittent shift operation to alternately shift the dog clutch 43d between the forward drive position and the neutral position or between the reverse drive position and the neutral position when the engine speed for the target propulsive force is lower than an idling speed of the engine 39 (a lower limit engine speed, e.g., 700 rpm). The intermittent shift operation permits generation of a propulsive force for an engine speed lower than the idling speed.

Figure 7:
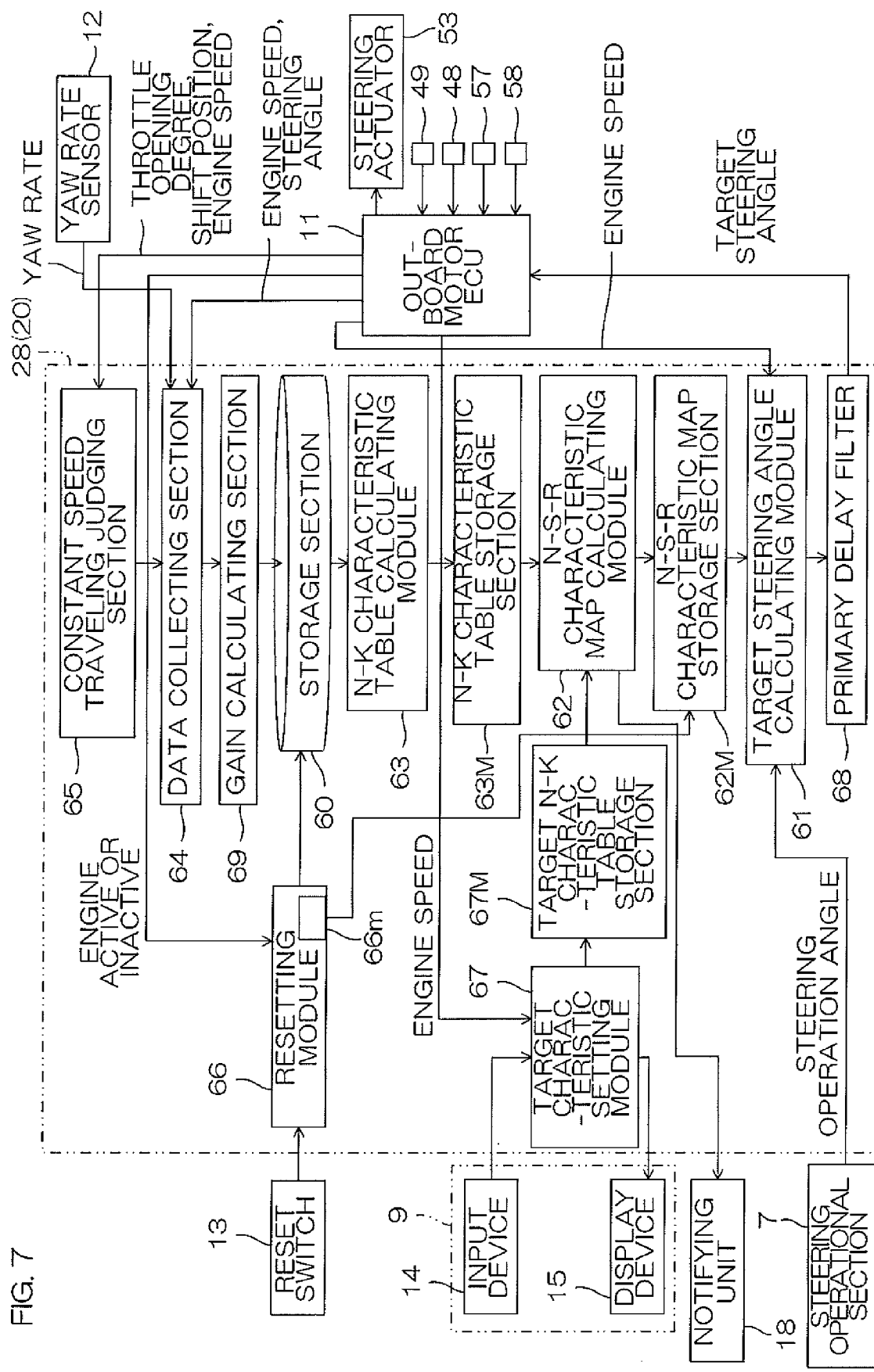
FIG. 7 is a block diagram for explaining an arrangement for a control operation to be performed by a steering control section.

FIG. 7 is a block diagram for explaining the steering control section 28 in further detail. The steering control section 28 includes a target steering angle calculating module 61, an N-S-R characteristic map calculating module 62, an N-K characteristic table calculating module 63, a gain calculating section 69, a data collecting section 64 and a constant speed traveling judging section 65. The target steering angle calculating module 61 functions as a target steering angle setting unit, which calculates a target steering angle for an operation angle of the steering wheel 7a according to an engine speed. The N-S-R characteristic map calculating module 62 functions as a steering angle characteristic setting unit, which calculates a map of an N-S-R characteristic. The N-S-R characteristic defines a relationship among the engine speed N, the operation angle S and the target steering angle R, and provides control information related to the target steering angle with respect to the operation angle according to the engine speed. The N-K characteristic table calculating module 63 functions as a gain characteristic computing unit, which calculates a table of an engine speed N-gain K characteristic (or a gain characteristic, hereinafter referred to as "N-K characteristic") defining an actual relationship between the engine speed N and a gain K of a turning behavior (yaw rate) with respect to the steering angle. The N-K characteristic is a characteristic intrinsic to each marine vessel (intrinsic characteristic). The gain calculating section 69 functions as a gain computing unit, which calculates the gain for the steering angle based on the measured yaw rate. The data collecting section 64 collects actual data of the yaw rate, the engine speed and the steering angle from the yaw rate sensor 12 and the outboard motor ECU 11 for the calculation of the N-K characteristic. The constant speed traveling judging section 65 functions as a constant speed traveling judging unit, which acquires actual data of the throttle opening degree, the shift position and the engine speed from the outboard motor ECU 11 and judges whether the marine vessel 1 is in a constant speed traveling state.

A storage section 60 for storing learning data of the gain and the engine speed is provided in a memory provided in the steering control section 28. The gain is herein defined as a gain calculated based on collected actual data of the yaw rate, the engine speed and the steering angle. The steering control section 28 further includes a resetting module 66, a target characteristic setting module 67 (a target marine vessel maneuvering characteristic setting unit, a target gain setting unit and a target characteristic line updating unit). The resetting module 66 resets the learning data stored in the storage section 60. The target characteristic setting module 67 determines a table of a target characteristic for the N-K characteristic (a target marine vessel maneuvering characteristic, hereinafter referred to as "target N-K characteristic") which defines a target gain with respect to the engine speed and the operation angle. The steering control section 28 further includes a primary delay filter 68 which prevents a sudden change in the turning behavior which may otherwise occur due to a sudden change in the target steering angle when the N-S-R characteristic is changed. In this preferred embodiment, the data collecting section 64, the gain calculating section 69, the N-K characteristic table calculating module 63 and the like define an intrinsic characteristic acquiring unit. The intrinsic characteristic acquiring unit may include the engine speed detecting section 48 and the yaw rate sensor 12.

In addition to the storage section 60, an N-S-R characteristic map storage section 62M (steering angle characteristic storage unit) for storing the N-S-R characteristic map, an N-K characteristic table storage section 63M for storing the N-K characteristic table, and a target N-K characteristic table storage section 67M (a target characteristic storage unit and a target marine vessel maneuvering characteristic storage unit) for storing the target N-K characteristic table (target N-K characteristic line) are provided in the memory of the steering control section 28. The N-K characteristic table calculating module 63 stores the calculated N-K characteristic table in the N-K characteristic table storage section 63M. Further, the target characteristic setting module 67 stores the target N-K characteristic table in the target N-K characteristic table storage section 67M. The N-S-R characteristic map calculating module 62 calculates the N-S-R characteristic map based on the N-K characteristic table stored in the N-K characteristic table storage section 63M and the target N-K characteristic table stored in the target N-K characteristic table storage section 67M, and stores the calculated N-S-R characteristic map in the N-S-R characteristic map storage section 62M. Further, the target steering angle calculating module 61 calculates the target steering angle for the operation angle at the actual engine speed based on the N-S-R characteristic map stored in the N-S-R characteristic map storage section 62M.

At least the storage section 60, the N-S-R characteristic map storage section 62M and the target N-K characteristic table storage section 67M, for example, are preferably nonvolatile storage media.

Figure 8:
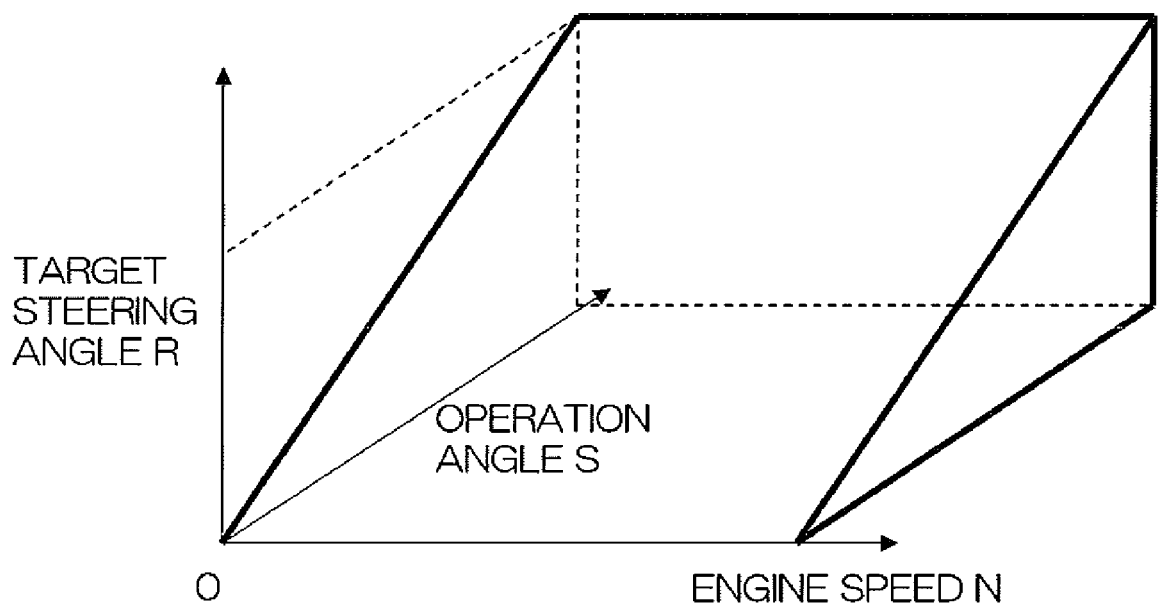
FIG. 8 is a diagram showing an initial N-S-R characteristic map defined such that a relationship between an operation angle and a target steering angle is constant irrespective of an engine speed.

An initial N-S-R characteristic map (see FIG. 8) defined such that a relationship between the operation angle and the target steering angle is constant irrespective of the engine speed is preferably stored in the N-S-R characteristic map storage section 62M. Further, an initial target N-K characteristic (see a middle graph in FIG. 18) defined such that the target gain is constant irrespective of the engine speed, for example, is preferably stored in the target N-K characteristic table storage section 67M.

Though not shown in FIG. 3, a reset switch 13 arranged to apply a reset signal to the resetting module 66 and a notifying unit 18 (update notifying unit) for notifying the operator that the marine vessel maneuvering characteristic has been changed are preferably provided on the control console 6. The notifying unit 18 may be a lamp such as an LED, or a sound generating device (e.g., a buzzer or a speaker) which generates an alarm or an audible notification message. The target characteristic inputting section 9 provided on the control console 6 provides a man-machine interface for the target characteristic setting module 67, and includes an input device 14 and a display device 15. The display device 15 is preferably a two-dimensional display device such as a liquid crystal display panel or a CRT. The display device 15 may double as the notifying unit 18. Further, the input device 14 may include, for example, a pointing device (e.g., a mouse, a track ball, or a touch panel) for performing an inputting operation on a target N-K characteristic line (to be described later) displayed on the display device 15, a key inputting section and the like. The target characteristic setting module 67 determines the target N-K characteristic according to the input operation performed on the target characteristic inputting section 9 as will be described later.

If the following three conditions are all satisfied when the outboard motor 10 is driven to run the marine vessel 1, the constant speed traveling judging section 65 judges that the marine vessel 1 is in the constant speed traveling state.
Condition 1: The shift position of the outboard motor 10 is set at the forward drive position or at the reverse drive position.
Condition 2: The throttle opening degree is constant.
Condition 3: The engine speed varies only within a predetermined range (e.g., ±100 rpm) or is generally constant.

A speed sensor for detecting the traveling speed of the marine vessel 1 may be provided on the hull 2. In this case, if the traveling speed detected by the speed sensor is generally constant, the constant speed traveling judging section 65 judges that the marine vessel 1 is in the constant speed traveling state.

In a period during which the constant speed traveling judging section 65 judges that the marine vessel 1 is in the constant speed traveling state, the data collecting section 64 collects actual data of the yaw rate from the yaw rate sensor 12, and actual data of the engine speed and the steering angle from the outboard motor ECU 11. More specifically, the data collecting section 64 collects a set of time-series data of the yaw rate, the engine speed and the steering angle in a predetermined cycle as will be described later.

The gain calculating section 69 calculates a yaw rate gain for the steering angle in each of collected data sets, and stores learning data pairs each including an average engine speed and the gain for the respective data sets in the storage section 60.

The N-K characteristic table calculating module 63 calculates the N-K characteristic table based on the learning data pairs each including the average engine speed and the gain calculated by the gain calculating section 69. The N-S-R characteristic map calculating module 62 updates the initial N-S-R characteristic map to a new N-S-R characteristic map based on the N-K characteristic table calculated by the N-K characteristic table calculating module 63 and the target N-K characteristic determined by the target characteristic setting module 67. The target steering angle calculating module 61 calculates the target steering angle based on the new N-S-R characteristic map. The steering actuator 53 of the outboard motor 10 is driven to achieve the target steering angle, whereby the hull 2 is turned. At this time, the relationship between the engine speed and the yaw rate gain with respect to the steering angle (marine vessel maneuvering characteristic) conforms to the target N-K characteristic (target marine vessel maneuvering characteristic). As a result, the turning behavior is provided as desired with respect to the steering angle at each engine speed. Thus, the N-S-R characteristic map is updated so as to achieve the target N-K characteristic.

It is herein assumed, for example, that an N-K characteristic actually observed when the marine vessel travels according to a target steering angle determined based on the initial N-S-R characteristic map (see FIG. 8) is dependent upon the engine speed, i.e., the gain varies with respect to the steering angle depending on the engine speed. Further, it is assumed that the target N-K characteristic determined by the target characteristic setting module 67 is such that the target gain is constant with respect to the operation angle irrespective of the engine speed. In this case, the N-S-R characteristic map calculating module 62 modifies the initial N-S-R characteristic map based on the actual N-K characteristic and the target N-K characteristic so that the relationship between the operation angle S and the target steering angle R varies depending on the engine speed N. Since the relationship between the operation angle and the target steering angle thus varies depending on the engine speed, the relationship between the gain and the operation angle is modified to be constant irrespective of the engine speed. Thus, the marine vessel maneuvering characteristic can be determined so that the relationship between the operation angle of the steering wheel 7a and the turning behavior (the gain and the yaw rate) is constant irrespective of the engine speed (traveling speed). Therefore, the operator can easily and intuitively understand the relationship between the operation angle and the turning behavior at any engine speed. Thus, even an unskilled operator can properly turn the marine vessel 1 according to the marine vessel traveling state.

The N-K characteristic varies among different marine vessels. More specifically, the N-K characteristic varies depending on the combination of the hull 2, the outboard motor 10 and the steering mechanism 50, which can be selected as desired. In this preferred embodiment, the actual N-K characteristic which varies among different marine vessels is obtained by learning during the actual travel of the marine vessel 1. The N-S-R characteristic map is updated based on the actual N-K characteristic thus obtained to provide the target N-K characteristic.

The N-K characteristic varies depending not only on the marine vessel 1 but also on the operator's preference. This makes it difficult to preliminarily provide N-S-R characteristic maps suitable for all possible cases.

Therefore, the N-K characteristic intrinsic to the marine vessel 1 is obtained by learning during the actual travel of the marine vessel 1. Then, the initial N-S-R characteristic map is tuned based on the N-K characteristic thus obtained and the target N-K characteristic. Thus, the target N-K characteristic can be provided for the marine vessel 1 as conforming to the operator's preference.

Since the N-K characteristic intrinsic to the marine vessel 1 is used, the N-S-R characteristic map can be properly determined based on the intrinsic characteristic of the marine vessel 1.

The resetting module 66 includes a nonvolatile memory 66m which stores the initial N-S-R characteristic map. When the reset switch 13 is operated, the resetting module 66 resets (erases) the learning data in the storage section 60, and reads the initial N-S-R characteristic map from the nonvolatile memory 66m and writes the initial N-S-R characteristic map in the N-S-R characteristic map storage section 62M. Thus, a reset operation is performed to reset the N-S-R characteristic map to the initial N-S-R characteristic map in the N-S-R characteristic map storage section 62M.

Engine operation status data indicating whether the engine 39 is in an active state or in an inactive state, for example, is applied to the resetting module 66 from the outboard motor ECU 11. Only when the engine 39 is in the inactive state, the resetting module 66 performs the reset operation upon reception of the reset signal input from the reset switch 13. If the engine 39 is in the active state, the resetting module 66 nullifies the input from the reset switch 13, and does not perform the reset operation.

The operation angle of the steering wheel 7a is herein determined by AD-converting the detected operation angle of the steering wheel 7a, and expressed on a scale from 0% to 100%. More specifically, an operation angle observed when the steering wheel 7a makes two turns (is turned 720 degrees) in one direction is defined as 100%. Similarly, the steering angle is expressed on a scale from 0% to 100%. More specifically, a steering angle of 0 degree is defined as 0%, and a steering angle of 30 degrees is defined as 100%. However, how to express the operation angle and the steering angle is not limited to the expression described above.

Figure 9:
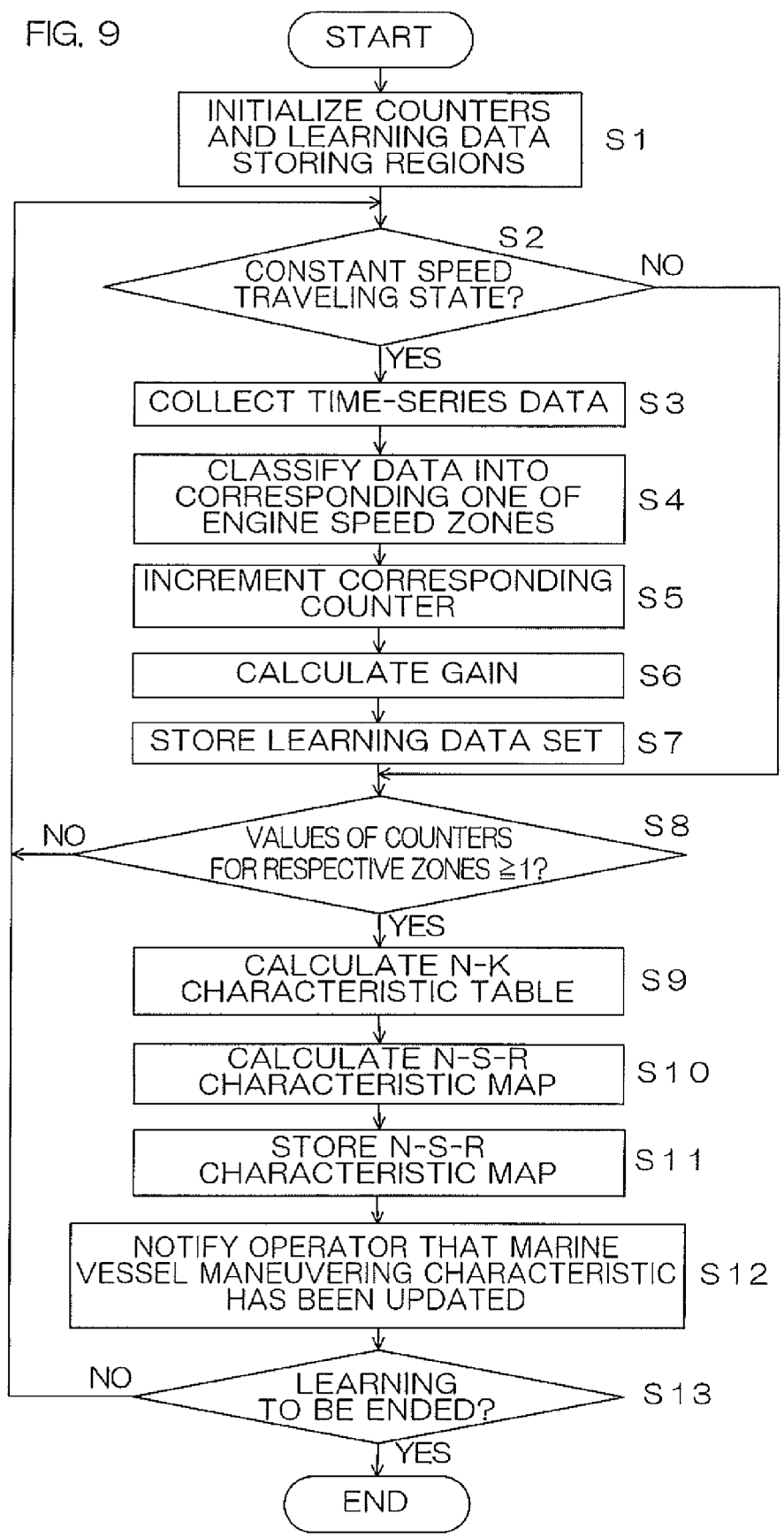
FIG. 9 is a flow chart for explaining an operation to be performed by the steering control section.

FIG. 9 is a flow chart for explaining the operation of the steering control section 28. It is herein assumed, for example, that a marine vessel traveling test is performed. Immediately after the start of the travel of the marine vessel 1, the target steering angle is determined based on the initial N-S-R characteristic map (see FIG. 8), and the steering angle is controlled according to the target steering angle thus determined. In the example shown in FIG. 8, the initial N-S-R characteristic map is defined such that the steering angle R changes linearly with the operation angle S. Further, the relationship between the operation angle S and the steering angle R is constant irrespective of the engine speed N in the initial N-S-R characteristic map.

The data collecting section 64 preliminarily divides an engine speed range into m zones $M_1, M_2, \ldots, M_m$ (wherein m is a natural number not smaller than 2). Further, counters $c_i$ ($i=1, \ldots, m$) which respectively count the numbers of learning data sets classified into the zones $M_i$ and learning data storing regions which respectively store the learning data sets for the zones $M_i$ are defined in the storage section 60 by the data collecting section 64. When the reset switch 13 is pressed, the data collecting section 64 initializes the counters $c_i$ and the learning data storing regions for the respective zones $M_i$ (Step S1).

Figure 11:
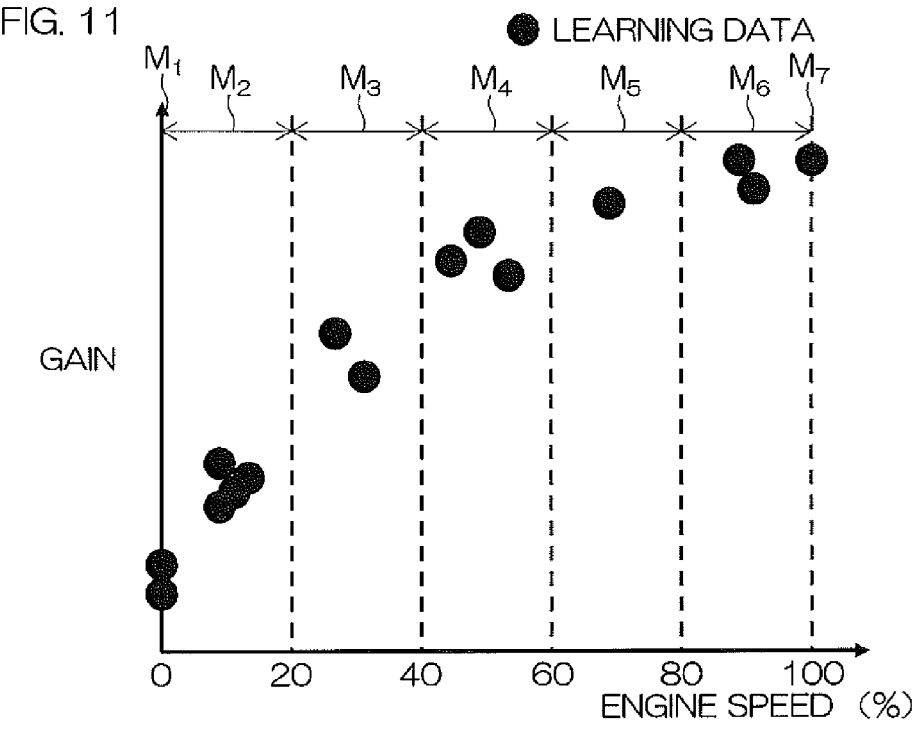
FIG. 11 is a diagram for explaining calculation of an engine speed-gain characteristic.

With reference to FIG. 11, the zones $M_i$ and the counters $c_i$ will be described by way of example. In this example, the engine speed N is expressed by percentage with an idling engine speed (e.g., 700 rpm) defined as 0% and with a maximum engine speed (e.g., 6000 rpm) defined as 100%. An engine speed N (rpm) between the idling engine speed $N_{min}$ (rpm) and the maximum engine speed $N_{max}$ (rpm) is expressed by "engine speed ratio $N_{Rate}$" calculated from the following expression:

$$N_{Rate}=(N-N_{min})/(N_{max}-N_{min})\times 100 \quad (2)$$

The engine speed ratio $N_{Rate}$ will hereinafter be referred to as "engine speed N" for convenience.

In this example, the engine speed range (0% to 100%) is divided into the following seven zones $M_1$ to $M_7$: a first zone $M_1$ of $N \leq 0$; a second zone $M_2$ of $0<N \leq 20$; a third zone $M_3$ of $20<N \leq 40$; a fourth zone $M_4$ of $40<N \leq 60$; a fifth zone $M_5$ of $60<N \leq 80$; a sixth zone $M_6$ of $80<N \leq 100$; and a seventh zone $M_7$ of $N \geq 100$. The counters $c_1$ to $c_7$ are provided in a one-to-one correspondence with the first to seventh zones $M_1$ to $M_7$.

Referring back to FIG. 9, the data collecting section 64 performs a data collecting operation if the constant speed traveling judging section 65 judges that the marine vessel 1 is in the constant speed traveling state (Step S2). That is, the data collecting section 64 collects time-series data sets of the engine speed, the steering angle and the yaw rate from the outboard motor ECU 11 for a predetermined period (Step S3).

Figure 10:
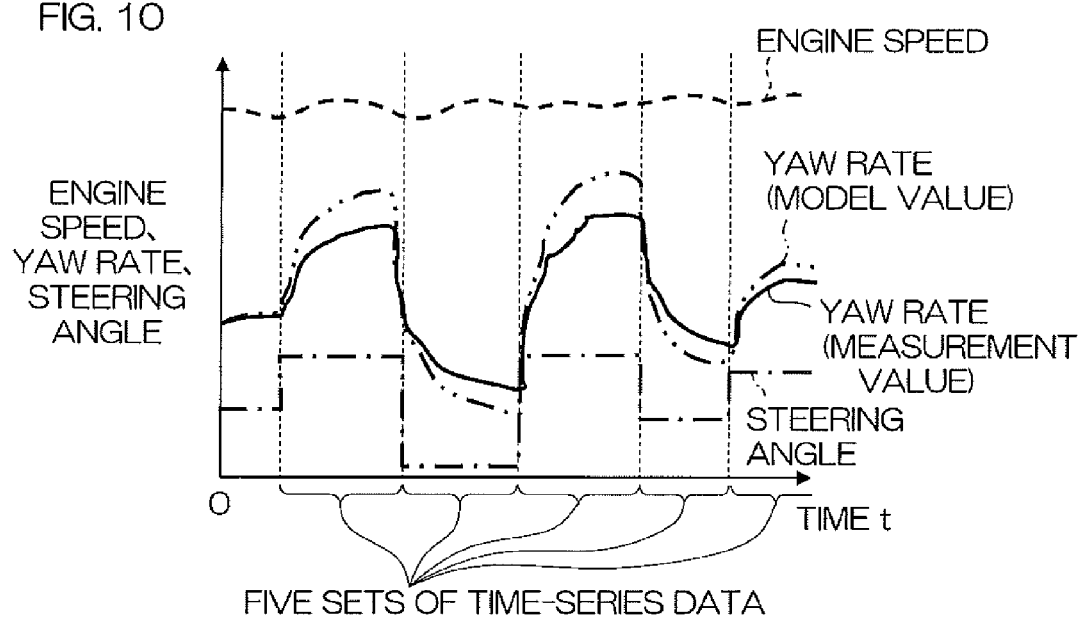
FIG. 10 is a graph showing collected time-series data.

The time-series data sets are shown in FIG. 10 by way of example. More specifically, the steering angle is repeatedly changed stepwise. After every stepwise change, a time-series data set is collected in a period during which the steering angle is kept constant. In the example shown in FIG. 10, the steering angle is changed stepwise five times. In response to the stepwise changes, five time-series data sets are collected.

Referring back to FIG. 9, the data collecting section 64 calculates an engine speed representative value (e.g., average engine speed) for each of the collected time-series data sets. Further, the data collecting section 64 classifies each of the time-series data sets into a corresponding one of the zones $M_i$ based on the calculated representative value (Step S4). Further, the data collecting section 64 increments the counter $c_i$ for that zone $M_i$ (Step S5). Thereafter, the gain calculating section 69 calculates a gain for each of the time-series data sets (Step S6).

Specifically, the gain calculating section 69 first calculates a yaw rate model value (indicated by a two-dot-and-dash line in FIG. 10). More specifically, the gain calculating section 69 utilizes a transfer function G(s) based on a predetermined gain K and a time constant T (see the expression (1) defining a relationship between the yaw rate gain with respect to the steering angle and the time constant). The gain calculating section 69 fits the collected steering angle data to the transfer function G(s) to calculate the yaw rate model value. Then, the gain calculating section 69 calculates a set of a gain K and a time constant T which minimizes a difference between the yaw rate model value and a yaw rate measurement value (indicated by a solid line in FIG. 10) by using the least square method. Thus, a gain K for the actual marine vessel characteristic is determined. That is, the gain calculating section 69 determines a transfer function G(s) for the yaw rate measurement value by matching the model value with the yaw rate measurement value, thereby providing the gain K for the transfer function G(s).

The gain calculating section 69 stores a learning data pair (N,K) of the engine speed representative value and the gain calculated for each of the time-series data sets in the storage section 60. More specifically, the learning data pair for the zone $M_i$ determined in Step S4 is stored in the storage section 60 (Step S7).

The N-K characteristic table calculating module 63 judges whether the counters $c_1$ to $c_7$ for the respective zones each have a value not smaller than a predetermined lower limit value (in this preferred embodiment, "1" which is an exemplary data number requirement), functioning as a data number judging unit (Step S8). If the counters $c_1$ to $c_7$ for the respective zones each have a value not smaller than the predetermined lower limit value, the N-K characteristic table calculating module 63 performs an N-K characteristic table calculating operation (Step S9). If not all the values of the counters $c_i$ reach the lower limit value, the N-K characteristic table calculating module 63 judges that the learning data is insufficient, and does not perform the N-K characteristic table calculating operation. In this case, a process sequence from Step S2 is repeated.

More specifically, if the counters $c_i$ for the respective zones each have a value not smaller than the lower limit value "1", the N-K characteristic table calculating module 63 calculates representative data for each of the zones $M_i$ based on the learning data pairs classified into the zone $M_i$ (see FIG. 11). For example, the N-K characteristic table calculating module 63 calculates the representative data from the following expression (3):

$$\overline{K}_i = \frac{1}{c_i} \sum_{j=1}^{c_i} K_{ij},$$

$$\overline{N}_i = \frac{1}{c_i} \sum_{j=1}^{c_i} N_{ij},$$

$$i = 1, 2, \ldots, m$$

(3)

wherein K and N each affixed with an upper line are defined as averages. In this manner, engine speed averages $N_i$ and gain averages $K_i$ are determined as the representative data for the respective zones $M_i$.

Thus, an m-dimensional average engine speed vector $N=[N_1, N_2, \ldots, N_m]$ and an m-dimensional average gain vector $K=[K_1, K_2, \ldots, K_m]$ are provided. Here, the average gains $K_i$ for the respective zones are divided by the average gain $K_1$ for the first zone $M_1$, whereby the average gain vector K is normalized. That is, the normalized m-dimensional average gain vector K is represented by $K=[1, K_2/K_1, \ldots, K_m/K_1]$. A vector pair [N, K] including the average engine speed vector (as an exemplary engine speed representative value vector) and the normalized average gain vector (as an exemplary gain representative value vector) is provided as an N-K characteristic table.

Figure 12:
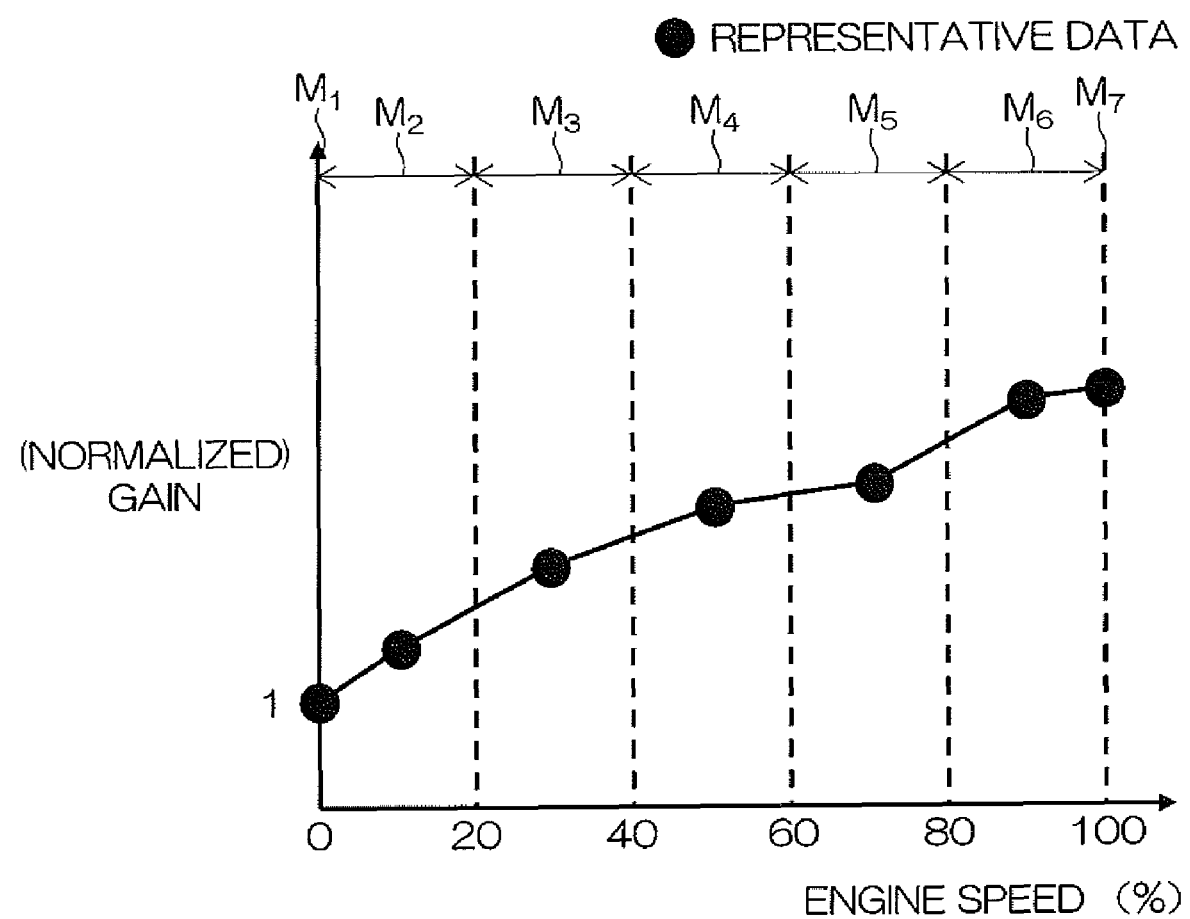
FIG. 12 is a diagram for explaining the calculation of the engine speed-gain characteristic by way of example.

As shown in FIG. 12, the N-K characteristic table includes a finite number of discrete data plots (indicated by black circles in FIG. 12) each defined by the engine speed representative value and the gain representative value. As required, characteristic data between the discrete data plots is estimated by linear interpolation. A characteristic shown in FIG. 12 is such that the gain (turning behavior) varies depending on the engine speed and increases with an increase in the engine speed from a lower engine speed range to a higher engine speed range. Such a characteristic is observed in a marine vessel which travels based on the initial N-S-R characteristic map (see FIG. 8).

Figure 13:
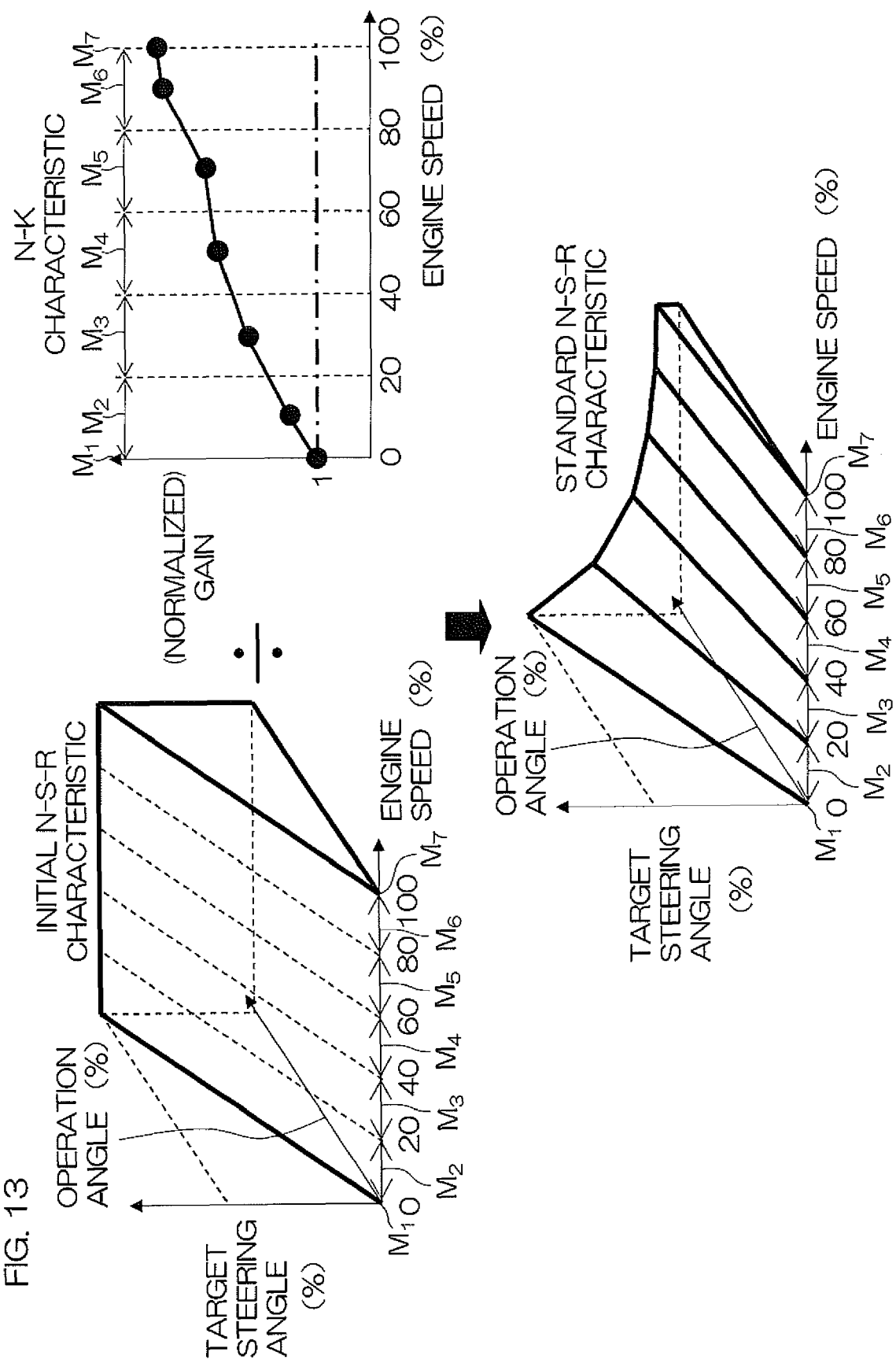
FIG. 13 is a diagram for explaining calculation of a standard N-S-R characteristic map defined such that the relationship between the operation angle and the target steering angle varies depending on the engine speed.

Referring back to FIG. 9, the N-S-R characteristic map calculating module 62 newly calculates an N-S-R characteristic map based on the initial N-S-R characteristic map (see FIG. 8) and the N-K characteristic table (see FIG. 12) (Step S10). An N-S-R characteristic map calculating process is shown in FIG. 13. More specifically, the N-S-R characteristic map calculating module 62 divides the initial N-S-R characteristic map according to the zones $M_i$ of the engine speed N (see an upper left graph in FIG. 13). Then, the N-S-R characteristic map calculating module 62 divides target steering angles in the respective zones $M_i$ of the initial N-S-R characteristic map by the corresponding (normalized) average gains $K_i$ (gain representative values) in the N-K characteristic table (see an upper right graph in FIG. 13) to update the target steering angles. Thus, the N-S-R characteristic map is updated. In the initial N-S-R characteristic map, the relationship between the operation angle and the target steering angle is constant irrespective of the engine speed. In the updated N-S-R characteristic map, on the other hand, the relationship between the operation angle and the target steering angle varies depending on the engine speed (see a lower graph in FIG. 13). In this example, when the operation angle is changed by a certain degree, the target steering angle is changed more steeply in the lower engine speed range than in the higher engine speed range. Therefore, a gain (a yaw rate gain with respect to the operation angle) obtained when the marine vessel 1 travels according to the target steering angle defined by the updated N-S-R characteristic map (hereinafter referred to as "standard N-S-R characteristic map") is generally constant irrespective of the engine speed (as indicated by a one-dot-and-dash line in upper right graph in FIG. 13). Thus, the relationship between the operation angle and the turning behavior (yaw rate) is generally constant irrespective of the engine speed.

Then, the N-S-R characteristic map calculating module 62 updates the standard N-S-R characteristic map based on the target N-K characteristic table as will be described later (the finally updated N-S-R characteristic map will hereinafter be referred to as "final N-S-R characteristic map"). As shown in FIG. 9, the final N-S-R characteristic map is stored in the N-S-R characteristic map storage section 62M (Step S11). The marine vessel maneuvering characteristic is changed by storing the new N-S-R characteristic map in the N-S-R characteristic map storage section 62M. Therefore, the N-S-R characteristic map calculating module 62 causes the notifying unit 18 to notify the operator that the marine vessel maneuvering characteristic has been updated (the N-S-R characteristic map has been updated), functioning as an update notifying unit (Step S12).

After the update of the N-S-R characteristic map, the data collecting section 64 judges whether the learning process is to be ended, i.e., whether the collected learning data is sufficient (Step S13). If the data collecting section 64 judges that the learning is to be continued, the process sequence from Step S2 is repeated. When the N-S-R characteristic map is provided based on the sufficient learning data, the process ends.

If it is judged in Step S2 that the marine vessel 1 is not in the constant speed traveling state, Steps S3 to S7 are skipped. That is, no time-series data is collected as the learning data.

Figure 14:
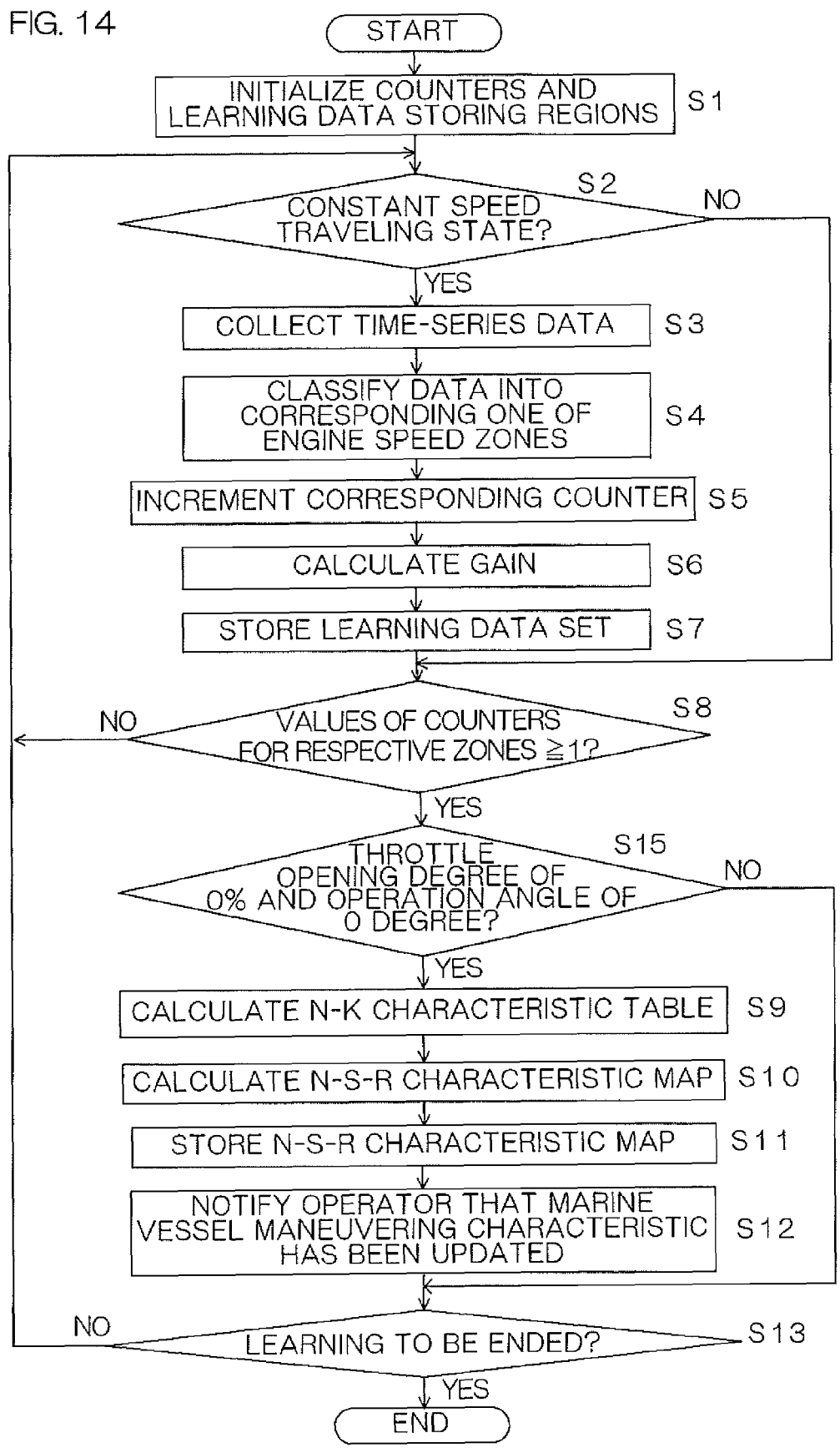
FIG. 14 is a flow chart for explaining an exemplary process to be performed for minimizing an uncomfortable feeling which may otherwise occur in a crew and/or passengers of the marine vessel when the N-S-R characteristic map is changed.

Even if the calculation of the N-S-R characteristic map is permitted with the learning data acquired for the respective zones $M_1$ to $M_7$, the update of the N-S-R characteristic map during the turning of the marine vessel 1 may cause an uncomfortable feeling in the crew and/or passengers of the marine vessel. This is because a sudden change in the target steering angle leads to a sudden change in the turning behavior. This problem may be eliminated, for example, by a process shown in FIG. 14. That is, the N-K characteristic table calculating module 63 and the N-S-R characteristic map calculating module 62 perform their operations only when the remote control lever 8a and the steering wheel 7a are each set at the neutral position, i.e., the throttle opening degree is 0% and the operation angle is 0 degree (Step S15).

Figure 15:
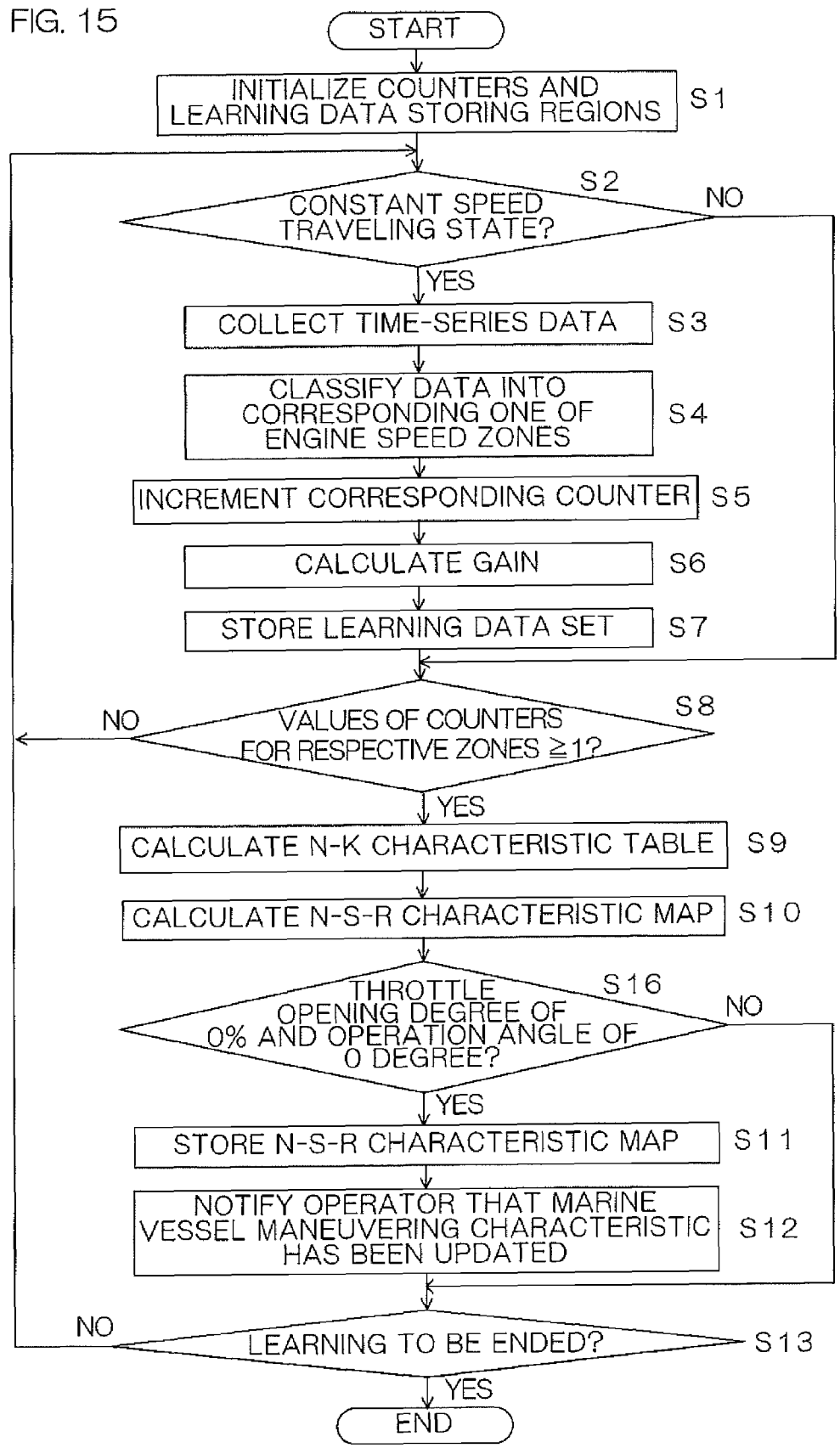
FIG. 15 is a flow chart for explaining another exemplary process to be performed for minimizing an uncomfortable feeling which may otherwise occur in the crew and/or passengers of the marine vessel when the N-S-R characteristic map is changed.

Alternatively, this problem may be eliminated, as shown in FIG. 15, by permitting the N-K characteristic table calculating module 63 and the N-S-R characteristic map calculating module 62 to perform their operations irrespective of whether the throttle opening degree is 0% and the operation angle is 0 degree. In this case, the rewrite of the N-S-R characteristic map storage section 62M to be referred to by the target steering angle calculating module 61 is permitted only when the throttle opening degree is 0% and the operation angle is 0 degree (Step S16). The rewrite (update) may be permitted when the operation angle is not 0 degree but, in this case, the rewrite is preferably permitted when the throttle opening degree is 0% (for a minimum propulsive force). Thus, the operator is smoothly adapted for the rewritten N-S-R characteristic and, therefore, free from the uncomfortable feeling.

Next, the function of the target characteristic setting module 67 will be described.

Figure 16:
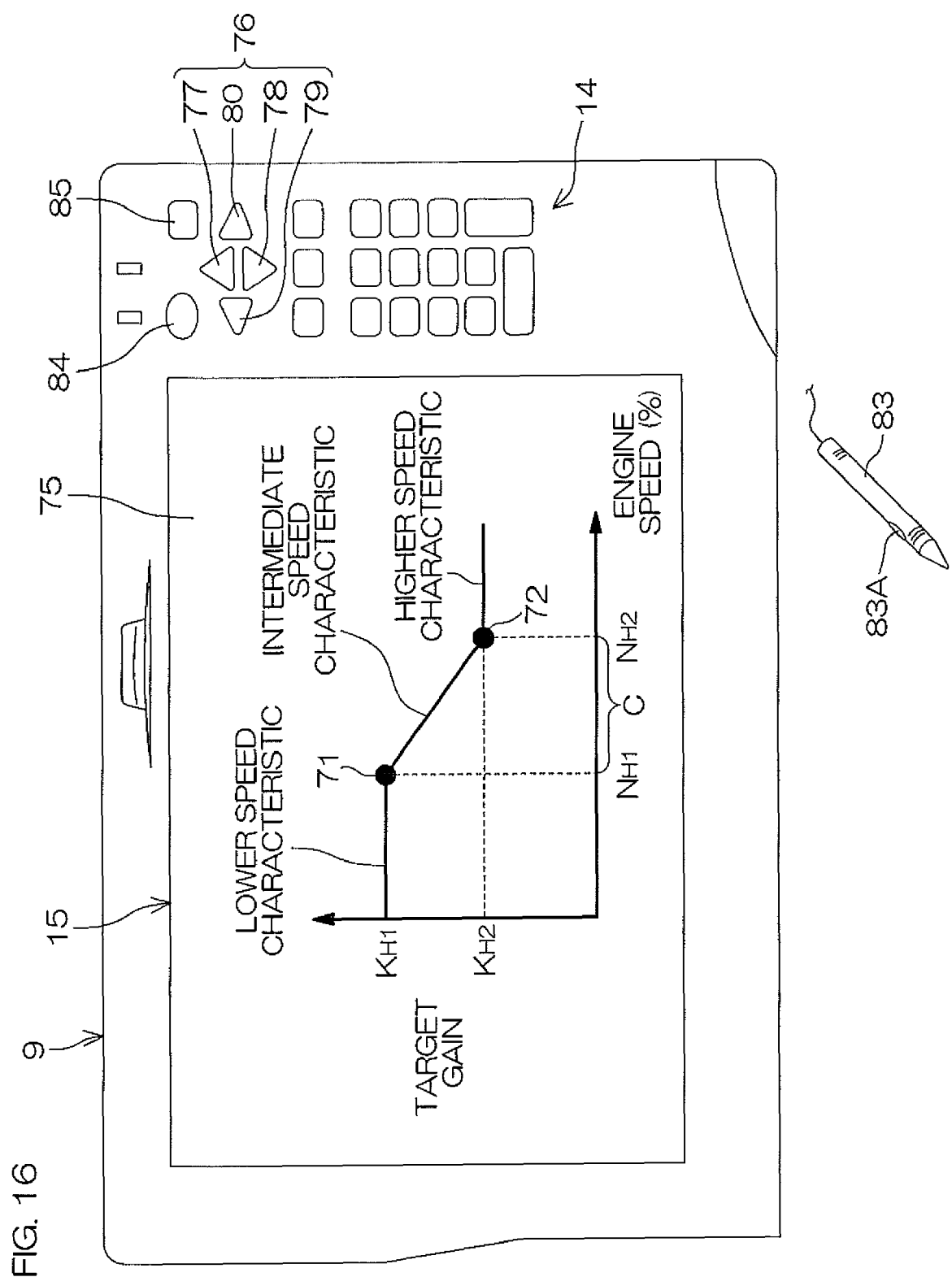
FIG. 16 is a diagram showing an exemplary target characteristic inputting section including an input device and a display device in combination.

FIG. 16 is a diagram illustrating an example of the target characteristic inputting section 9 including the input device 14 and the display device 15 in combination. A graph of the target characteristic (target N-K characteristic) defining the relationship between the target gain and the engine speed (%) is displayed on a screen of the display device 15. In the graph, a target N-K characteristic line defining the target N-K characteristic has two inflection points. Of the two inflection points, a first inflection point 71 is present on a lower engine speed side, and a second inflection point 72 is present on a higher engine speed side. A portion of the target N-K characteristic line in an engine speed range lower than an engine speed level at the first inflection point 71 defines a lower speed characteristic, and a portion of the target N-K characteristic line in an engine speed range higher than an engine speed level at the inflection point 72 defines a higher speed characteristic. A portion of the target N-K characteristic line between the lower speed characteristic line portion and the higher speed characteristic line portion defines an intermediate speed characteristic.

In this preferred embodiment, however, the following restrictions 1 to 3 are preferably imposed for setting the first inflection point 71 and the second inflection point 72. In the following description of the restrictions, the engine speed and a target gain at the first inflection point 71 are defined as $N_{H1}$ and $K_{H1}$, respectively, and the engine speed and a target gain at the second inflection point 72 are defined as $N_{H2}$ and $K_{H2}$, respectively. Further, a maximum target gain and a minimum target gain are defined as $K_{max}$ and $K_{min}$, respectively, and a maximum engine speed (highest engine speed) and a minimum engine speed (idling engine speed) are defined as $N_{max}$ and $N_{min}$, respectively.

Restriction 1: $N_{min} \leq N_{H1} < N_{H1} + C < N_{H2} \leq N_{max}$
Restriction 2: $K_{min} \leq K_{H1} \leq K_{max}$
Restriction 3: $K_{min} \leq K_{H2} \leq K_{max}$ In the restriction 1, C is a parameter that provides a distance between the engine speed $N_{H1}$ at the first inflection point 71 and the engine speed $N_{H2}$ at the second inflection point 72 and is, for example, a percentage value corresponding to 1,000 rpm.

An operator (or the operator of the marine vessel) sets the target N-K characteristic by changing the positions of the first inflection point 71 and/or the second inflection point 72. More specifically, the operator defines engine speed ranges for the lower speed characteristic, the intermediate speed characteristic and/or the higher speed characteristic by changing the lateral positions of the first inflection point 71 and/or the second inflection point 72, i.e., by changing $N_{H1}$ and/or $N_{H2}$. Further, the operator sets target gains for the lower speed characteristic, the intermediate speed characteristic and/or the higher speed characteristic by changing the vertical positions of the first inflection point 71 and/or the second inflection point 72, i.e., by changing $K_{H1}$ and/or $K_{H2}$. As will be described later, the target gains for the lower speed characteristic and the higher speed characteristic are constant in the lower engine speed range and the higher engine speed range, and the target gain for the intermediate speed characteristic is determined by linear interpolation between the target gain $K_{H1}$ at the first inflection point 71 and the target gain $K_{H2}$ at the second inflection point 72.

The input device 14 includes a touch panel 75, a touch pen 83, a cross button 76, a characteristic changing button 84, and an inflection point selecting button 85. The touch panel 75 is provided on the screen of the display device 15. The touch pen 83 is used for operating the touch panel 75. The cross button 76 is provided on a lateral side of the screen of the display device 15. The characteristic changing button 84 is operated for adopting a change made in the target N-K characteristic. The inflection point selecting button 85 is operated for selecting one of the inflection points. The cross button 76, the characteristic changing button 84 and the inflection point selecting button 85 define a key input unit.

Figure 17:
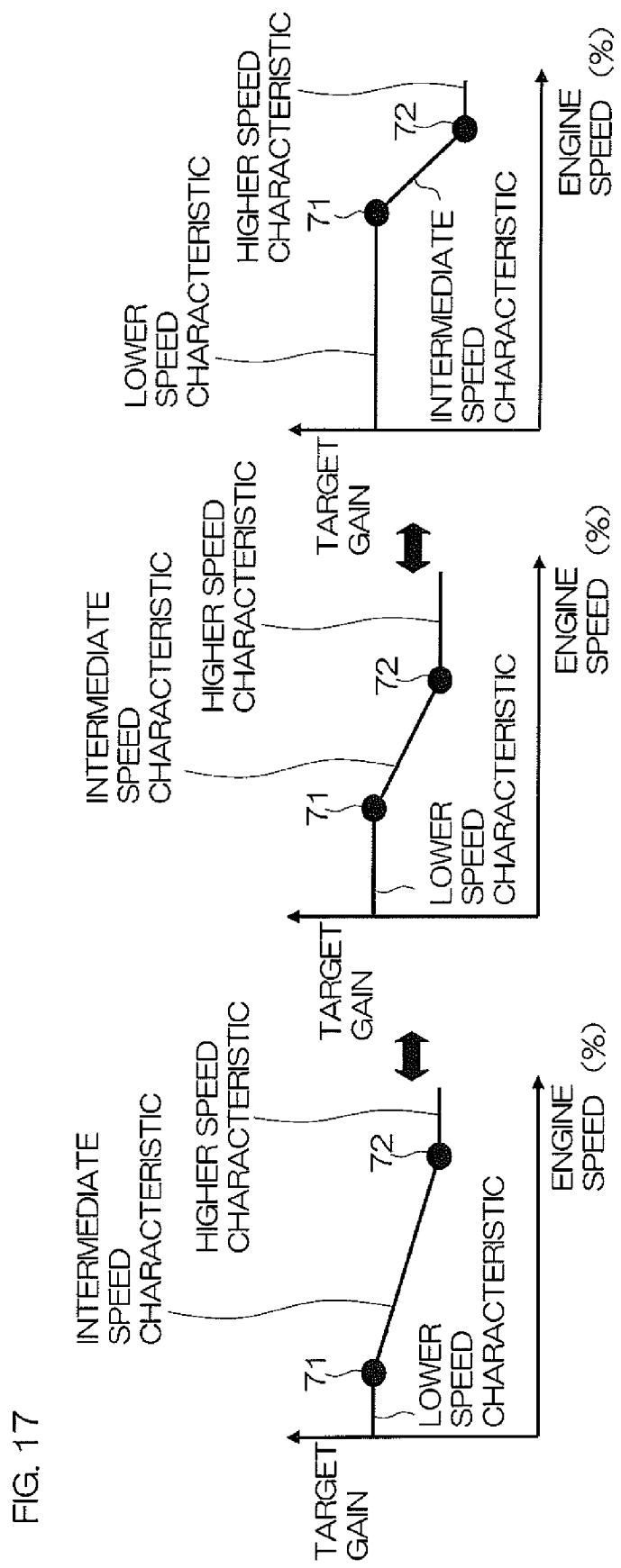
FIG. 17 is a diagram for explaining how to horizontally move inflection points.
Figure 18:
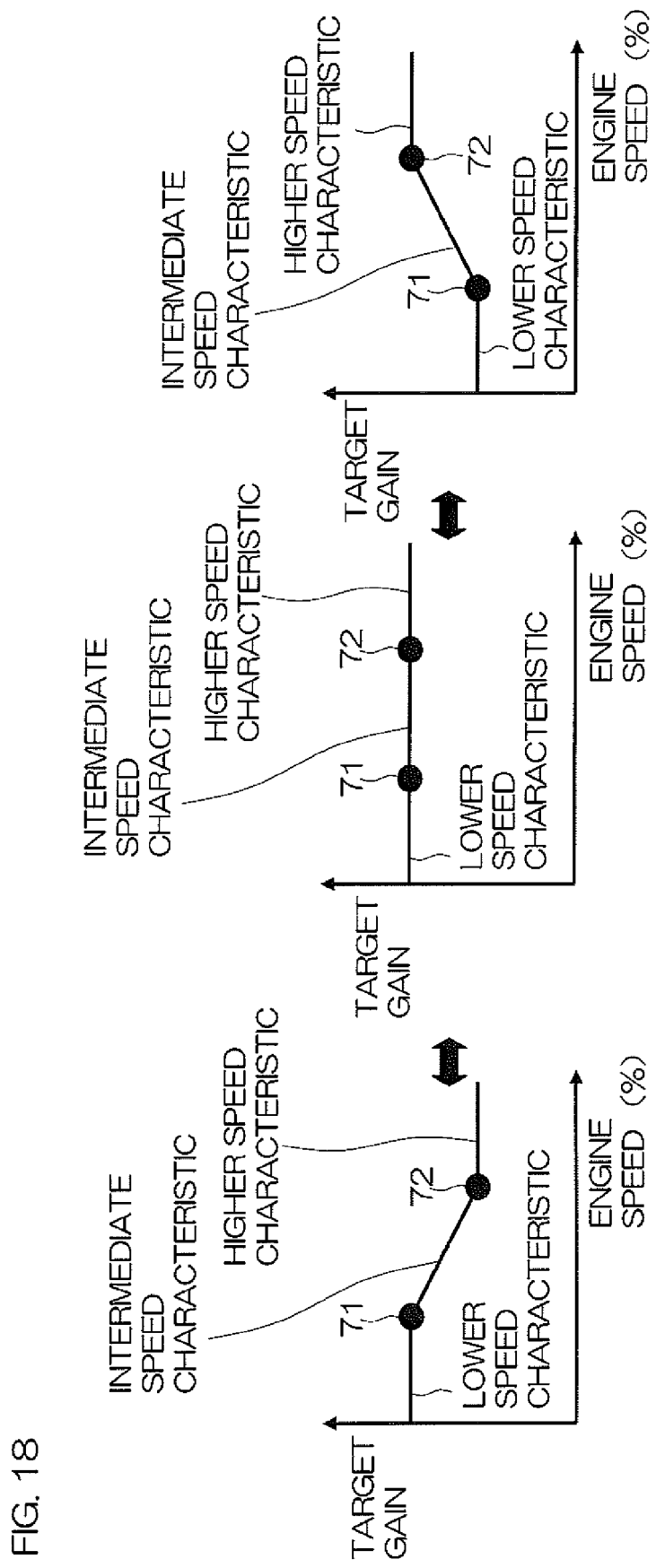
FIG. 18 is a diagram for explaining how to vertically move the inflection points.

The cross button 76 includes upper and lower buttons 77, 78, and left and right buttons 79, 80 (inflection point position change inputting unit). In this preferred embodiment, the operator first selects one of the first inflection point 71 and the second inflection point 72 by using the inflection point selecting button 85. Thereafter, the operator horizontally laterally moves the first inflection point 71 and the second inflection point 72, as shown in FIG. 17, by operating the left and right buttons 79, 80. Further, the operator vertically moves up and down the first inflection point 71 and the second inflection point 72, as shown in FIG. 18, by operating the upper and lower buttons 77, 78. Thus, the shape of the target N-K characteristic line can be changed as desired.

For example, the shape of the target N-K characteristic line may be changed from a reference shape which defines a characteristic such that the target gain is constant irrespective of the engine speed (see the middle graph in FIG. 18) to a shape which defines a characteristic such that the target gain for the lower speed characteristic is higher than the target gain for the higher speed characteristic (see a left graph in FIG. 18) or to a shape which defines a characteristic such that the target gain for the higher speed characteristic is higher than the target gain for the lower speed characteristic (see a right graph in FIG. 18). A process for changing the positions of the inflection points with the use of the cross button 76 (target N-K characteristic setting process) will be described later.

The aforementioned operations can also be performed with the use of the touch panel 75 and the touch pen 83. More specifically, the operator points to one of the first inflection point 71 and the second inflection point 72 with the touch pen 83 (see FIG. 16). Then, the operator laterally or vertically drags the pointed inflection point while pressing a click button 83A provided on the touch pen 83. With this operation, the position of the inflection point can be changed within the aforementioned restrictions. Thus, the touch panel 75 and the touch pen 83 also serve as the inflection point position change inputting unit. A process for changing the positions of the inflection points with the use of the touch panel 75 and the touch pen 83 (target N-K characteristic setting process) will be described later.

An initial characteristic for the target N-K characteristic (initial target N-K characteristic) is defined such that the target gain is constant irrespective of the engine speed (see the middle graph in FIG. 18). After the positions of the inflection points are set, the target gains for the lower speed characteristic, the intermediate speed characteristic and the higher speed characteristic are determined from the following expression (4):

Target gain for lower speed characteristic $$K_L = K_{H1}$$

Target gain for intermediate speed characteristic $$K_M = (N_M - N_{H1}) * (K_{H2} - K_{H1}) / (N_{H2} - N_{H1}) + K_{H1}$$

Target gain for higher speed characteristic $$K_H = K_{H2} \qquad (4)$$

Wherein $N_M$ is a given engine speed within an engine speed range for the intermediate speed characteristic.

The inflection points are preferably set around an engine speed (e.g., a percentage value corresponding to about 2,000 rpm) which is slightly lower than an engine speed generally used for increasing the speed of the marine vessel over the hump range (a speed range in which a wave-making resistance is maximum). By thus setting the inflection points, it is possible to provide a lower speed characteristic suitable for maneuvering the marine vessel at a lower traveling speed below the hump range (e.g., for moving the marine vessel toward or away from a docking site or for trolling) as well as a higher speed characteristic suitable for maneuvering the marine vessel at a traveling speed higher than the hump range (e.g., for long-distance cruising).

The lower speed characteristic, which is adapted for an engine speed range generally used for moving the marine vessel toward or away from a docking site or for trolling, should be set by giving primary consideration to the maneuverability of the marine vessel. In general, the lower speed characteristic is preferably such that the steering angle is significantly changed even if the steering wheel 7a is operated by a small operation angle. This reduces the steering operation amount when the marine vessel significantly changes its course, for example, for cutback.

On the other hand, the higher speed characteristic is adapted for an engine speed range generally used when the engine is required to have higher responsiveness, e.g., when the marine vessel travels at a higher speed or travels on high waves. In general, the higher speed characteristic is such that the steering angle is slightly changed even if the steering wheel 7a is operated by a greater operation amount. Thus, the marine vessel is turned slowly in response to the steering operation and, therefore, easily maintains its course.

An engine speed range for the intermediate speed characteristic, which is above the hump range, is suitable for economical traveling with a lower wave-making resistance and a lower frictional resistance received by the hull from a water surface. In actual travel, however, it is rare to use the intermediate speed characteristic. As a result, the intermediate speed characteristic serves as a buffer which smoothly connects the lower speed characteristic and the higher speed characteristic.

The target N-K characteristic line may be set when the marine vessel 1 is in the stopped state or in the traveling state.

Figure 19:
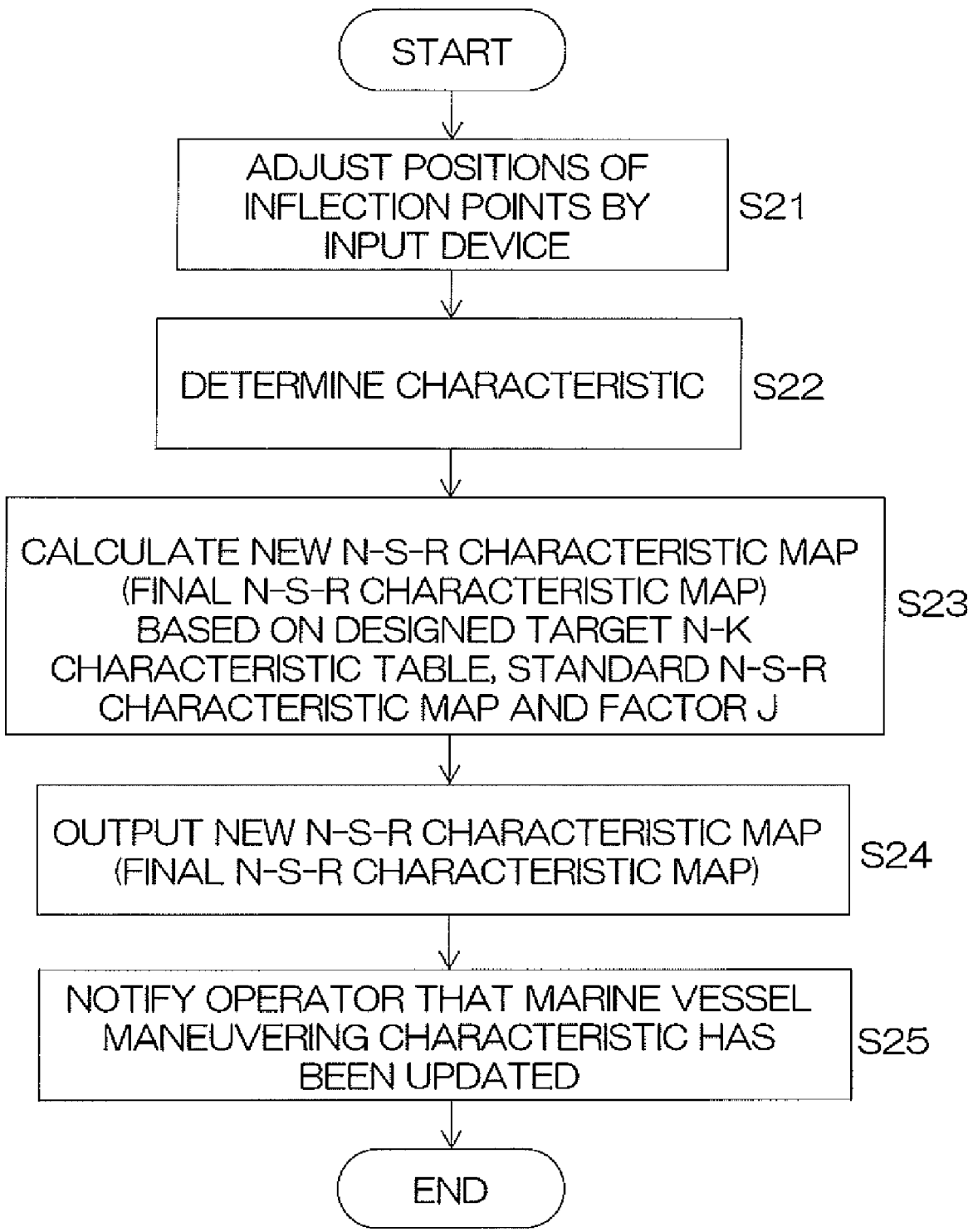
FIG. 19 is a flow chart for explaining a process to be performed for setting a target N-K characteristic table when the marine vessel is in a stopped state.

FIG. 19 is a flow chart for explaining a process to be performed for setting the target N-K characteristic line when the marine vessel is in the stopped state (when the shift position is set at the neutral position). The operator checks the target N-K characteristic line displayed on the display device 15, and sets the target N-K characteristic line by adjusting the positions of the first inflection point 71 and/or the second inflection point 72 with the use of the touch panel 75 or the cross button 76 (Step S21). When the operator specifies the first inflection point 71 and laterally moves the first inflection point 71 on the touch panel 75, for example, the engine speed range for the lower speed characteristic is changed with the target gain for the lower speed characteristic kept unchanged (see FIG. 17). In this case, the engine speed ranges for the intermediate speed characteristic and the higher speed characteristic are also changed according to a change in the engine speed range for the lower speed characteristic. When the first inflection point 71 is specified and vertically moved on the touch panel 75, for example, the target gain is changed with the engine speed range for the lower speed characteristic kept unchanged (see FIG. 18). The position of the second inflection point 72 is changed in the same manner as the position of the first inflection point 71.

After the target N-K characteristic line is thus set by adjusting the positions of the first inflection point 71 and/or the second inflection point 72, the operator presses the characteristic changing button 84 (Step S22). In response to the pressing of the characteristic changing button 84, the target characteristic setting module 67 generates the target N-K characteristic table, which is in turn stored in the target N-K characteristic table storage section 67M. The N-S-R characteristic map calculating module 62 updates the standard N-S-R characteristic map based on the target N-K characteristic table to calculate a new N-S-R characteristic map (Step S23).

Figure 20:
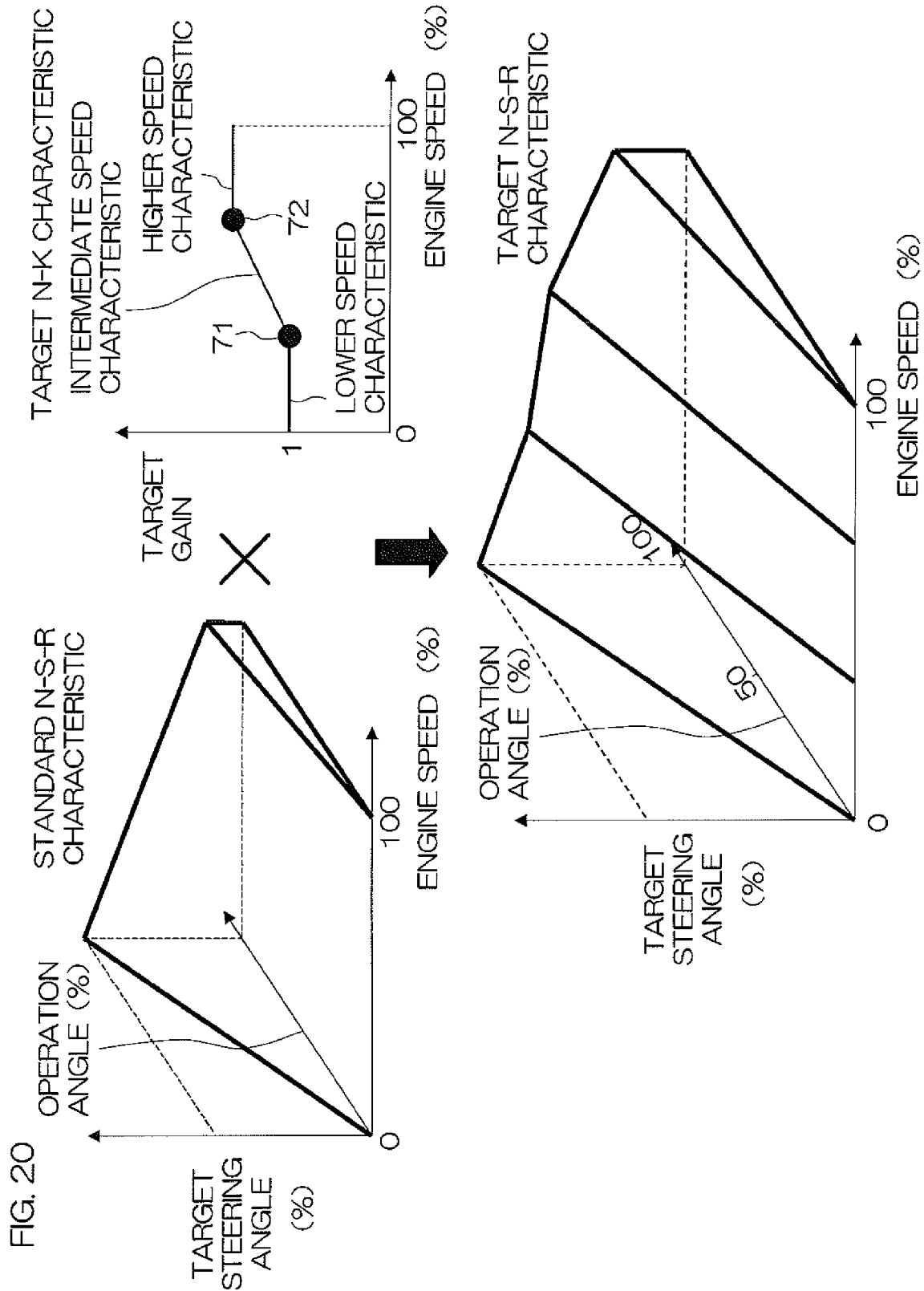
FIG. 20 is a diagram for explaining calculation of a target N-S-R characteristic map based on the standard N-S-R characteristic map and the target N-K characteristic table.
Figure 21:
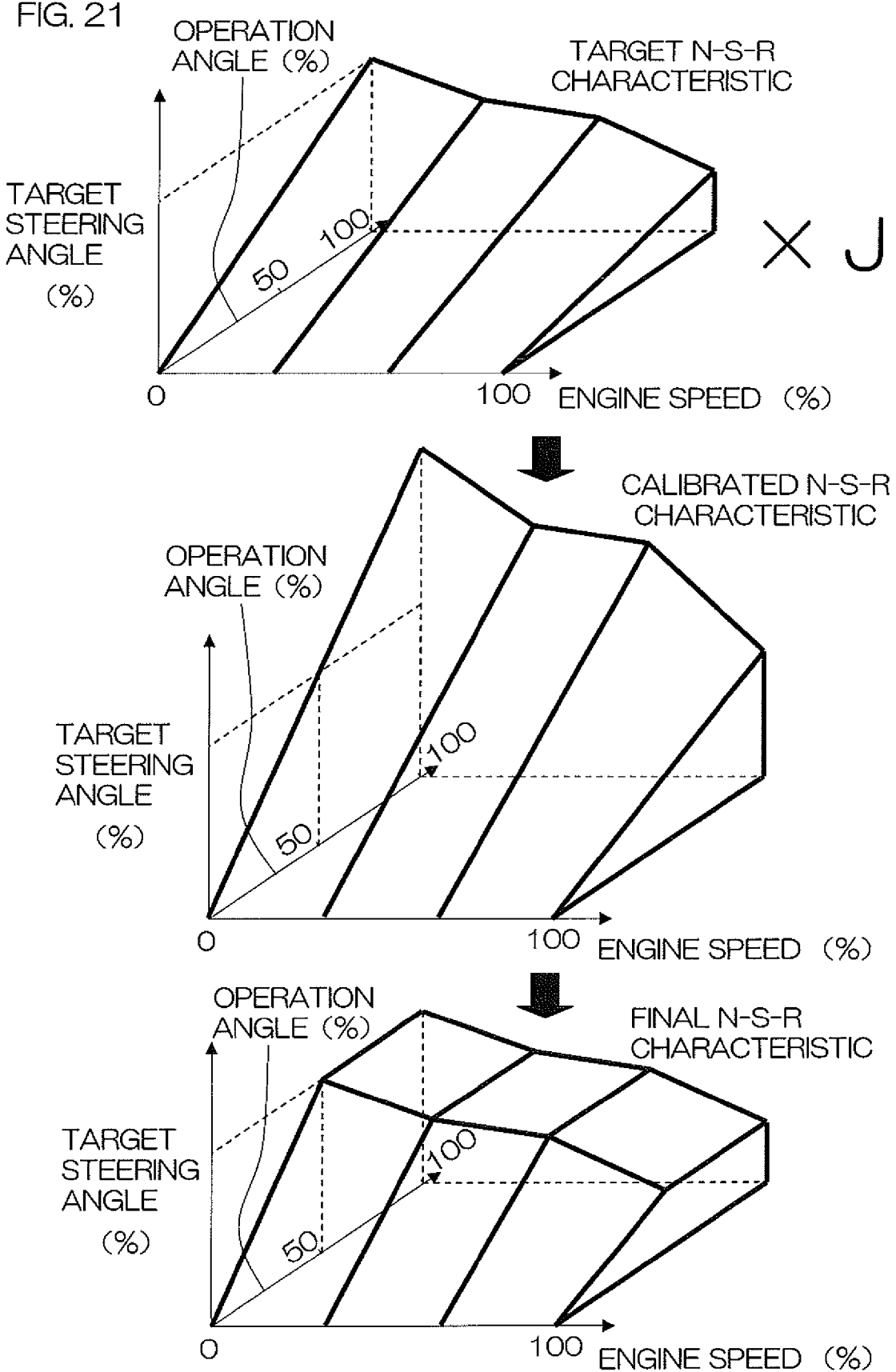
FIG. 21 is a diagram for explaining calculation of a final N-S-R characteristic map based on the target N-S-R characteristic map.

A process for calculating the new N-S-R characteristic map is shown in FIGS. 20 and 21. For convenience of description, the standard N-S-R characteristic map shown in an upper left graph of FIG. 20 is different in shape from the standard N-S-R characteristic map shown in the lower graph of FIG. 13.

Prior to the calculation of the new N-S-R characteristic map, the N-S-R characteristic map calculating module 62 divides all target gains in the target N-K characteristic table (see FIG. 16) by the target gain $K_L$ ($K_{H1}$ in this preferred embodiment) for the lower speed characteristic to normalize the target N-K characteristic table. That is, the normalized target N-K characteristic table (see an upper right graph in FIG. 20) has a target gain $K_L$ ($K_{H1}$) of 1 in the lower speed characteristic. Then, the N-S-R characteristic map calculating module 62 multiplies all target steering angles in the standard N-S-R characteristic map by the corresponding normalized target gains (normalized values in the target N-K characteristic table). At this time, the target steering angles in the standard N-S-R characteristic map are multiplied by the normalized target gains at the corresponding engine speeds. In this manner, the N-S-R characteristic map is updated. Thus, the relationship between the operation angle and the target steering angle varies among the engine speed ranges delimited by the first inflection point 71 and the second inflection point 72 in the target N-K characteristic table (see a lower graph in FIG. 20). Therefore, the lower speed characteristic, the intermediate speed characteristic and the higher speed characteristic in the target N-K characteristic table are reflected to the N-S-R characteristic map. In the following description, the standard N-S-R characteristic map updated in the aforementioned manner is referred to as "target N-S-R characteristic map".

The operator of the marine vessel often desires to change the setting of the maximum operation angle. Although the operation angle observed when the steering wheel 7a is rotated 720 degrees is defined as a maximum operation angle of 100% by way of example, the operator may desire that an operation angle observed when the steering wheel 7a is rotated 360 degrees is defined as a maximum operation angle of 100% (or the maximum operation angle is changed from 100% to 50%).

A request for changing the maximum operation angle is input by operating the key input section of the input device 14 (see FIG. 16). Upon reception of the request for changing the maximum operation angle from 100% to X %, the N-S-R characteristic map calculating module 62 calculates a factor J from the following expression (5):

$$J = 100/X \tag{5}$$

Then, the N-S-R characteristic map calculating module 62 updates the target N-S-R characteristic map (see an upper graph in FIG. 21) by multiplying target steering angles in the target N-S-R characteristic map by the factor J. Where the maximum operation angle is to be changed from 100% to 50%, for example, the factor J is 2 and, therefore, the target N-S-R characteristic map is updated so that all the target steering angles are doubled (see a middle graph in FIG. 21). The updated target N-S-R characteristic map will hereinafter be referred to as "calibrated N-S-R characteristic map".

Then, the N-S-R characteristic map calculating module 62 corrects the calibrated N-S-R characteristic map so that target steering angles in an operation angle range greater than the maximum operation angle (50% in this example) in the calibrated N-S-R characteristic map are equal to target steering angles for the maximum operation angle at the corresponding engine speeds. The corrected N-S-R characteristic map (see a lower graph in FIG. 21) is defined as the final N-S-R characteristic map, which is in turn stored in the N-S-R characteristic map storage section 62M (Step S24 in FIG. 19). Further, the N-S-R characteristic map calculating module 62 causes the notifying unit 18 to notify the operator that the marine vessel maneuvering characteristic has been updated (the N-S-R characteristic map has been updated) (Step S25).

The operation angle range of the steering wheel 7a may be limited so as to prevent the steering wheel 7a from being operated beyond the changed maximum operation angle. Alternatively, a steering operation angle signal indicating an operation angle greater than the maximum operation angle may be nullified. In these cases, the calibrated N-S-R characteristic map may be stored as the final N-S-R characteristic map in the N-S-R characteristic map storage section 62M.

The target steering angle calculating module 61 (see FIG. 7) sets the target steering angle according to the new N-S-R characteristic map (final N-S-R characteristic map) stored in the N-S-R characteristic map storage section 62M when the steering wheel 7a is thereafter operated. Thus, the steering angle is controlled according to the engine speed and the target steering angle determined based on the target N-K characteristic and the maximum steering angle set by the operator.

The relationship between the operation angle and the turning behavior according to the engine speed can be adapted for the operator's preference by properly setting the target N-K characteristic. This improves the marine vessel maneuverability, thereby facilitating the operation of the steering wheel 7a during the higher speed travel and the lower speed travel of the marine vessel. For example, the target N-K characteristic may be set such that the target gain is higher in the lower speed characteristic and is lower in the higher speed characteristic (see the left graph in FIG. 18). In this case, the target steering angle is set such that the turning amount of the hull 2 with respect to the operation angle is increased in the lower engine speed range and is reduced in the higher engine speed range. This makes it possible to sharply turn the hull 2 by slightly changing the operation angle in the lower engine speed range, and smoothly turn the hull 2 in the higher engine speed range even if the operator has a lower level of steering wheel operating skill.

Figure 22:
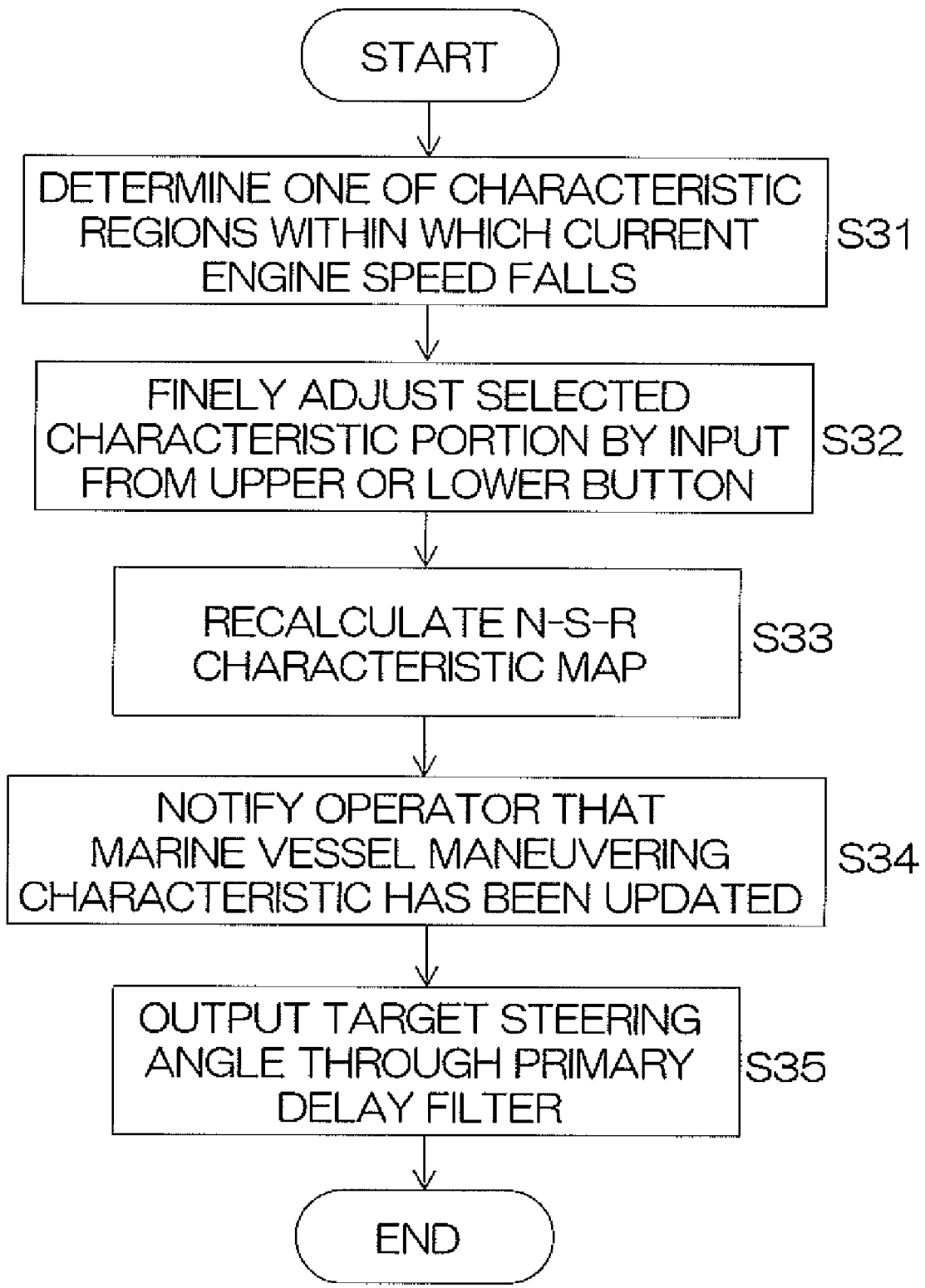
FIG. 22 is a flow chart for explaining a process for setting the target N-K characteristic table when the marine vessel is in a traveling state.

FIG. 22 is a flow chart for explaining a process to be performed for setting the target N-K characteristic line when the marine vessel is in the traveling state. When the marine vessel is in the traveling state, the shift position is set at a non-neutral position, i.e., at the forward drive position or at the reverse drive position.

The target characteristic setting module 67 determines one of the higher speed characteristic region, the intermediate speed characteristic region and the lower speed characteristic region within which a current engine speed falls (Step S31). In other words, the target characteristic setting module 67 judges which of the higher speed characteristic, the intermediate speed characteristic and the lower speed characteristic the operator currently desires to change.

Figure 23:
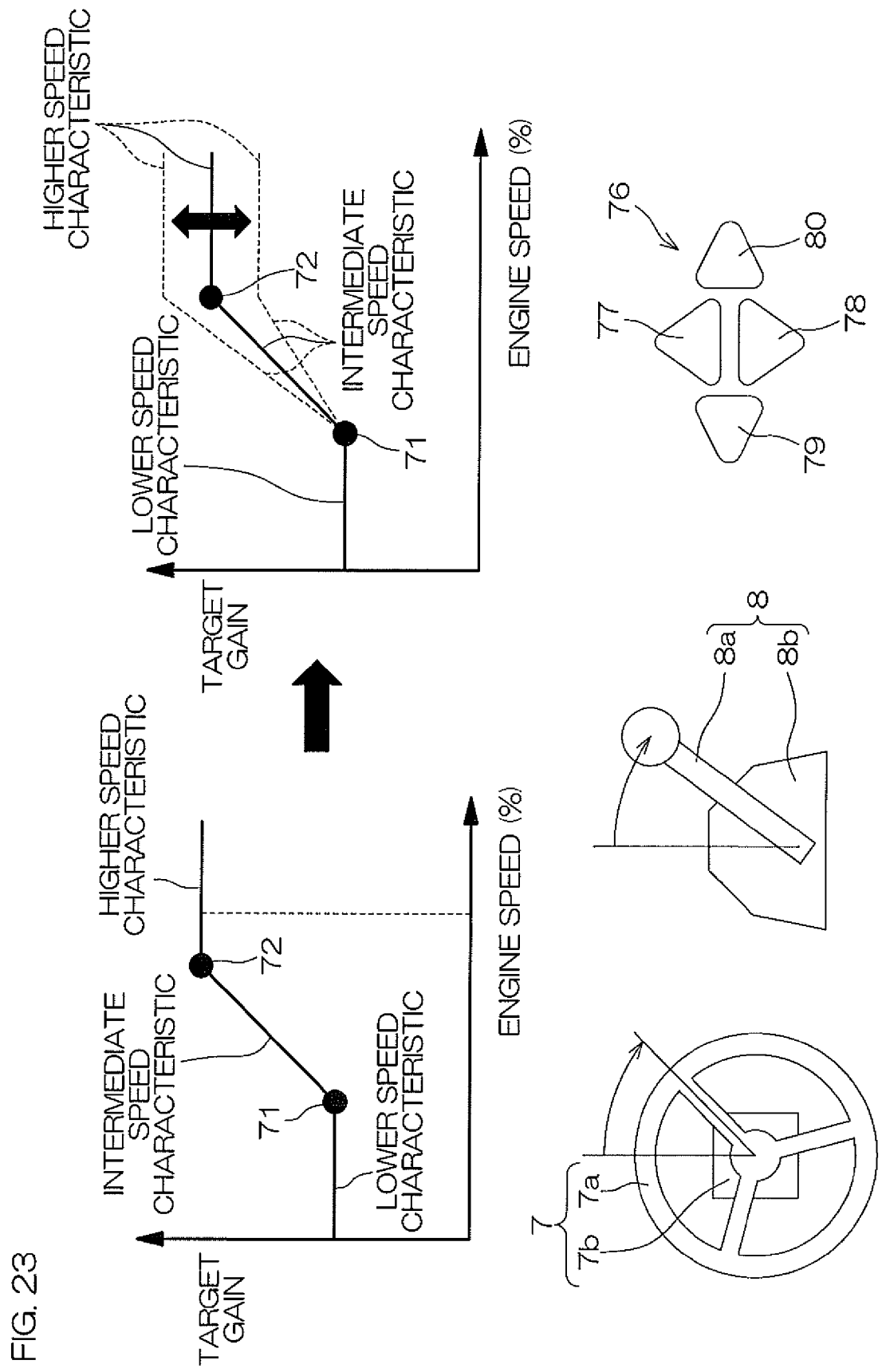
FIG. 23 is a diagram for explaining a process for finely adjusting the target N-K characteristic table with the use of a steering wheel, a remote control lever and a cross button.

When the higher speed characteristic portion of the target N-K characteristic line is to be finely adjusted with the current engine speed falling within the higher speed range, as shown in FIG. 23, the operator presses the upper or lower button 77, 78 of the cross button 76 without moving the steering wheel 7a and the remote control lever 8a. Every time the upper or lower button 77, 78 is pressed, the second inflection point 72 is vertically moved, whereby the higher speed characteristic and the intermediate speed characteristic are modified (as indicated by broken lines in right graph in FIG. 23). Thus, a new target N-K characteristic table is provided, and stored in the target N-K characteristic table storage section 67M (Step S32).

When the lower speed characteristic portion of the target N-K characteristic line is to be finely adjusted with the current engine speed falling within the lower speed range, the operator presses the upper or lower button 77, 78 of the cross button 76 without moving the steering wheel 7a and the remote control lever 8a. Every time the upper or lower button 77, 78 is pressed, the first inflection point 71 is vertically moved, whereby the lower speed characteristic and the intermediate speed characteristic are modified. Thus, a new target N-K characteristic table is provided, and stored in the target N-K characteristic table storage section 67M (Step S32).

When the intermediate speed characteristic portion of the target N-K characteristic line is to be finely adjusted with the current engine speed falling within the intermediate speed range, the operator presses the upper or lower button 77, 78 of the cross button 76 without moving the steering wheel 7a and the remote control lever 8a. If the preceding engine speed falls within the lower speed characteristic region, the second inflection point 72 is vertically moved every time the upper or lower button 77, 78 is pressed. Accordingly, the intermediate speed characteristic and the higher speed characteristic are modified. Thus, a new target N-K characteristic table is provided, and stored in the target N-K characteristic table storage section 67M (Step S32).

On the other hand, if the preceding engine speed falls within the higher speed characteristic region, the first inflection point 71 is vertically moved every time the upper or lower button 77, 78 is pressed. Accordingly, the intermediate speed characteristic and the lower speed characteristic are modified. Thus, a new target N-K characteristic table is provided, and stored in the target N-K characteristic table storage section 67M (Step S32).

After the new target N-K characteristic table is stored in the target N-K characteristic table storage section 67M, the N-S-R characteristic map calculating module 62 recalculates the N-S-R characteristic map, and stores the recalculated N-S-R characteristic map in the N-S-R characteristic map storage section 62M (Step S33). Further, the N-S-R characteristic map calculating module 62 causes the notifying unit 18 to notify the operator that the marine vessel maneuvering characteristic has been updated (the N-S-R characteristic map has been updated) (Step S34).

For the recalculation of the N-S-R characteristic map, the final N-S-R characteristic map as well as the standard N-S-R characteristic map are stored in the N-S-R characteristic map storage section 62M. The N-S-R characteristic map calculating module 62 updates the new final N-S-R characteristic map by using the new target N-K characteristic table for the standard N-S-R characteristic map (see FIGS. 20 and 21).

The target steering angle calculating module 61 calculates the target steering angle based on the N-S-R characteristic map recalculated after the fine adjustment of the target N-K characteristic table. The target steering angle thus calculated is applied to the outboard motor ECU 11 through the primary delay filter 68 (Step S35).

Thus, the operator can finely adjust the target N-K characteristic while checking the turning behavior of the hull 2 responsive to the operation of the steering wheel 7a during the travel of the marine vessel 1.

If the steering angle is suddenly changed due to the change in the N-S-R characteristic map during the travel of the marine vessel, the turning behavior of the hull 2 is suddenly changed, thereby causing an unnatural or uncomfortable feeling in the crew and/or passengers. In order to prevent the sudden change in the steering angle, the primary delay filter 68 is provided for minimizing a stepwise change in the target steering angle in this preferred embodiment. Therefore, the target steering angle passed through the primary delay filter 68 is output as the final target steering angle to the outboard motor ECU 11. The primary delay filter 68 is operative only for a predetermined period (e.g., 5 seconds) which is required for minimizing the influence of the stepwise change occurring in the target characteristic due to the recalculation during the travel of the marine vessel.

Although the primary delay filter 68 is preferably used in this preferred embodiment, the stepwise change in the target steering angle may be minimized in other ways. For example, the steering angle may be gradually changed from the current level to the target level through linear interpolation between the current steering angle and the recalculated target steering angle.

Figure 24:
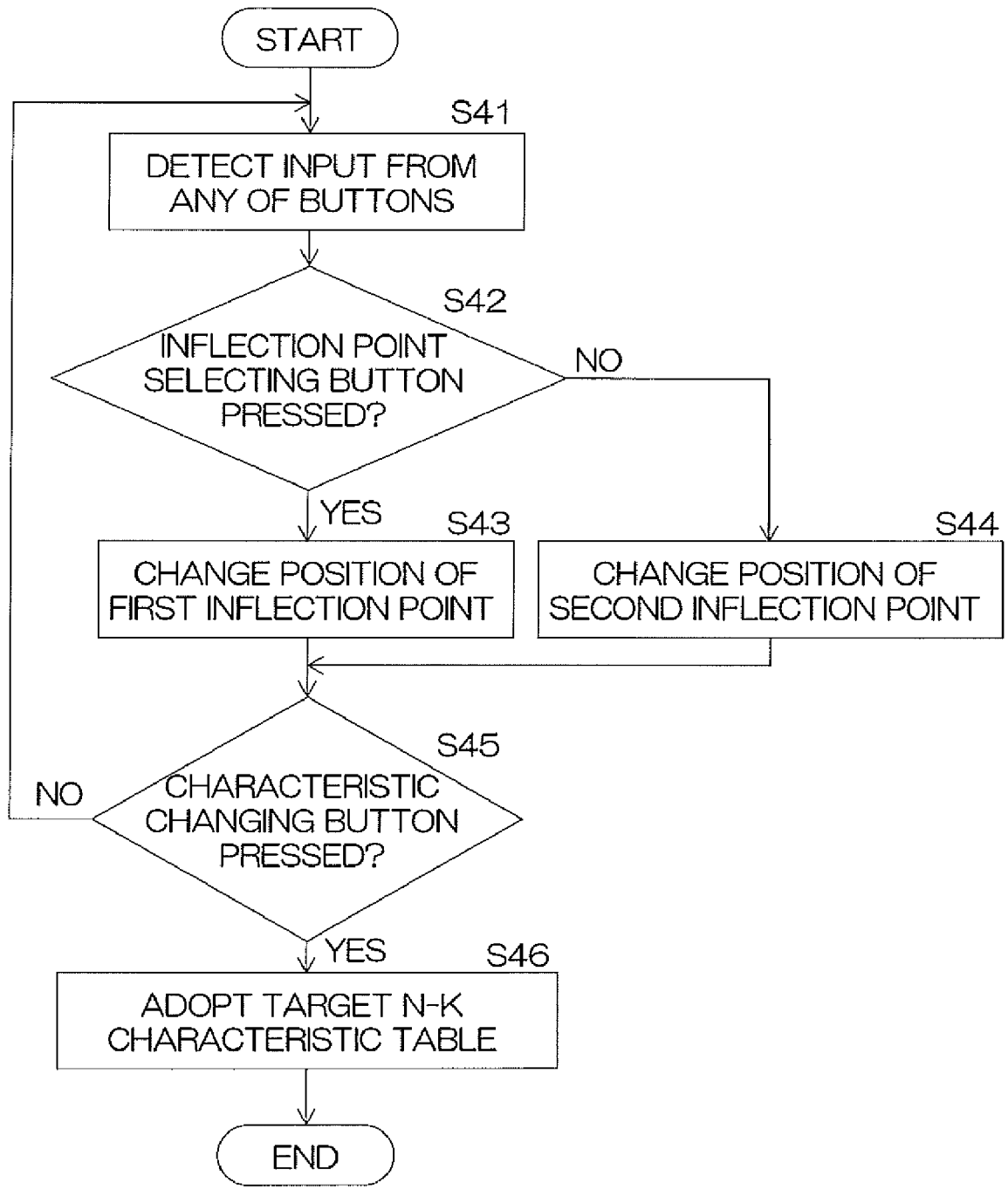
FIG. 24 is a flow chart for explaining an exemplary process for modifying the target N-K characteristic table with the use of the cross button.

FIG. 24 is a flow chart for explaining an exemplary process (target N-K characteristic setting process) to be performed by the target characteristic setting module 67 for changing the target N-K characteristic table by means of the cross button 76. The target characteristic setting module 67 monitors an input from any of the buttons (Step S41). If an input from any of the buttons is detected, the target characteristic setting module 67 judges whether the inflection point selecting button 85 (see FIG. 16) is pressed (Step S42).

If the inflection point selecting button 85 is pressed (YES in Step S42), the operator is permitted to change the position of the first inflection point 71 (Step S43). On the other hand, if the inflection point selecting button 85 is not pressed (NO in Step S42), the operator is permitted to change the position of the second inflection point 72 (Step S44). Then, the operator changes the position of the inflection point by pressing the left and right buttons 79, 80 and the upper and lower buttons 77, 78 of the cross button 76 (see FIG. 16).

More specifically, if either of the left and right buttons 79, 80 is pressed once, the engine speed at the inflection point is increased or reduced by about 5%, for example. That is, if the left button 79 is pressed, the engine speed at the inflection point is changed by about −5%, for example. If the right button 80 is pressed, the engine speed at the inflection point is changed by +5%. On the other hand, if either of the upper and lower buttons 77, 78 is pressed once, the target gain at the inflection point is increased or reduced, for example, by about 0.1 from the normalized target gain (from a target gain of 1 at the first inflection point 71). That is, if the upper button 77 is pressed, the normalized target gain at the inflection point is changed by about +0.1, for example. If the lower button 78 is pressed, the normalized target gain at the inflection point is changed by about −0.1, for example. Where the target gain at the first inflection point 71 is to be changed, all the target gains in the target N-K characteristic are normalized in the aforementioned manner so that the changed target gain at the first inflection point 71 is equal to 1.

Then, the target characteristic setting module 67 judges whether the characteristic changing button 84 is pressed (Step S45). If the characteristic changing button 84 is not pressed, a process sequence from Step S41 is repeated to receive an input from the operator for changing the position of either of the inflection points.

If the characteristic changing button 84 is pressed, the target characteristic setting module 67 adopts the thus set characteristic as the target N-K characteristic table (Step S46), and stores the adopted target N-K characteristic table in the target N-K characteristic table storage section 67M. Then, the target N-K characteristic setting process ends.

Next, a process to be performed by the target characteristic setting module 67 based on an input from the touch panel 75 will be described. An input operation is performed on the touch panel 75 by directly touching the screen of the display device 15 by the touch pen 83. However, the input operation may be performed with the use of a pointing device such as a mouse.

Figure 25:
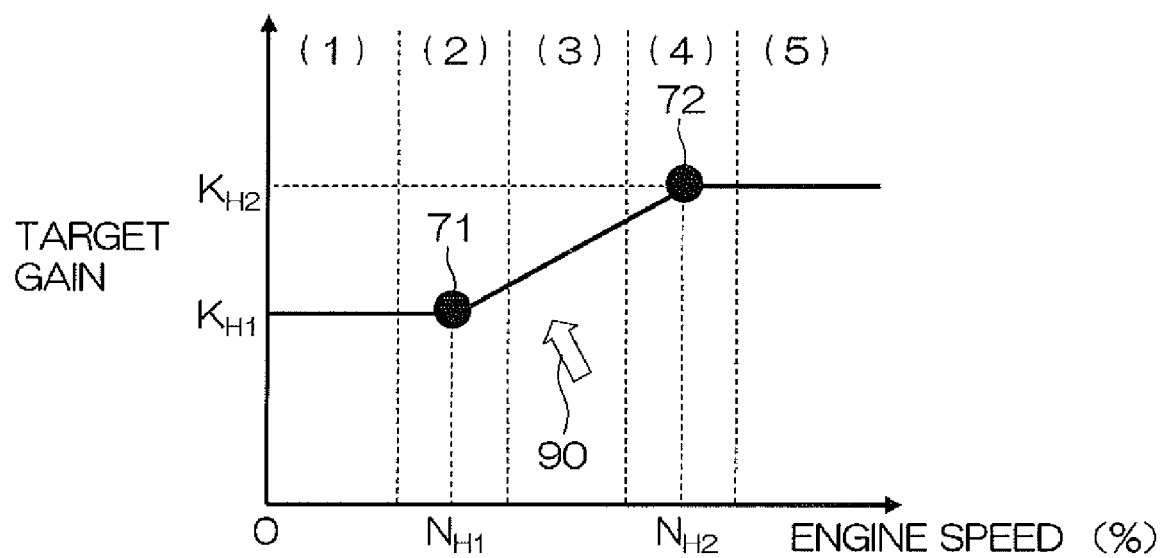
FIG. 25 is a diagram for explaining operating regions to be operated when the target N-K characteristic table is modified on a touch panel.

As shown in FIG. 25, the display screen of the display device 15 is divided into the following five regions. That is, an insensitive region (1), a first inflection point operating region (2), an insensitive region (3), a second inflection point operating region (4) and an insensitive region (5) are arranged in order of increasing engine speed. The first inflection point operating region (2) is defined as a region centering on the engine speed $N_{H1}$ at the first inflection point 71. The second inflection point operating region (4) is defined as a region centering on the engine speed $N_{H2}$ at the second inflection point 72. More specifically, these regions are defined as follows:

Insensitive region (1)

$$0 \leq N < N_{H1} - 5 (\%)$$

First inflection point operating region (2)

$$N_{H1} - 5 \leq N \leq N_{H1} + 5 (\%)$$

Insensitive region (3)

$$N_{H1} + 5 < N < N_{H2} - 5 (\%)$$

Second inflection point operating region (4)

$$N_{H2} - 5 \leq N \leq N_{H2} + 5 (\%)$$

Insensitive region (5)

$$N_{H2} + 5 < N \leq 100 (\%)$$

Figure 26:
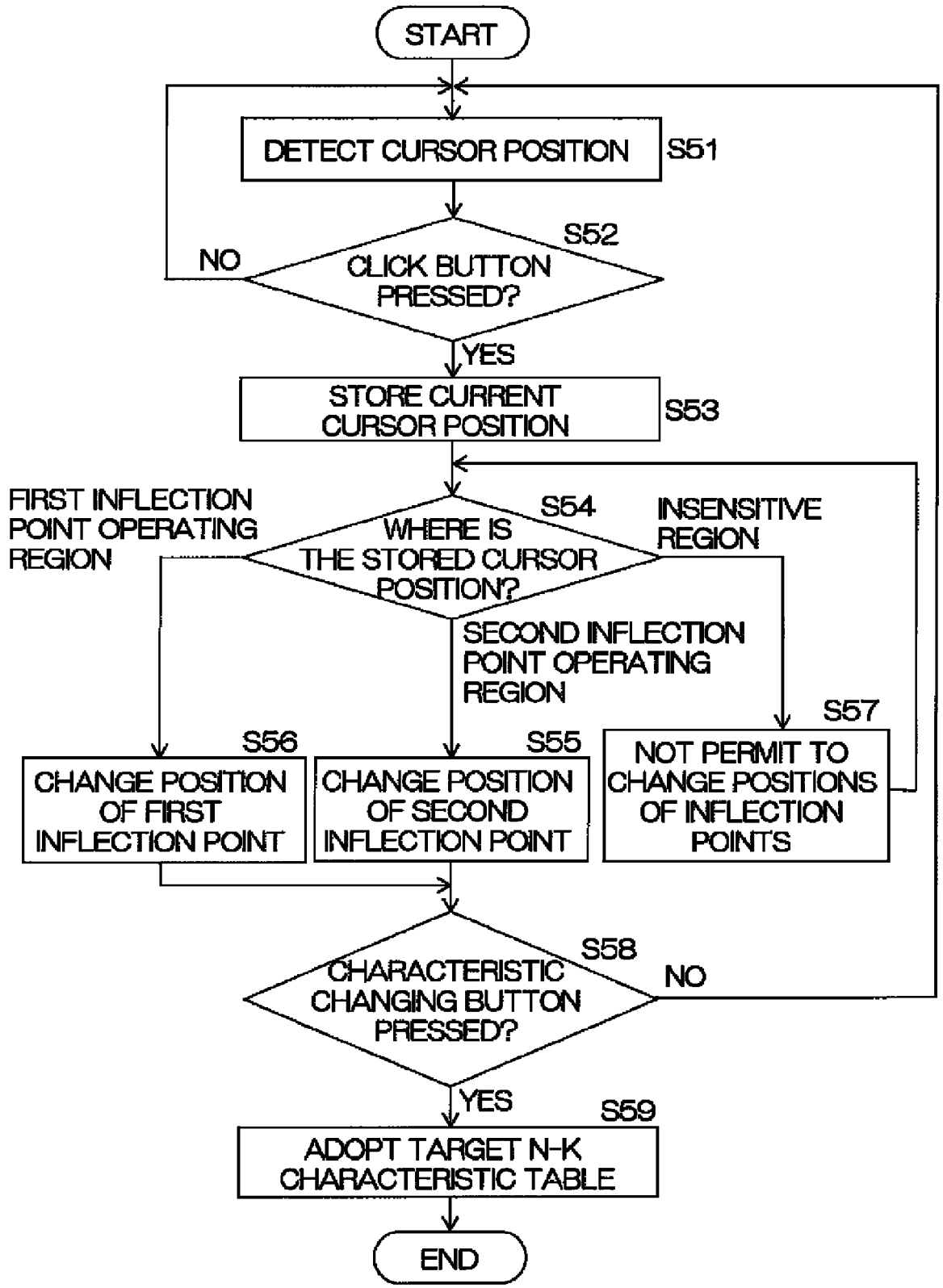
FIG. 26 is a flow chart for explaining an exemplary process for modifying the target N-K characteristic table on the touch panel.

FIG. 26 is a flow chart for explaining an exemplary process (target N-K characteristic setting process) to be performed by the target characteristic setting module 67 based on the input from the touch panel 75. First, the target characteristic setting module 67 detects the position of a cursor 90 (see FIG. 25) displayed on the screen of the display device 15 (a point currently touched or finally touched by the touch pen 83) (Step S51). Further, the target characteristic setting module 67 judges whether the click button 83A of the touch pen 83 is pressed for the dragging operation (Step S52). The dragging operation is such that the position of the touch pen 83 is changed on the screen with the click button 83A being pressed. If the click button 83A is not pressed, the process returns to Step S51. If the click button 83A is pressed, the current position of the cursor 90 on the screen is stored in a memory (not shown) (Step S53).

When the current position of the cursor 90 is stored, the target characteristic setting module 67 determines which of the five regions, i.e., the insensitive region (1), the first inflection point operating region (2), the insensitive region (3), the second inflection point operating region (4) and the insensitive region (5), contains the cursor 90 (Step S54). If the cursor 90 is present in the second inflection point operating region (4), the operator is permitted to change the position of the second inflection point 72 (Step S55). If the cursor 90 is present in the first inflection point operating region (2), the operator is permitted to change the position of the first inflection point 71 (Step S56). If the cursor 90 is present in the insensitive region (1), (3) or (5), the operator is not permitted to change the positions of the inflection points (Step S57).

When the position of either of the first and second inflection points 71, 72 is to be changed in Step S55 or S56, the target characteristic setting module 67 detects vertical and lateral displacements of the cursor 90. That is, the vertical and lateral displacements of the cursor 90 are detected based on the positional change of the cursor 90 moved from the cursor position stored in the memory by the dragging operation with the touch pen 38. Then, the target characteristic setting module 67 updates the engine speed and the target gain at the inflection point according to the detected vertical and lateral displacements. When the target gain at the first inflection point 71 is to be changed, all the target gains in the target N-K characteristic are normalized in the aforementioned manner so that the updated target gain at the first inflection point 71 is equal to 1.

After the change of the position of the second inflection point (Step S55) or the change of the first inflection point (Step S56), the target characteristic setting module 67 judges whether the characteristic changing button 84 is pressed (Step S58). If the characteristic changing button 84 is not pressed, a process sequence from Step S51 is repeated. Thus, the operator continues to change the target N-K characteristic table. On the other hand, if the characteristic changing button 84 is pressed, the target characteristic setting module 67 adopts the target N-K characteristic table thus updated (Step S59). Then, the target characteristic setting module 67 stores the adopted target N-K characteristic table in the target N-K characteristic table storage section 67M, and ends the target N-K characteristic setting process.

Upon the end of the target N-K characteristic setting process, the N-S-R characteristic map calculating module 62 calculates the N-S-R characteristic map according to the updated target N-K characteristic table.

In this preferred embodiment, the operator can easily change the target gain by thus operating the touch panel 75 and/or the cross button 76 in an intuitive and simple manner while checking the target N-K characteristic line. Thus, the target N-K characteristic can be easily set as desired. Further, the target N-K characteristic thus set can be easily updated by the same operation. Thus, the turning behavior of the marine vessel 1 with respect to the operation angle of the steering wheel 7a at any engine speed can be adapted for the operator's preference. As a result, the operator can easily and properly maneuver the marine vessel 1 irrespective of his marine vessel maneuvering skill.

A plurality of target N-K characteristic tables determined by the target characteristic setting module 67 may be registered in the target N-K characteristic table storage section 67M. In this case, one of the registered target N-K characteristic tables is selected to be read out according to the state of the marine vessel 1 or the operator's preference. The N-S-R characteristic map is updated based on the selected target N-K characteristic table. This facilitates the setting of the target N-K characteristic.

Figure 27:
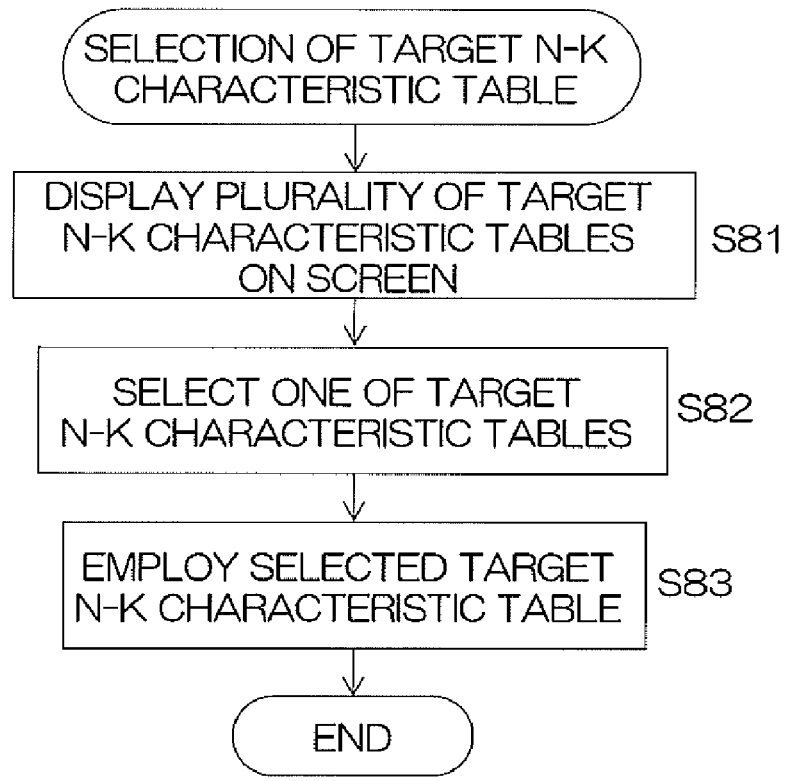
FIG. 27 is a flow chart for explaining an exemplary process for setting the target N-K characteristic.

More specifically, as shown in FIG. 27, the target characteristic setting module 67 reads out the plurality of target N-K characteristic tables from the target N-K characteristic table storage section 67M in response to a predetermined operation performed on the input device 14. The target N-K characteristic tables thus read out are displayed on the display device 15 (Step S81). The operator selects one of the target N-K characteristic tables by operating the input device 14 (selecting unit) (Step S82). The selected target N-K characteristic table is used for the calculation by the N-S-R characteristic map calculating module 62 (Step S83).

N-S-R characteristic maps previously calculated for the respective target N-K characteristic tables stored in the target N-K characteristic table storage section 67M are preferably stored in the N-S-R characteristic map storage section 62M. In this case, when one of the target N-K characteristic tables is selected by operating the input device 14, the N-S-R characteristic map calculating module 62 selects a corresponding one of the N-S-R characteristic maps. The target steering angle calculating module 61 performs the calculation based on the selected N-S-R characteristic map. This arrangement obviates the calculation of the N-S-R characteristic map, thereby reducing a computation load on the N-S-R characteristic map calculating module 62.

Second Preferred Embodiment

Figure 28:
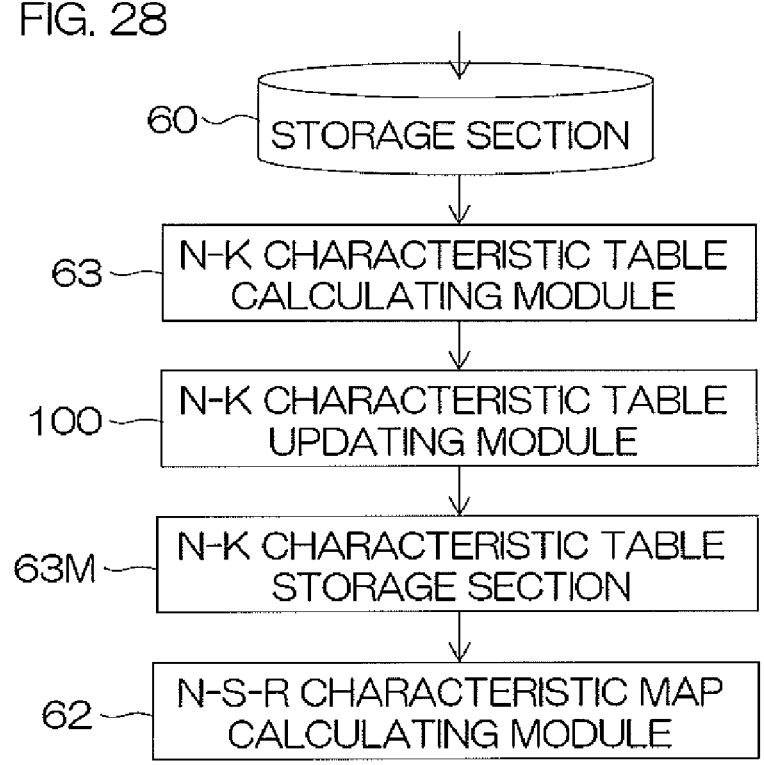
FIG. 28 is a block diagram for explaining an arrangement according to a second preferred embodiment of the present invention.

FIG. 28 is a block diagram for explaining an arrangement according to a second preferred embodiment of the present invention. When a required amount of data is accumulated in the storage section 60 by the data collecting section 64, the N-K characteristic table calculating module 63 calculates a new N-K characteristic table. In the preferred embodiment previously described, the new N-K characteristic table is preferably stored as it is in the N-K characteristic table storage section 63M, and used for the calculation of the N-S-R characteristic map. In this preferred embodiment, on the contrary, the N-K characteristic table to be used for the calculation of the N-S-R characteristic map preferably is conditionally updated by an N-K characteristic table updating module 100.

Figure 29:
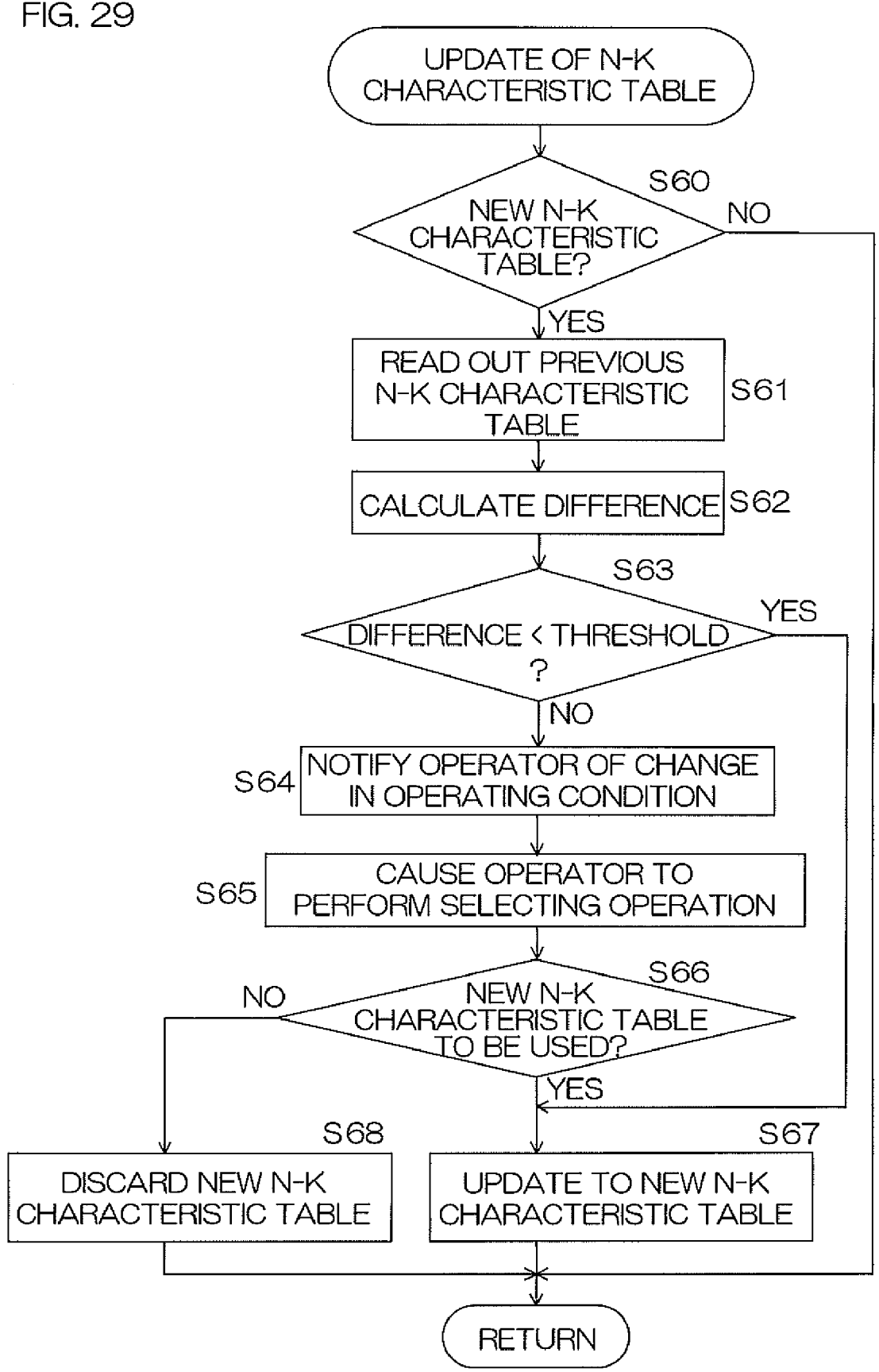
FIG. 29 is a flow chart for explaining an exemplary process for updating an N-K characteristic table.

FIG. 29 is a flow chart for explaining the function of the N-K characteristic table updating module 100. When the new N-K characteristic table is calculated by the N-K characteristic table calculating module 63 (YES in Step S60), the N-K characteristic table updating module 100 reads out the previous N-K characteristic table stored in the N-K characteristic table storage section 63M (Step S61). The N-K characteristic table updating module 100 further calculates a difference between the new N-K characteristic table and the previous N-K characteristic table (Step S62). The calculation of the difference is achieved, for example, by calculating a distance between average engine speed vectors (engine speed representative values) of the new and previous N-K characteristic tables. Alternatively, the calculation of the difference may be achieved by calculating a distance between average gain vectors (gain representative values) of the new and previous N-K characteristic tables.

The N-K characteristic table updating module 100 judges whether the calculated difference is smaller than a predetermined threshold, functioning as a difference judging unit (Step S63). If the difference is smaller than the threshold, the N-K characteristic table updating module 100 unconditionally writes the new N-K characteristic table in the N-K characteristic table storage section 63M (Step S67). Thus, the N-K characteristic table to be used for the calculation of the N-S-R characteristic map is updated to the new N-K characteristic table.

On the other hand, if the calculated difference is not smaller than the threshold (NO in Step S63), the N-K characteristic table updating module 100 suspends the update of the N-K characteristic table, functioning as an update suspending unit. Then, the N-K characteristic table updating module 100 notifies the operator that the update of the N-K characteristic table is suspended (Step S64). The notification may be provided, for example, by displaying a predetermined message on the display device 15. An example of the message is "The operating condition has been updated. Is the updated operating condition to be used?" Alternatively, an alarm or an audible message may be provided from a speaker to the operator. Here, the display device 15 functions as an inquiry unit. Upon the notification (inquiry), the operator becomes aware of the update of the operating condition (marine vessel maneuvering characteristic), and determines whether to use the new operating condition.

In response to the notification, the operator operates the input device 14 (characteristic update commanding unit) to decide whether to use the new N-K characteristic table (Step S65). More specifically, for example, buttons to be selectively pressed for determining whether to update the previous N-K characteristic table to the new N-K characteristic table or to continue to use the previous N-K characteristic table are displayed on the display device 15. The operator selects the new N-K characteristic table or the previous N-K characteristic table by operating one of these buttons.

If the new N-K characteristic table is to be used (YES in Step S66), the N-K characteristic table updating module 100 writes the new N-K characteristic table in the N-K characteristic table storage section 63M (Step S67). Thus, the N-K characteristic table to be used for the calculation of the N-S-R characteristic map is updated.

If the previous N-K characteristic table is to be used (NO in Step S66), the N-K characteristic table updating module 100 discards the new N-K characteristic table (Step S68).

Where the number of crew members and/or passengers or the weight of the cargo is temporarily changed, for example, the marine vessel travels in a state different from an ordinary traveling state. In this case, the N-K characteristic is likely to be drastically changed as compared with the previous N-K characteristic. If the N-K characteristic table was automatically changed in this case, it would be difficult to control the marine vessel as desired when the traveling state is restored to the ordinary traveling state. This would cause an unnatural or uncomfortable feeling in the operator.

In this preferred embodiment, therefore, the N-K characteristic table is updated on approval by the operator, if the newly calculated N-K characteristic is significantly changed from the previous N-K characteristic.

Figure 30:
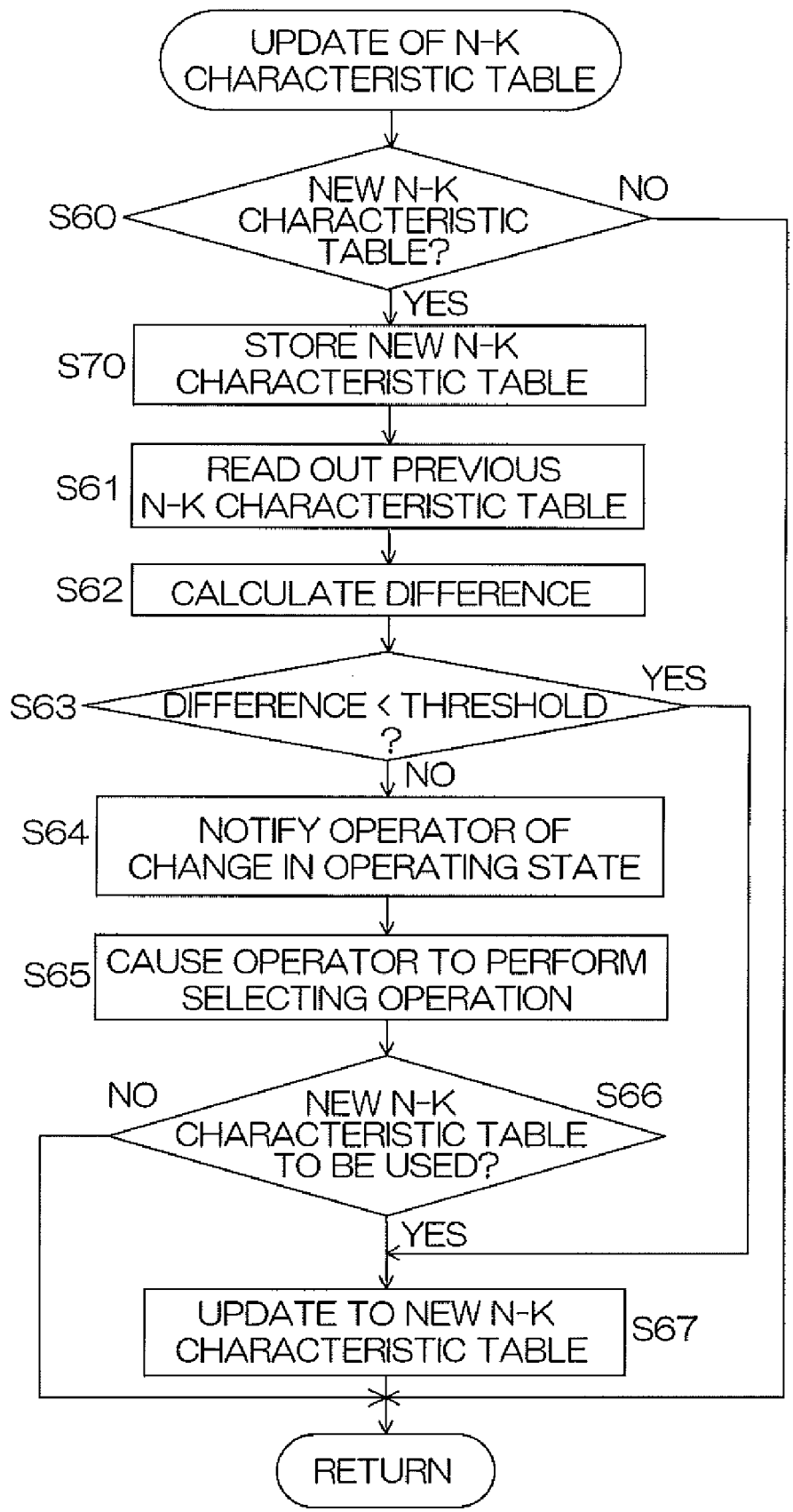
FIG. 30 is a flow chart for explaining another exemplary process for updating the N-K characteristic table.

FIG. 30 is a flow chart for explaining another exemplary process to be performed by the N-K characteristic table updating module 100. In FIG. 30, steps corresponding to those shown in FIG. 29 will be indicated by the same step numbers. This process is preferably used when a plurality of N-K characteristic tables are stored in the N-K characteristic table storage section 63M.

When the new N-K characteristic table is calculated by the N-K characteristic table calculating module 63 (YES in Step S60), the N-K characteristic table updating module 100 stores the new N-K characteristic table in the N-K characteristic table storage section 63M (Step S70). At this time, however, the new N-K characteristic table is not necessarily used for the calculation of the N-S-R characteristic map.

If the difference between the new N-K characteristic table and the previous N-K characteristic table is smaller (YES in Step S63) or if the operator decides to use the new N-K characteristic table (YES in Step S66), the new N-K characteristic table is preferably used (Step S67). In this process, the N-K characteristic table updating module 100 selects the new N-K characteristic table from the N-K characteristic tables stored in the N-K characteristic table storage section 63M for the calculation of the N-S-R characteristic map.

Even if the new N-K characteristic table is not used (NO in Step S66), it is not necessary to discard the new N-K characteristic table.

Third Preferred Embodiment

Figure 31:
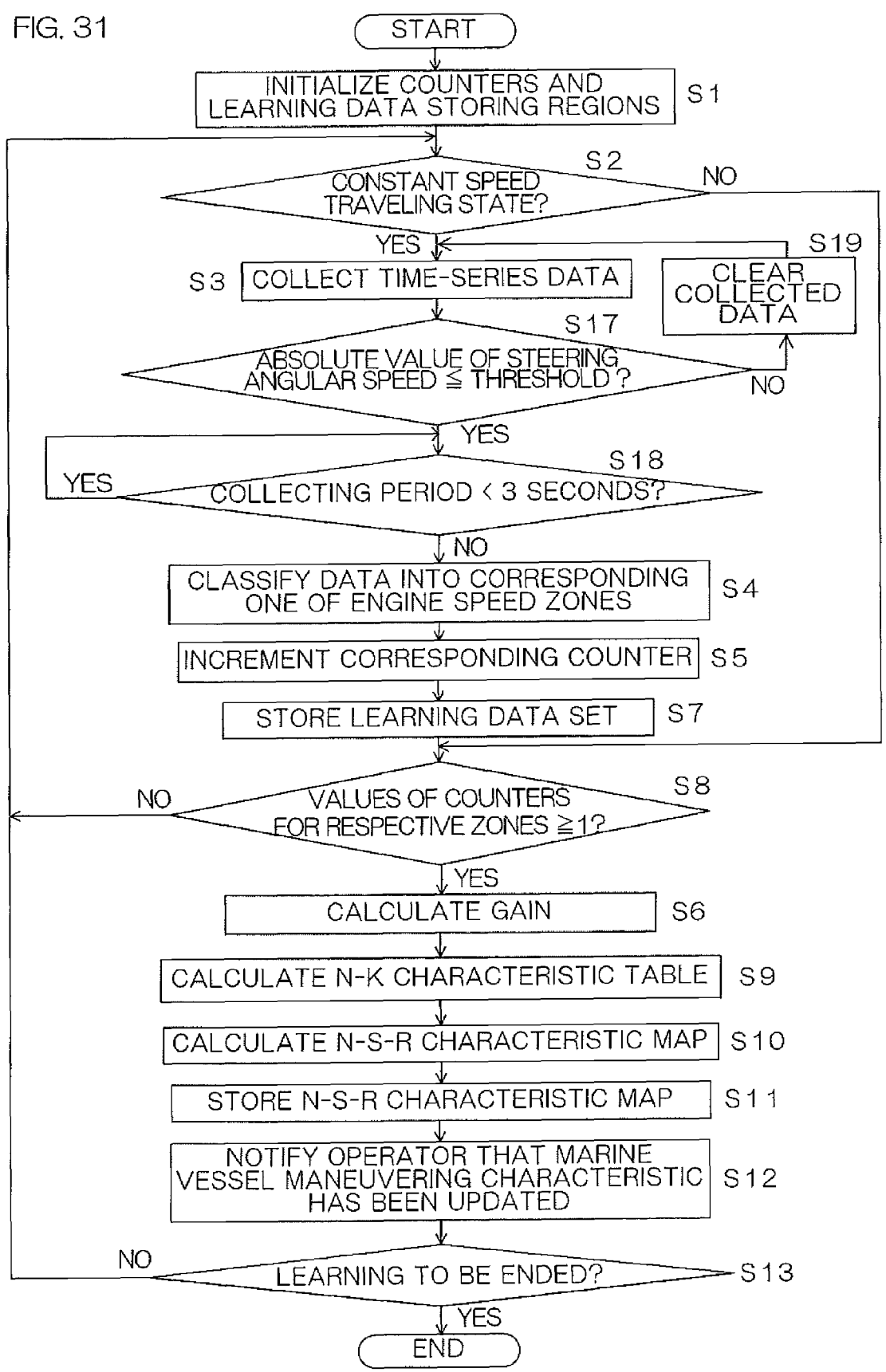
FIG. 31 is a flow chart for explaining an operation of a steering control section according to a third preferred embodiment of the present invention.

In a third preferred embodiment of the present invention, the gain K is preferably determined in a manner different from those in the first and second preferred embodiments. FIG. 31 is a flow chart for explaining the operation of the steering control section 28 according to the third preferred embodiment. In FIG. 31, steps corresponding to those shown in FIG. 9 will be indicated by the same step numbers. Reference will also be made to FIG. 7.

The data collecting section 64 collects time-series data sets of the engine speed, the steering angle and the yaw rate from the outboard motor ECU 11 for a predetermined period (Step S3) if the marine vessel 1 is in the constant speed traveling state (Step S2).

Figure 32:
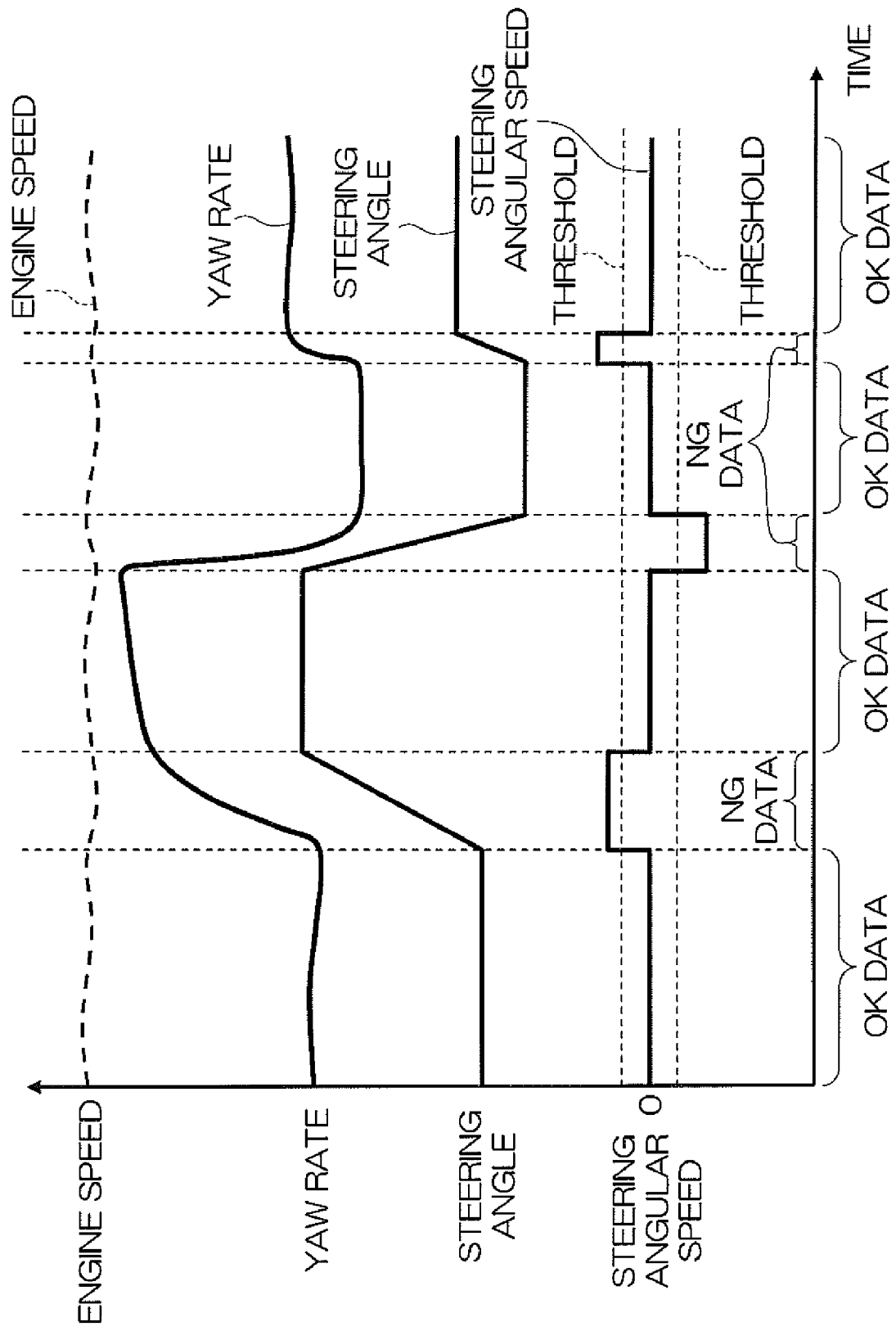
FIG. 32 is a graph showing time-series data collected according to the third preferred embodiment.

As shown in FIG. 32, if the steering angle is kept generally constant, the angular speed of the steering angle (hereinafter referred to as "steering angular speed") has an absolute value not greater than a predetermined threshold defined at around 0. The steering angular speed is determined by differentiating a change in the steering angle with time. When the steering angle is changed, the steering angular speed has an absolute value greater than the threshold before and after the change in the steering angle. In the following description, time-series data obtained when the steering angular speed has an absolute value not greater than the threshold is regarded as OK data, and time-series data obtained when the steering angular speed has an absolute value greater than the threshold is regarded as NG data.

Referring back to FIG. 31, if the steering angular speed has an absolute value greater than the threshold (NO in Step S17), the data collecting section 64 clears the collected data (NG data) (Step S19), and collects time-series data again (Step S3). If a data collecting period during which the steering angular speed has an absolute value not greater than the threshold is not less than a predetermined period (e.g., three seconds) (NO in Step S18), the data collecting section 64 calculates a representative value (average) of the engine speeds of the time-series data (OK data). The data collecting section 64 classifies the collected time-series data into a corresponding one of the zones $M_i$ based on the representative value (Step S4). The data collecting section 64 increments the counter $c_i$ for that zone $M_i$ (Step S5). Further, the data collecting section 64 stores a data pair (R, ω) including an average steering angle R and an average yaw rate X of the time-series data as learning data for the corresponding zone $M_i$ in the storage section 60 (Step S7).

Figure 33:
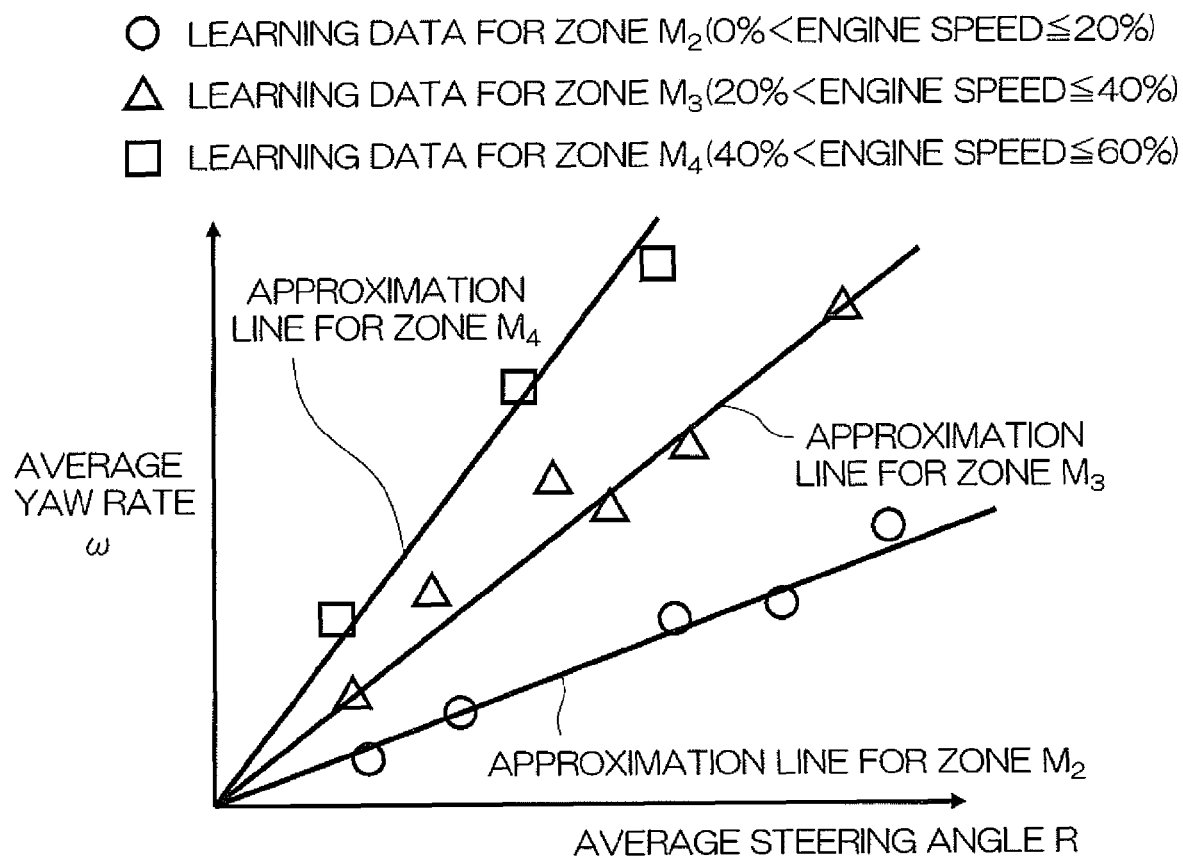
FIG. 33 is a diagram for explaining calculation of an engine speed-gain characteristic according to the third preferred embodiment.

An example of the learning data is shown in FIG. 33. In FIG. 33, plots of data pairs only for the engine speed zones $M_2$ to $M_4$ in a certain engine speed range (0%<engine speed N≦60%) are shown for convenience of description. Every time the steering angle is changed, the learning data preferably is calculated based on OK data (see FIG. 32), and stored in the storage section 60. Thus, a relationship between the average steering angle R and the average yaw rate X for a certain engine speed zone (zone $M_i$) is determined.

The gain calculating section 69 judges whether the counters $c_1$ to $c_7$ for the respective zones each have a value not smaller than a predetermined lower limit value ("1" in this preferred embodiment) (Step S8). If the counters $c_1$ to $c_7$ for the respective zones each have a value not smaller than the predetermined lower limit value, the gain calculating section 69 performs a gain calculating operation (Step S6). If not all the values of the counters $c_i$ reach the lower limit value, a process sequence from Step S2 is repeated.

In the gain calculating operation, the gain calculating section 69 determines approximation lines for the learning data in the respective engine speed zones as shown in FIG. 33, for example, by the least square method. The approximation lines each have an intercept of 0, and a slope which corresponds to a gain (a yaw rate gain for the steering angle). Thus, the gain calculating section 69 calculates a gain for each of the engine speed zones (zone $M_i$).

The N-K characteristic table calculating module 63 calculates an N-K characteristic table based on data pairs each including the gain K calculated by the gain calculating section 69 and the corresponding engine speed N (an average engine speed for the corresponding zone $M_i$). The N-K characteristic table thus calculated is substantially equal to the N-K characteristic table (see FIG. 12) obtained in the first and second preferred embodiments when being normalized.

In the third preferred embodiment, the gain can be easily determined without the need for the computation process which is required in the first and second preferred embodiments for changing the gain until the difference between the model value and the measurement value of the yaw rate is minimized.

Fourth Preferred Embodiment

Figure 34:
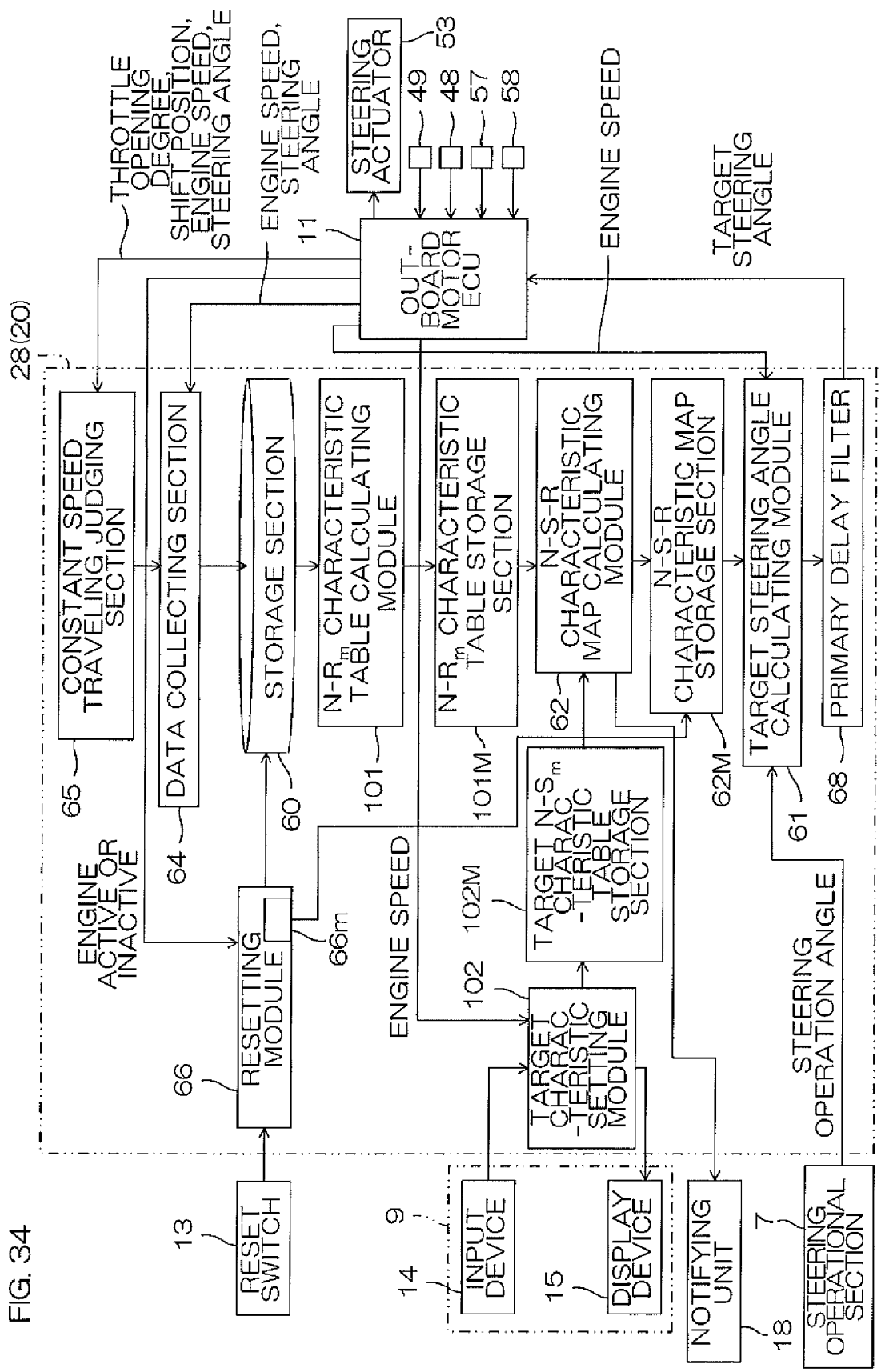
FIG. 34 is a block diagram for explaining the construction of a steering control section according to a fourth preferred embodiment of the present invention.

FIG. 34 is a block diagram for explaining the construction of a steering control section 28 according to a fourth preferred embodiment of the present invention. In FIG. 34, components corresponding to those shown in FIG. 7 will be denoted by the same reference characters as in FIG. 7. In the fourth preferred embodiment, the yaw rate sensor 12 is preferably not provided, but a maximum one of steering angles (maximum steering angle Rm) in a steering angle history at each engine speed is preferably used as an index of the turning behavior of the marine vessel 1 instead of the gain.

The gain calculating section 69 preferably is not provided in the steering control section 28. Instead of the N-K characteristic table calculating module 63, an N-Rm characteristic table calculating module 101 (a steering angle history characteristic computing unit and a maximum steering angle characteristic computing unit) is preferably provided, and calculates a table of an N-Rm characteristic defining an actual relationship between the engine speed N and the maximum steering angle Rm (a steering angle history characteristic or a maximum steering angle characteristic). Accordingly, an N-Rm characteristic table storage section 101M for storing the N-Rm characteristic table is preferably provided instead of the N-K characteristic table storage section 63M. Further, a target characteristic setting module 102 (a target marine vessel maneuvering characteristic setting unit, a maximum operation amount setting unit and a target characteristic line updating unit) is preferably provided instead of the target characteristic setting module 67. The target characteristic setting module 102 determines a target characteristic for an N-Sm characteristic (target N-Sm characteristic) defining a relationship between the engine speed N and a target value of a maximum operation angle (target maximum operation angle Sm). Instead of the target N-K characteristic table storage section 67M, a target N-Sm characteristic table storage section 102M for storing a target N-Sm characteristic table is preferably provided in relation to the target characteristic setting module 102.

Figure 35:
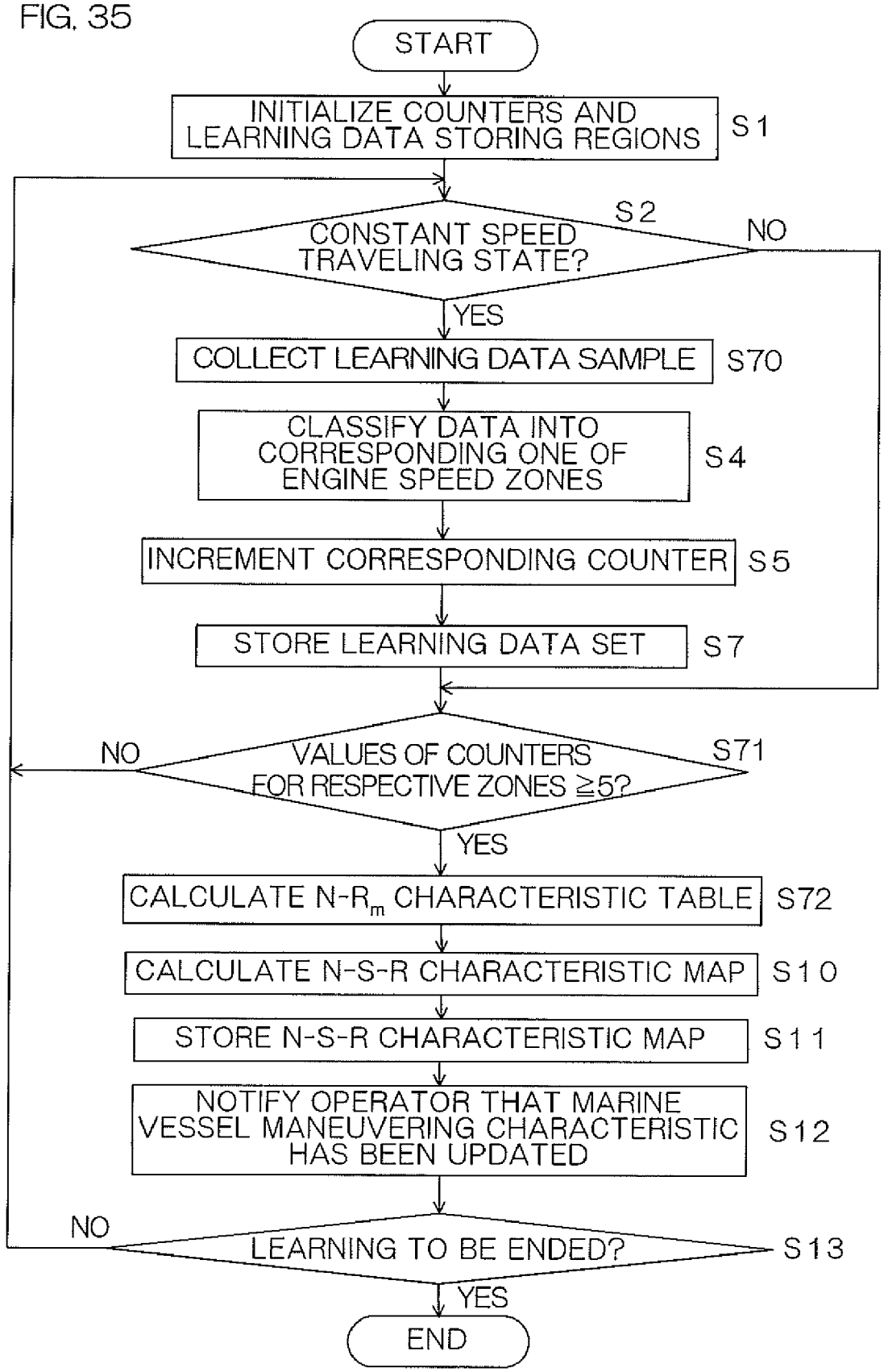
FIG. 35 is a flow chart for explaining an operation of the steering control section according to the fourth preferred embodiment.

FIG. 35 is a flow chart for explaining the operation of the steering control section 28 according to the fourth preferred embodiment. In FIG. 35, steps corresponding to those shown in FIG. 9 will be indicated by the same step numbers.

The data collecting section 64 collects a learning data sample including the engine speed N and the steering angle R as a pair for each of the engine speed zones $M_i$ from the outboard motor ECU 11 (Step S70) if the constant speed traveling judging section 65 judges that the marine vessel 1 is in the constant speed traveling state (Step S2). Further, the data collecting section 64 classifies the learning data sample into a corresponding one of the zones $M_i$ based on the engine speed (Step S4). Then, the data collecting section 64 increments the counter $c_i$ for that zone $M_i$ (Step S5), and stores the learning data sample in the storage section 60 (Step S7).

The N-Rm characteristic table calculating module 101 judges whether the counters $c_1$ to $c_7$ for the respective zones each have a value not smaller than a predetermined lower limit value ("5" in this preferred embodiment) (Step S71). If the counters $c_1$ to $c_7$ for the respective zones each have a value not smaller than the predetermined lower limit value, the N-Rm characteristic table calculating module 101 performs an N-Rm characteristic table calculating operation (Step S72). If not all the values of the counters $c_i$ reach the lower limit value, the N-Rm characteristic table calculating module 101 judges that the learning data is insufficient, and does not perform the N-Rm characteristic table calculating operation. In this case, a process sequence from Step S2 is repeated. Thus, a plurality of learning data samples are accumulated in the zones $M_i$ as each indicated by a white circle or a black circle in FIG. 36.

If the counters $c_i$ for the respective zones each have a value not smaller than the lower limit value "5", the N-Rm characteristic table calculating module 101 selects a predetermined number of higher-end learning data samples (as each indicated by a black circle in FIG. 36) from a data sequence obtained by arranging learning data samples classified in each of the zones $M_i$ in order of increasing steering angle. The learning data samples thus selected will hereinafter be referred to as "selected data samples". In order to increase the reliability of the selected data samples, learning data samples (outlier data samples) significantly deviating from a learning data distribution in each of the zones $M_i$ may be preliminarily eliminated. Further, the learning data samples may be collected only when the steering angle is kept constant for not shorter than a predetermined period (e.g., three seconds). This ensures stable learning data collection (free from the outlier data samples).

Figure 36:
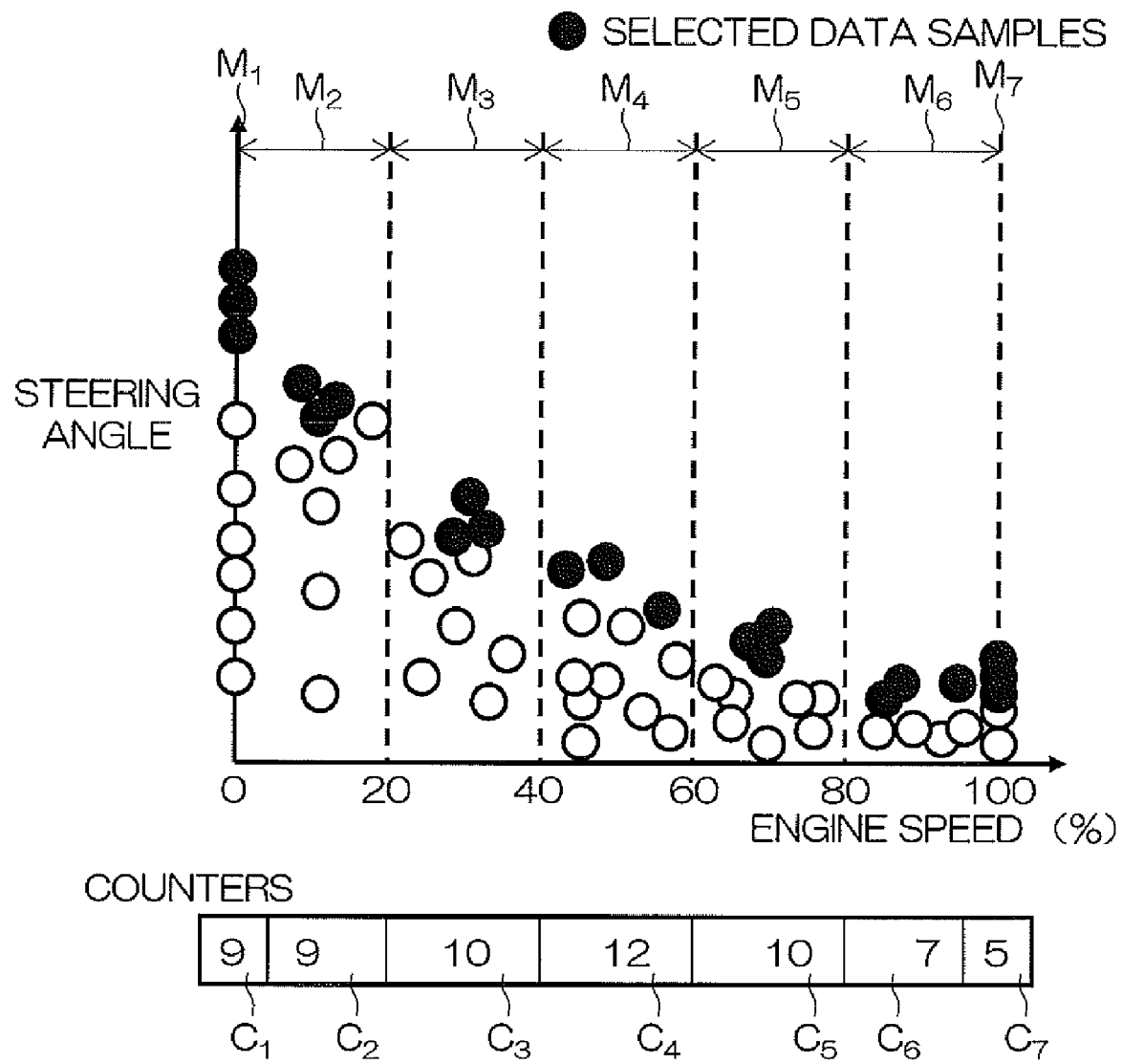
FIG. 36 is a diagram for explaining calculation of an engine speed-maximum steering angle characteristic.

The N-Rm characteristic table calculating module 101 determines representative data for the selected data samples in each of the zones $M_i$. More specifically, the N-Rm characteristic table calculating module 101 calculates the representative data from the following expression (6):

$$\overline{Rm}_i = \frac{1}{c_i} \sum_{j=1}^{c_i} R_{ij}, \quad (6)$$

$$\overline{N}_i = \frac{1}{c_i} \sum_{j=1}^{c_i} N_{ij},$$

$$i = 1, 2, \ldots, m$$

wherein Rm and N each affixed with an upper line are defined as averages, and $c_i$ is the number of the selected data samples (which is "3" in the example shown in FIG. 36). In this manner, an average engine speed $N_i$ and an average steering angle (maximum steering angle) $Rm_i$ are determined as the representative data of the selected higher-end data samples in each of the zones $M_i$.

Thus, an m-dimensional average engine speed vector $N=[N_1, N_2, \ldots, N_m]$ and an m-dimensional maximum steering angle vector $Rm=[Rm_1, Rm_2, \ldots, Rm_m]$ are provided. Here, the maximum steering angles $Rm_i$ for the respective zones are divided by the maximum steering angle $Rm_1$ for the first zone $M_1$, whereby the maximum steering angle vector Rm is normalized. That is, the normalized m-dimensional maximum steering angle vector Rm is represented by $Rm=[1, Rm_2/Rm_1, \ldots, Rm_m/Rm_1]$. A data pair [N, Rm] including the average engine speed vector (as an exemplary engine speed representative value vector) and the normalized maximum steering angle vector (as an exemplary maximum steering angle representative value vector) is provided as an N-Rm characteristic table.

Figure 37:
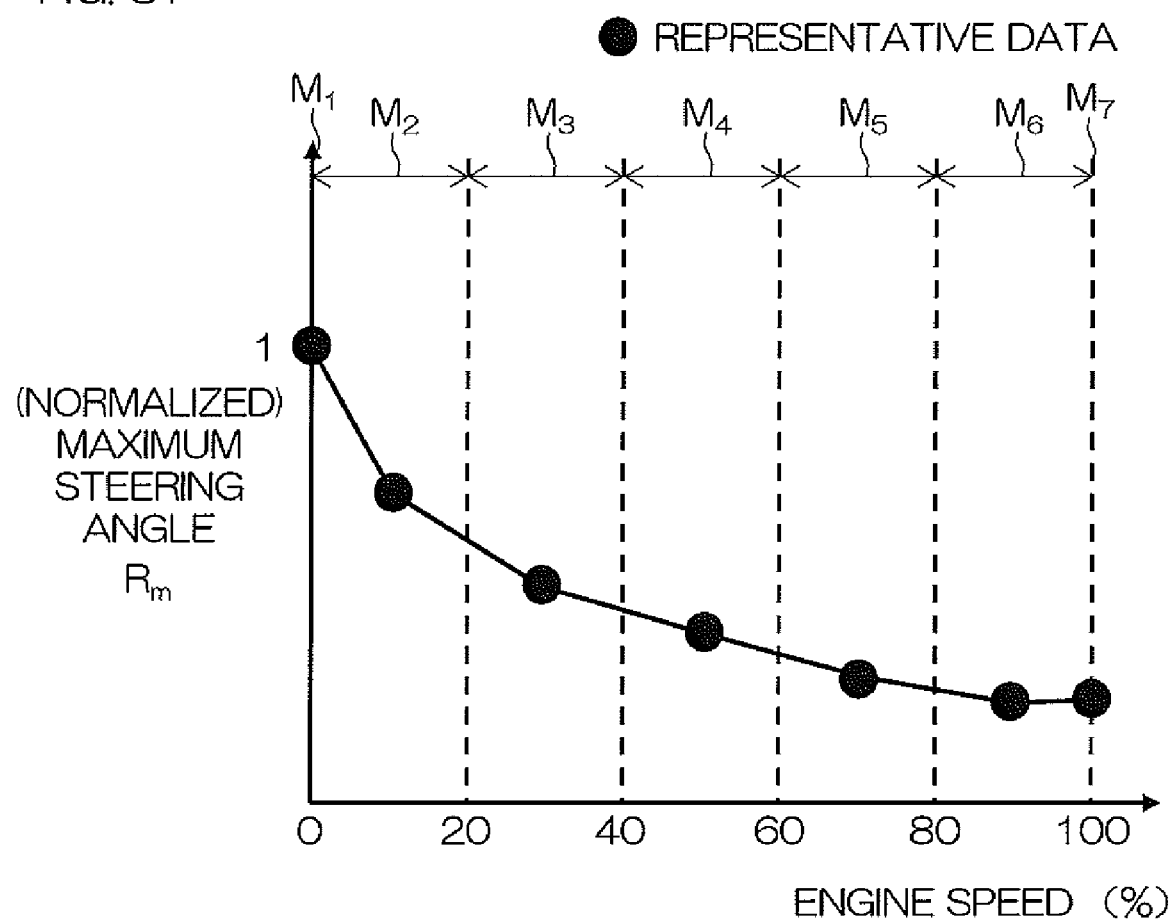
FIG. 37 is a diagram for explaining the calculation of the engine speed-maximum steering angle characteristic by way of example.

As shown in FIG. 37, the N-Rm characteristic table includes a finite number of discrete data plots (indicated by black circles in FIG. 37) each defined by the engine speed representative value and the maximum steering angle representative value. Characteristic data between the discrete data plots is estimated by linear interpolation as needed. A characteristic shown in FIG. 37 is such that the maximum steering angle varies depending on the engine speed and decreases with an increase in the engine speed from the lower engine speed range to the higher engine speed range as observed in a marine vessel which travels according to the initial N-S-R characteristic map (see FIG. 8). In other words, the maximum steering angle in the N-Rm characteristic table and the gain in the N-K characteristic table (see FIG. 12) provided in the first to third preferred embodiments preferably have opposite characteristics. This means that the operator tends to significantly change the steering angle because of a lower yaw rate (gain) in the lower engine speed range, and tends to slightly change the steering angle because of a higher yaw rate (gain) in the higher engine speed range. That is, the steering angle history, particularly, the maximum steering angle, is a result of the operator operating the steering wheel 7a according to the engine speed to achieve a desired turning behavior. Therefore, the N-Rm characteristic indirectly represents the N-K characteristic.

Referring back to FIG. 35, the N-S-R characteristic map calculating module 62 newly calculates an N-S-R characteristic map based on the initial N-S-R characteristic map (see FIG. 8) and the N-Rm characteristic table (see FIG. 37) (Step S10).

Figure 38:
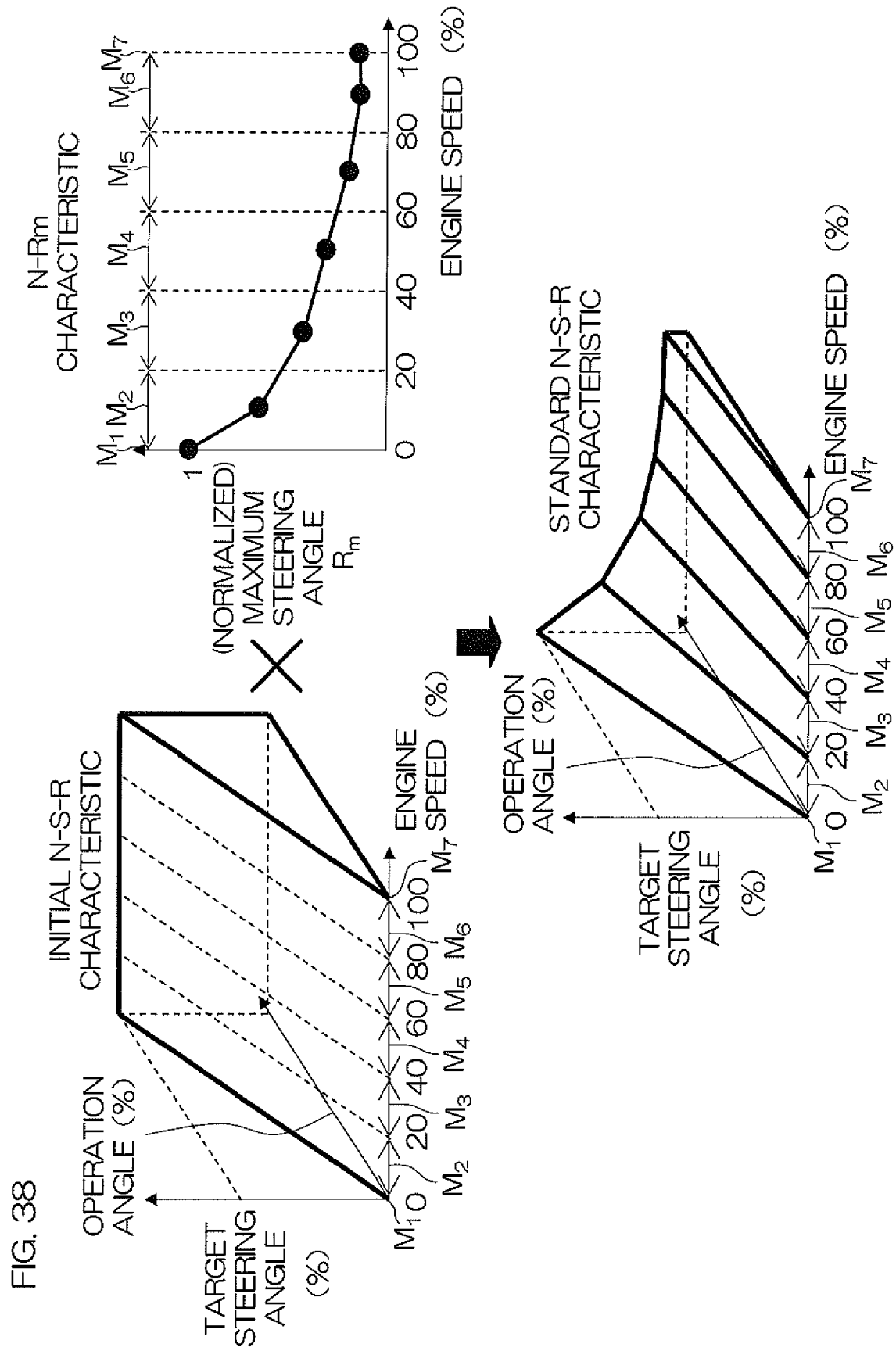
FIG. 38 is a diagram for explaining calculation of a standard N-S-R characteristic map according to the fourth preferred embodiment.

An N-S-R characteristic map calculating process is shown in FIG. 38. More specifically, the N-S-R characteristic map calculating module 62 divides the initial N-S-R characteristic map according to the zones $M_i$ of the engine speed N (see an upper left graph in FIG. 38). Then, the N-S-R characteristic map calculating module 62 multiplies all the target steering angles in the respective zones $M_i$ of the initial N-S-R characteristic map by the corresponding (normalized) maximum steering angles $Rm_i$ (maximum steering angle representative values) in the N-Rm characteristic table (see an upper right graph in FIG. 38) to update the initial N-S-R characteristic map. Thus, a standard N-S-R characteristic map (see a lower graph in FIG. 38) is calculated. As described above, the N-Rm characteristic table (see the upper right graph in FIG. 38) has a characteristic generally opposite to that of the N-K characteristic table (see the upper right graph in FIG. 13). Therefore, the division of the target steering angles in the initial N-S-R characteristic map by the corresponding normalized gains (gain representative values) (see FIG. 13) is substantially equivalent to the multiplication of the target steering angles in the initial N-S-R characteristic map by the corresponding normalized maximum steering angles Rm (maximum steering angle representative values) (see FIG. 38). In the fourth preferred embodiment, the N-Rm characteristic can be easily provided as an alternative characteristic of the N-K characteristic without the calculation of the gains to provide substantially the same standard N-S-R characteristic map as in the first to third preferred embodiments.

The standard N-S-R characteristic map is determined such that the maximum one of steering angles used at each engine speed by the operator in the past is defined as a target steering angle for an operation angle of 100%. More specifically, where a maximum steering angle of 10% was observed at a certain engine speed in the past, for example, the standard N-S-R characteristic map is determined such that a target steering angle of 10% is provided when the operation angle is 100% at that engine speed. That is, the N-S-R characteristic map calculating module 62 correlates the maximum operation amount with the maximum steering angle in the N-Rm characteristic table at each engine speed for the setting of the standard N-S-R characteristic map. Thus, the desired turning behavior can be provided by changing the operation angle to the maximum level at any engine speed, so that the operator can easily understand the marine vessel maneuvering characteristic.

Referring back to FIG. 35, the N-S-R characteristic map calculating module 62 updates the standard N-S-R characteristic map based on the target N-Sm characteristic table to provide a final N-S-R characteristic map (Step S10), and stores the final N-S-R characteristic map in the N-S-R characteristic map storage section 62M (Step S11). Further, the N-S-R characteristic map calculating module 62 causes the notifying unit 18 to notify the operator that the marine vessel maneuvering characteristic has been updated (the N-S-R characteristic map has been updated) (Step S12). Thereafter, the data collecting section 64 judges whether the learning is to be ended (Step S13). As in the first preferred embodiment, the N-S-R characteristic map may be conditionally updated (e.g., if the throttle opening degree is 0% and the operation angle is 0 degree) (see Step S15 in FIG. 14 and Step S16 in FIG. 15).

Next, the function of the target characteristic setting module 102 will be described.

Figure 39:
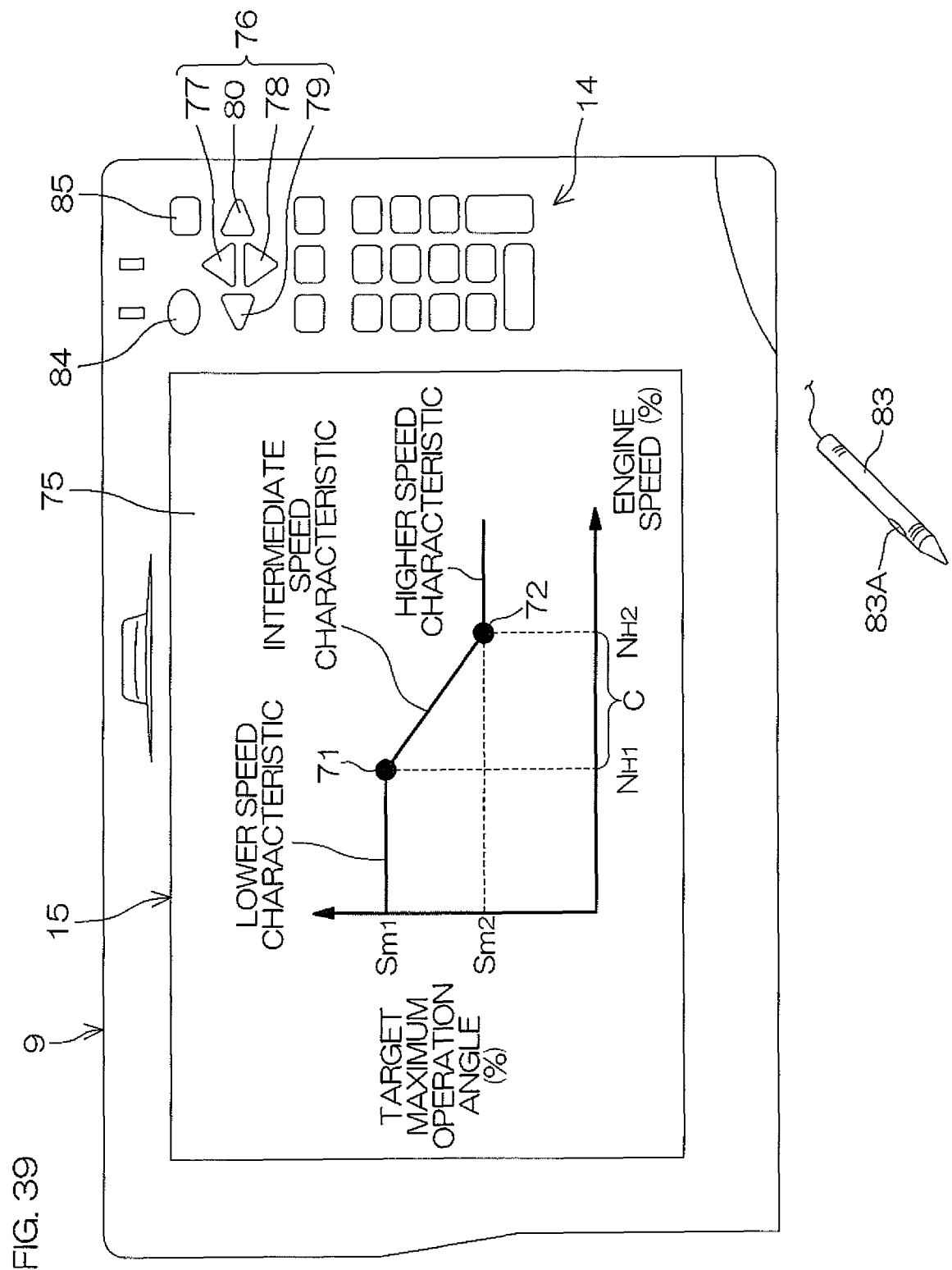
FIG. 39 is a diagram showing an exemplary target characteristic inputting section according to the fourth preferred embodiment.
Figure 40:
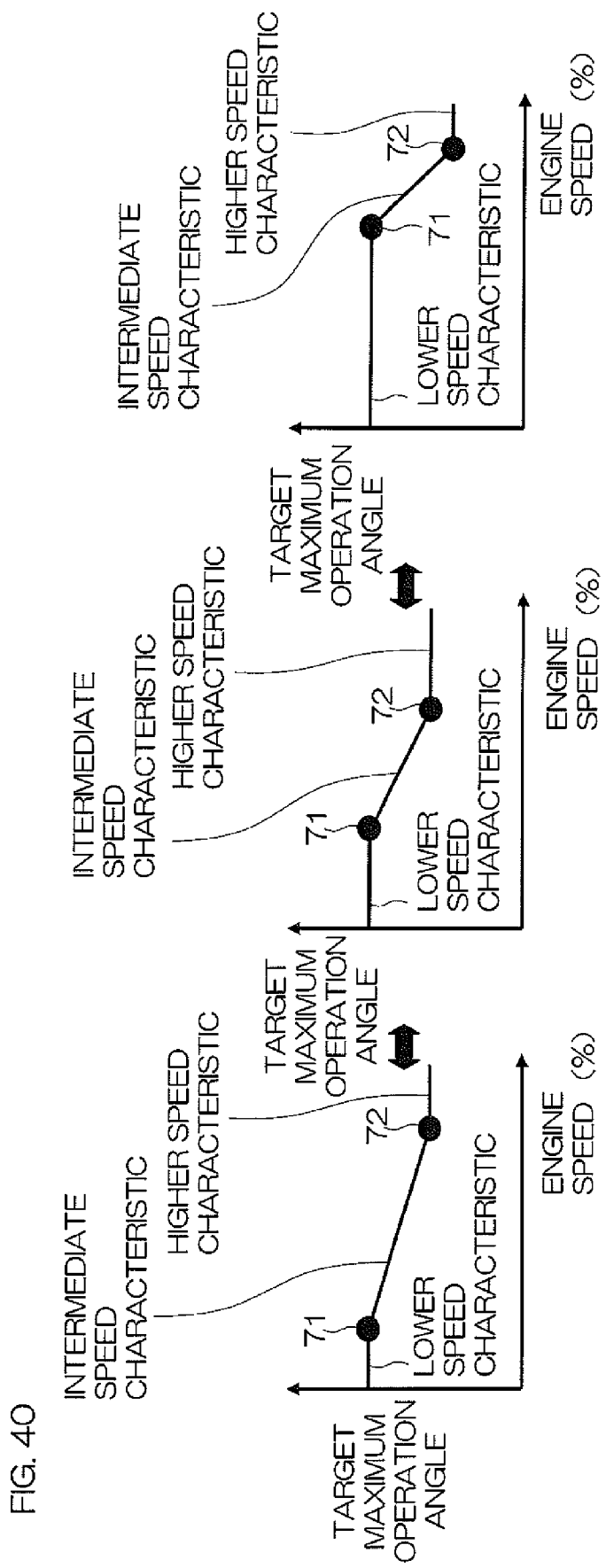
FIG. 40 is a diagram for explaining how to horizontally move inflection points according to the fourth preferred embodiment.
Figure 41:
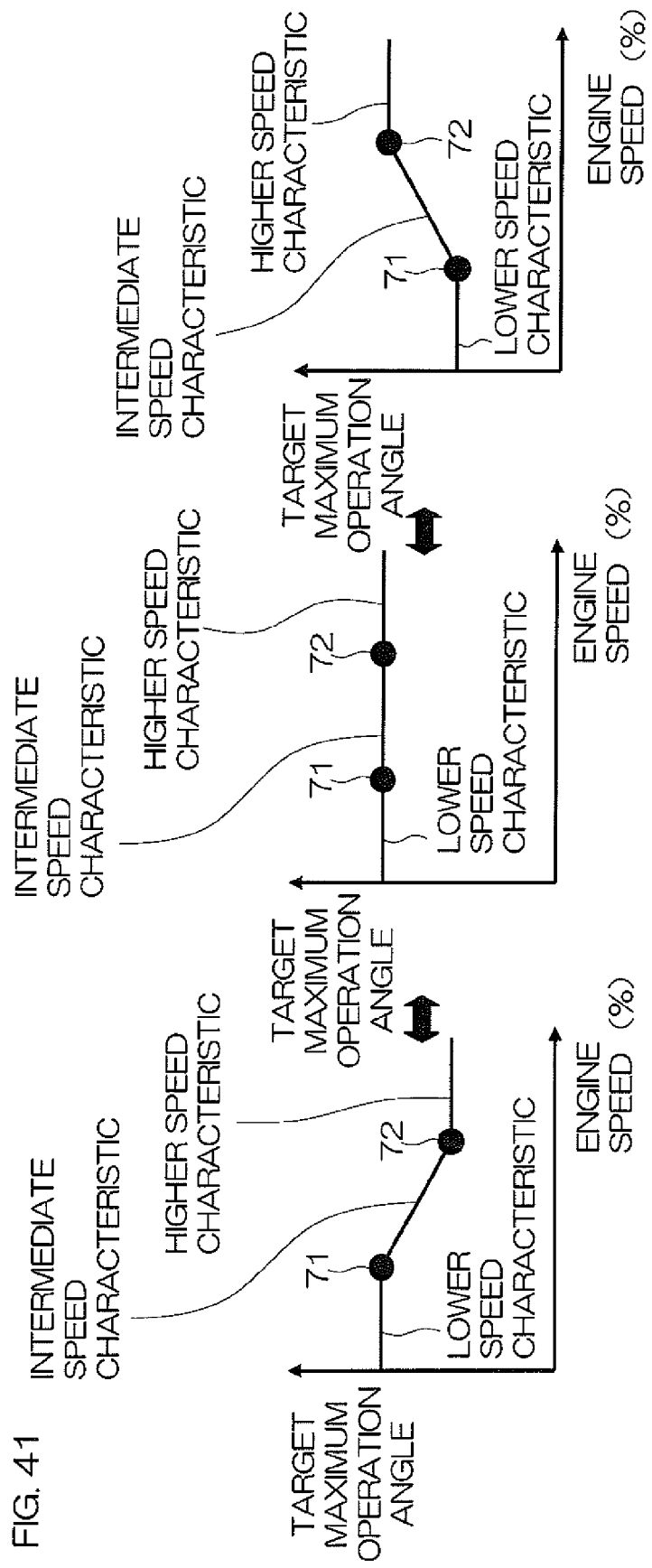
FIG. 41 is a diagram for explaining how to vertically move the inflection points according to the fourth preferred embodiment.

In this preferred embodiment, as shown in FIG. 39, not the target N-K characteristic but a target characteristic of a maximum operation angle Sm with respect to the engine speed N (target N-Sm characteristic) is graphically displayed on the screen of the display device 15. The operator sets a target N-Sm characteristic table by changing two inflection points (a first inflection point 71 and a second inflection point 72) of a target N-Sm characteristic line in the same manner as in the first to third preferred embodiments (see FIGS. 40 and 41). In the target N-Sm characteristic table, the target maximum operation angle Sm may be expressed by percentage.

The N-S-R characteristic map calculating module 62 calculates a new N-S-R characteristic map (final N-S-R characteristic map) by updating the standard N-S-R characteristic map based on the target N-Sm characteristic table thus set.

Figure 42:
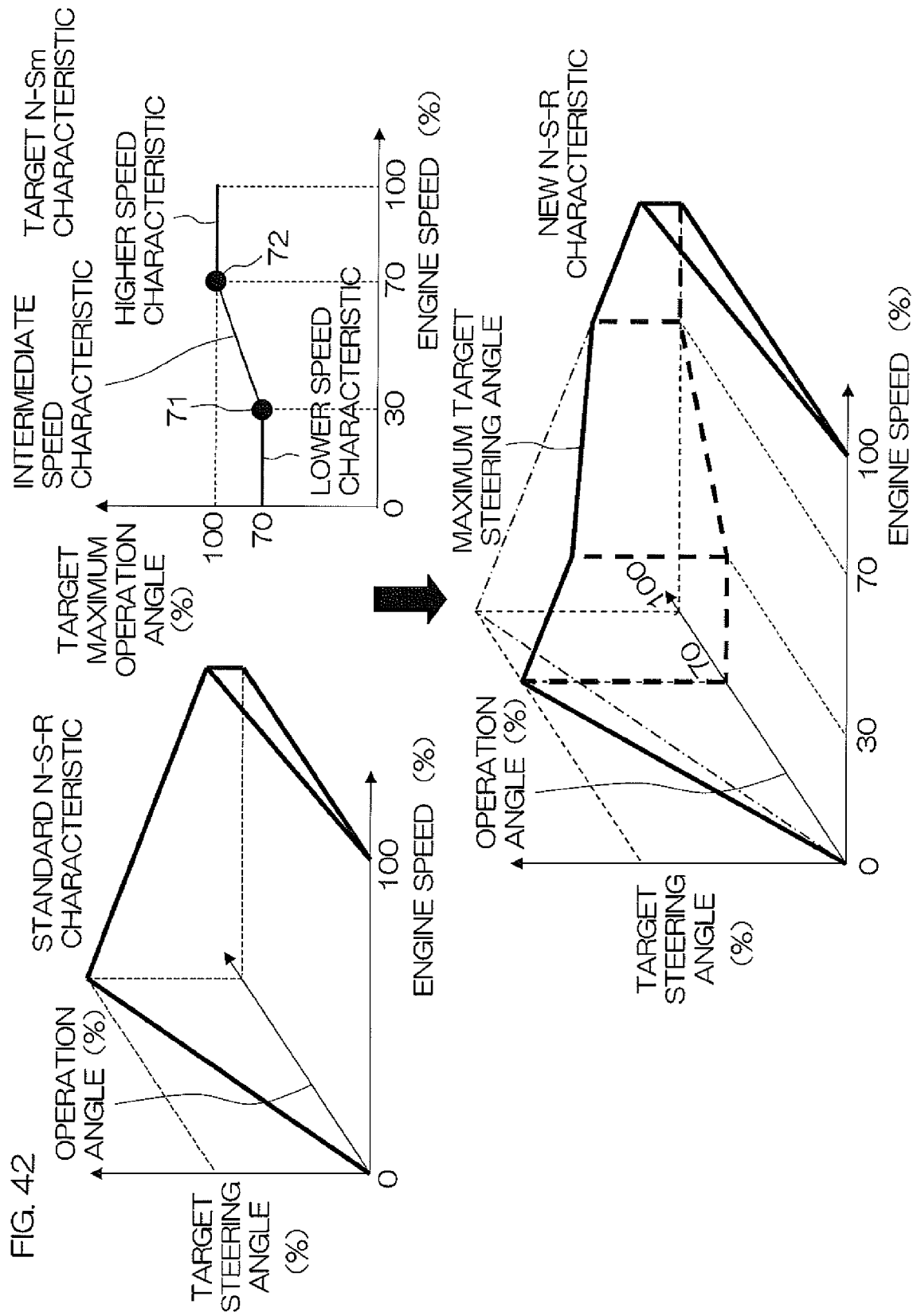
FIG. 42 is a diagram for explaining calculation of a new N-S-R characteristic map according to the fourth preferred embodiment.

A process for calculating the new N-S-R characteristic map is shown in FIG. 42. In FIG. 42, the standard N-S-R characteristic map (see an upper left graph in FIG. 42) is different in shape from the standard N-S-R characteristic map shown in the lower graph of FIG. 38 for convenience of description.

The N-S-R characteristic map calculating module 62 modifies the relationship between the maximum operation angle and the engine speed in the standard N-S-R characteristic map (see the upper left diagram in FIG. 42) so that the relationship conforms to the target N-Sm characteristic table (see an upper right graph in FIG. 42). At this time, the N-S-R characteristic map calculating module 62 updates the standard N-S-R characteristic map such that the maximum target steering angle is achieved with the maximum operation angle according to the modified relationship. The new N-S-R characteristic map obtained by updating the standard N-S-R characteristic map is indicated by a solid line in a lower graph of FIG. 42. For comparison, the standard N-S-R characteristic map is indicated by a one-dot-and-dash line. The comparison between the two maps shows that a line of the maximum target steering angle in the new N-S-R characteristic map is shifted along an operation angle axis as compared with the standard N-S-R characteristic map. That is, the maximum target steering angle of the standard N-S-R characteristic map is correlated with the maximum operation angle of the target N-Sm characteristic table at each engine speed. By operating the steering wheel 7a to the maximum operation amount, the steering angle can be changed to the maximum steering angle which is dependent upon the engine speed. Further, where the target maximum operation angle is set at a level less than an upper limit operation angle of the steering wheel 7a, the desired turning behavior can be provided without operating the steering wheel 7a to the upper limit operation angle.

Further, the N-S-R characteristic map can be easily set as desired by properly setting the target maximum operation amount with respect to the engine speed in the target N-Sm characteristic table.

While four preferred embodiments of the present invention have thus been described, the present invention may be embodied in many other ways. In the preferred embodiments described above, the marine vessel 1 preferably includes the single outboard motor 10 by way of example, but the present invention is applicable, for example, to a marine vessel including a plurality of outboard motors (e.g., two outboard motors) provided on the stern 3 thereof, and many other types of marine vessels.

In the first to third preferred embodiments described above, the N-K characteristic table preferably is calculated if measurement values are acquired for the respective zones obtained by dividing the entire engine speed range (Step S8 in FIG. 9). Alternatively, the calculation of the N-K characteristic table may be permitted if measurement values are acquired for the zone $M_1$ corresponding to the idling engine speed (0%) and the zone $M_7$ corresponding to the maximum engine speed (100%). Thus, the N-K characteristic table can be quickly provided. The N-K characteristic table is modified by thereafter acquiring measurement data for the other zones, whereby the accuracy of the N-K characteristic table is improved. In the fourth preferred embodiment, the calculation of the N-Rm characteristic table may be achieved in the same manner.

In the first to fourth preferred embodiments, the standard N-S-R characteristic map preferably is calculated once from the initial N-S-R characteristic map based on the N-K characteristic table (N-Rm characteristic table). Thereafter, the final N-S-R characteristic map is calculated from the standard N-S-R characteristic map based on the target N-K characteristic table (target N-Sm characteristic table). Alternatively, the final N-S-R characteristic map may be calculated directly from the initial N-S-R characteristic map based on the N-K characteristic table (N-Rm characteristic table) and the target N-K characteristic table (target N-Sm characteristic table).

Further, the third and fourth preferred embodiments may be modified in substantially the same manner as described with reference to FIGS. 27 to 30.

In the preferred embodiments described above, the engine speed is regarded as synonymous with the traveling speed of the marine vessel. Of course, the aforementioned processes may be performed by using the traveling speed of the marine vessel instead of the engine speed. In this case, a signal indicating the traveling speed of the marine vessel may be, for example, an output signal of a speedometer of the marine vessel. As an alternative index of the traveling speed of the marine vessel, the rotational speed of the propeller may be used instead of the engine speed. A rotational speed sensor, for example, may be provided for detection of the rotational speed of the propeller.

In the preferred embodiments described above, the learning data is preferably collected during the travel of the marine vessel, and the N-S-R characteristic map is prepared based on the learning data. Alternatively, a plurality of leaning data sets collected during travel of the marine vessel in various traveling states may be preliminarily accumulated in the storage section 60. The various traveling states include, for example, traveling states observed when different numbers of crew members and/or passengers are onboard, traveling states observed when different amounts of cargo are onboard, and traveling states observed under different conditions which differently affect the behavior of the marine vessel. In this case, it is preferred that one of the traveling states can be selected by operating the control console 6 (e.g., by operating the input device 14). Upon the selection of the traveling state, the N-K characteristic table calculating module 63 (see FIG. 7) or the N-Rm characteristic table calculating module 101 (see FIG. 34) reads a learning data set corresponding to the selected traveling state from the storage section 60. Thus, an N-S-R characteristic map is provided for the selected traveling state. Therefore, a marine vessel maneuvering characteristic suitable for the traveling state can be provided without the collection of the learning data.

In the processes shown in FIGS. 29 and 30, when the new N-K characteristic table is provided, the difference between the new N-K characteristic table and the previous N-K characteristic table is determined and, if the difference is not smaller than the threshold, the update of the N-K characteristic table is suspended. This idea may be extensively applied to other control information. More specifically, a difference between the new N-S-R characteristic map and the previous N-S-R characteristic map is determined when the N-S-R characteristic map stored in the N-S-R characteristic map storage section 62M is to be updated. If the difference is smaller than a predetermined threshold, the N-S-R characteristic map may be immediately updated and, if the difference is not smaller than the threshold, the update may be suspended. Further, the operator may be permitted to decide whether to effect the update.

It should be noted that update of data may be performed by overwriting previous data with new data, or may be performed by retaining the previous data in a storage area of a storage media while writing the new data into another storage area of the storage media.

In the preferred embodiments described above, preferably only the steering angle of the outboard motor is controlled to provide a desired turning behavior. Where a plurality of outboard motors (e.g., two outboard motors) are provided on a port side and a starboard side, the propulsive forces of these outboard motors which affect the turning behavior may also be controlled.

While the present invention has been described in detail by way of the preferred embodiments thereof, it should be understood that these preferred embodiments are merely illustrative of the technical principles of the present invention but not limitative of the invention. The spirit and scope of the present invention are to be limited only by the appended claims.

This application corresponds to Japanese Patent Application No. 2007-143843 filed in the Japanese Patent Office on May 30, 2007, the disclosure of which is incorporated herein by reference.

What is claimed is:

1. A marine vessel running controlling apparatus for a marine vessel which includes a propulsive force generating unit arranged to generate a propulsive force to be applied to a hull of the marine vessel, and a steering unit arranged to turn the hull, the marine vessel running controlling apparatus comprising:

an operational unit to be operated by an operator of the marine vessel to control a steering angle of the steering unit;

a speed measuring unit arranged to measure a traveling speed of the marine vessel;

an intrinsic characteristic acquiring unit arranged to acquire, during travel of the marine vessel, an intrinsic characteristic defining a relationship among the traveling speed of the marine vessel, the steering angle of the steering unit and a turning behavior of the marine vessel;

a steering angle characteristic setting unit arranged to determine and update a traveling speed-operation amount-target steering angle characteristic to define a relationship between a target steering angle of the steering unit and an operation amount of the operational unit according to the traveling speed of the marine vessel based on the intrinsic characteristic acquired by the intrinsic characteristic acquiring unit such that a marine vessel maneuvering characteristic defining a relationship among the traveling speed of the marine vessel, the operation amount of the operational unit and the turning behavior of the marine vessel satisfies a predetermined target marine vessel maneuvering characteristic; and a target steering angle setting unit arranged to determine the target steering angle of the steering unit for the operation amount according to the traveling speed measured by the speed measuring unit based on the traveling speed-operation amount-target steering angle characteristic determined by the steering angle characteristic setting unit.

2. A marine vessel running controlling apparatus as set forth in claim 1, further comprising an update notifying unit arranged to notify the operator that the traveling speed-operation amount-target steering angle characteristic has been updated.

3. A marine vessel running controlling apparatus as set forth in claim 1, wherein the intrinsic characteristic acquiring unit includes:

a yaw rate measuring unit arranged to measure a yaw rate of the marine vessel;

a gain computing unit arranged to calculate a yaw rate gain for the steering angle of the steering unit based on the yaw rate measured by the yaw rate measuring unit; and a gain characteristic computing unit arranged to calculate a gain characteristic defining a relationship between the gain and the traveling speed of the marine vessel; wherein the steering angle characteristic setting unit is arranged to determine the traveling speed-operation amount-target steering angle characteristic based on the gain characteristic calculated by the gain characteristic computing unit.

4. A marine vessel running controlling apparatus as set forth in claim 1, wherein the intrinsic characteristic acquiring unit includes a steering angle history characteristic computing unit arranged to calculate a steering angle history characteristic defining a relationship between a steering angle history of the steering unit and the traveling speed of the marine vessel, and the steering angle characteristic setting unit is arranged to determine the traveling speed-operation amount-target steering angle characteristic based on the steering angle history characteristic calculated by the steering angle history characteristic computing unit.

5. A marine vessel running controlling apparatus as set forth in claim 4, wherein the steering angle history characteristic computing unit includes a maximum steering angle characteristic computing unit arranged to calculate a maximum steering angle characteristic defining a relationship between a maximum steering angle of the steering unit and the traveling speed of the marine vessel.

6. A marine vessel running controlling apparatus as set forth in claim 5, wherein the steering angle characteristic setting unit includes a unit arranged to correlate a maximum operation amount of the operational unit with the maximum steering angle of the maximum steering angle characteristic according to the traveling speed of the marine vessel.

7. A marine vessel running controlling apparatus as set forth in claim 1, further comprising a target marine vessel maneuvering characteristic setting unit arranged to determine the target marine vessel maneuvering characteristic, wherein the steering angle characteristic setting unit is arranged to determine the traveling speed-operation amount-target steering angle characteristic so as to achieve the target marine vessel maneuvering characteristic determined by the target marine vessel maneuvering characteristic setting unit.

8. A marine vessel running controlling apparatus as set forth in claim 7, further comprising a target marine vessel maneuvering characteristic inputting unit which receives an input for setting the target marine vessel maneuvering characteristic, wherein the target marine vessel maneuvering characteristic setting unit is arranged to set the target marine vessel maneuvering characteristic according to the input from the target marine vessel maneuvering characteristic inputting unit.

9. A marine vessel running controlling apparatus as set forth in claim 8, further comprising a target marine vessel maneuvering characteristic storage unit arranged to store a plurality of target marine vessel maneuvering characteristics, wherein the target marine vessel maneuvering characteristic inputting unit includes a selecting unit arranged to select one of the target marine vessel maneuvering characteristics stored in the target marine vessel maneuvering characteristic storage unit.

10. A marine vessel running controlling apparatus as set forth in claim 9, wherein the steering angle characteristic setting unit includes a steering angle characteristic storage unit arranged to store a plurality of traveling speed-operation amount-target steering angle characteristics corresponding to the respective target marine vessel maneuvering characteristics stored in the target marine vessel maneuvering characteristic storage unit, and the steering angle characteristic setting unit is arranged to read out one of the traveling speed-operation amount-target steering angle characteristics corresponding to the target marine vessel maneuvering characteristic selected by the selecting unit from the steering angle characteristic storage unit.

11. A marine vessel running controlling apparatus as set forth in claim 1, wherein the steering angle characteristic setting unit is arranged to update the traveling speed-operation amount-target steering angle characteristic when the propulsive force generating unit generates a minimum propulsive force.

12. A marine vessel running controlling apparatus as set forth in claim 1, further comprising:
- a difference judging unit arranged to judge whether a difference between pre-update traveling speed-operation amount-target steering angle characteristic and post-update traveling speed-operation amount-target steering angle characteristic is less than a predetermined threshold; and
- an update suspending unit arranged to suspend updating of the traveling speed-operation amount-target steering angle characteristic if the difference judging unit judges that the difference is not less than the threshold.

13. A marine vessel running controlling apparatus as set forth in claim 1, further comprising
- an inquiry unit arranged to ask the operator whether to permit the steering angle characteristic setting unit to update the traveling speed-operation amount-target steering angle characteristic.

14. A marine vessel running controlling apparatus as set forth in claim 1, further comprising a data number judging unit arranged to judge whether a number of data samples acquired during the travel of the marine vessel satisfies a predetermined number requirement, wherein the steering angle characteristic setting unit is arranged to update the traveling speed-operation amount-target steering angle characteristic if the data number judging unit judges that the number requirement is satisfied.

15. A marine vessel running controlling apparatus as set forth in claim 3, wherein
- the gain characteristic computing unit is arranged to update the gain characteristic, and
- the marine vessel running controlling apparatus further comprises:
  - a different judging unit arranged to judge whether a difference between pre-update gain characteristic and post-update gain characteristic is less than a predetermined threshold; and
  - an update suspending unit arranged to suspend updating of the gain characteristic if the difference judging unit judges that the difference is not less than the predetermined threshold.

16. A marine vessel comprising:
a hull;
a propulsive force generating unit arranged to generate a propulsive force to be applied to the hull;
a steering unit arranged to turn the hull; and
a marine vessel running controlling apparatus, wherein the marine vessel running controlling apparatus comprises:
- an operational unit to be operated by an operator of the marine vessel to control a steering angle of the steering unit;
- a speed measuring unit arranged to measure a traveling speed of the marine vessel;
- an intrinsic characteristic acquiring unit arranged to acquire, during travel of the marine vessel, an intrinsic characteristic defining a relationship among the traveling speed of the marine vessel, the steering angle of the steering unit and a turning behavior of the marine vessel;
- a steering angle characteristic setting unit arranged to determine and update a traveling speed-operation amount-target steering angle characteristic to define a relationship between a target steering angle of the steering unit and an operation amount of the operational unit according to the traveling speed of the marine vessel based on the intrinsic characteristic acquired by the intrinsic characteristic acquiring unit such that a marine vessel maneuvering characteristic defining a relationship among the traveling speed of the marine vessel, the operation amount of the operational unit and the turning behavior of the marine vessel satisfies a predetermined target marine vessel maneuvering characteristic; and
- a target steering angle setting unit arranged to determine the target steering angle of the steering unit for the operation amount according to the traveling speed measured by the speed measuring unit based on the traveling speed-operation amount-target steering angle characteristic determined by the steering angle characteristic setting unit.

* * * * *